US012430592B2

(12) United States Patent
Moore et al.

(10) Patent No.: US 12,430,592 B2
(45) Date of Patent: *Sep. 30, 2025

(54) SUPPLEMENTAL SYSTEM FOR BUSINESS INTELLIGENCE SYSTEMS

(71) Applicant: Motio, Inc., Plano, TX (US)

(72) Inventors: Roger Moore, Dallas, TX (US);
Edward Kaplonski, Dallas, TX (US)

( * ) Notice: Subject to any disclaimer, the term of this patent is extended or adjusted under 35 U.S.C. 154(b) by 790 days.

This patent is subject to a terminal disclaimer.

(21) Appl. No.: 16/505,392

(22) Filed: Jul. 8, 2019

(65) Prior Publication Data

US 2019/0332982 A1    Oct. 31, 2019

Related U.S. Application Data

(63) Continuation of application No. 14/337,144, filed on Jul. 21, 2014, now Pat. No. 10,346,770.

(60) Provisional application No. 61/856,569, filed on Jul. 19, 2013.

(51) Int. Cl.
    *G06Q 10/063* (2023.01)
(52) U.S. Cl.
    CPC ................... *G06Q 10/063* (2013.01)
(58) Field of Classification Search
    CPC .................................................. G06Q 10/063
    See application file for complete search history.

(56) References Cited

U.S. PATENT DOCUMENTS

| 7,945,589 B1* | 5/2011 | Weiss ............... G06F 8/38 707/795 |
| 8,145,589 B2* | 3/2012 | Verma ............. G06Q 10/06 706/50 |
| 9,152,412 B2* | 10/2015 | Cowan ............ G06F 40/197 |
| 2008/0046858 A1* | 2/2008 | Mcclean .......... G06F 8/71 717/100 |

OTHER PUBLICATIONS

Oliveira et al. ("Odyssey-VCS: a Flexible Version Control System for UML model elements"; SCM 2005, Sep. 5-6, 2005 Lisbon, Portugal; Copyright 2005 ACM) (Year: 2005).*
Zhang et al. ("Version Support and Management in CIMS/EDBMS"; 1997 IEEE Conference on Intelligent Processing Systems; Oct. 28-31, Beijing, China) (Year: 1997).*

* cited by examiner

*Primary Examiner* — Charles Rones
*Assistant Examiner* — Ken Hoang
(74) *Attorney, Agent, or Firm* — Ferguson Braswell Fraser Kubasta PC

(57) ABSTRACT

In various implementations, a supplemental system may be provided. The supplemental system may be coupled to business intelligence environment(s) to facilitate deployment, version control, testing, and/or other processes. In some implementations, the supplemental system may be communicably coupled to an external version control. The external version control may store one or more versions of components of the business intelligence environment(s) and the supplemental system may utilize the versions to perform one or more operations, such as, but not limited to, facilitating deployment, version controlling, and/or testing. In some implementations, the supplemental system may utilize information from a ticket manager in deployments of BI Artifact(s).

20 Claims, 16 Drawing Sheets

200 ⤴

LABEL A, V1

R1, V2 ←—210
R2, V1 ←—220
R5, V5 ←—230
Property Set, V2 ←—240

SUPPLEMENTAL SYSTEM FOR BUSINESS INTELLIGENCE SYSTEMS

CROSS-REFERENCE TO RELATED APPLICATIONS

This application is a continuation of U.S. patent application Ser. No. 14/337,144 entitled "SUPPLEMENTAL SYSTEM FOR BUSINESS INTELLIGENCE SYSTEMS" filed on Jul. 21, 2014, which claims the benefit of U.S. Provisional Patent Application No. 61/856,569 filed on Jul. 19, 2013, both of which are hereby incorporated by reference for all purposes.

TECHNICAL FIELD

The present disclosure relates to business intelligence systems.

BACKGROUND

As companies continue to collect a wide variety of data, business intelligence systems may be utilized to evaluate the collected data. Business intelligence systems can collect and analyze data to provide historical information, current operational information, and/or predictive information. For example, a business intelligence system may be utilized in data mining analyses to facilitate business decision-making.

SUMMARY

In various implementations, a supplemental (SI) system may be provided. The supplemental system may be coupled to business intelligence environment(s) to facilitate deployment; analyses (e.g., identifications of similarities and/or differences, comparison to criteria, and/or other analyses); version control, tracking, management, and/or control; identification of differences between, for example, BI Artifacts; testing; test creation, association, and/or management; collaboration; release management; and/or other processes. In various implementations, the supplemental system (a continuous integration (SI) system and/or a modified SI system) may be utilized and the SI system may include one or more features for use in and/or with a business intelligence system.

In various implementations, changes in BI Artifacts may be identified and/or monitored. A set of alterations to a first copy of a set of BI Artifacts may be determined and a request from a user to commit the set of alterations to a BI environment received. The set of alterations may be transmitted to an external version control. A conflict notification may be received from the external version control based at least partially on the transmitted set of alterations and a second copy of the set of BI Artifacts stored in a memory of the external version control. The conflict notification may identify whether a conflict exists between the transmitted set alterations and the second copy of the set BI Artifacts. A determination may be made whether a conflict exists between the transmitted set of alterations and the second copy of the set of BI Artifacts based on the conflict notification and/or one or more conflict assistance tests. The conflict assistance test(s) may be based on a comparison between the second copy of the set of BI Artifacts and the first copy of the set of BI Artifacts. If a determination is made that a conflict does not exist, a request may be transmitted to the external version control to commit the alterations to the second copy of the set of BI Artifacts residing in the external version control, and/or a request may be transmitted to the BI environment to change the set of BI Artifacts in the BI environment based on the set of alterations.

Implementations may include one or more of the following features. The first copy may include a first version of a first BI Artifact and the second copy may include a second version of the first BI Artifact. The first copy of the set of BI Artifacts may reside in the BI environment such that the first copy of the set of BI Artifacts does not overwrite the set of BI Artifacts in the BI environment. If a determination is made that a conflict exists, commitment of the set of alterations to the external version control and/or changes to the set of BI Artifacts in the BI environment based on the set of alterations may be restricted. At least one of the conflict assistance tests may be based on a comparison between a portion of the first copy of the set of BI Artifacts that was not altered by the set of alterations and a corresponding portion in the second copy of the set of BI Artifacts. In some implementations, a third copy of the set of BI Artifacts may be generated by retrieving the second copy of the set of BI Artifacts from the external version control. A set of differences may be identified between the third copy of the set of BI Artifacts and the first copy of the set of BI Artifacts, and the identified set of differences may be merged into the first copy of the set of BI Artifacts to create a merged copy of the set of BI Artifacts. One or more of the conflict assistance tests may be applied to the merged copy of the set of BI Artifacts. A determination may be made whether a conflict exist between the first copy of the set of BI Artifacts and the third copy of the set of BI Artifacts based at least partially on the results of one or more of the conflict assistance tests. If a determination is made that a conflict does not exist between the first copy of the set of BI Artifacts and the third copy of the set of BI Artifacts, the merged copy of the set of BI Artifacts may be transmitted and/or committed to the external version control. Transmission of the merged copy of the set of BI Artifacts to an external version control may be restricted if a determination is made that a conflict does exist between the first copy of the set of BI Artifacts and the third copy of the set of BI Artifacts. In some implementations, the conflict may be identified if a determination is made that a conflict does exist between the first copy of the set of BI Artifacts and the third copy of the set of BI Artifacts, and a user may be allowed to provide a second set of alterations to the first copy of the set of BI Artifacts such that the conflict is resolved. In some implementations, the determined second set of alterations may be transmitted to the external version control. A second conflict notification may be received from the external version control based on the transmitted second set of alterations and the second copy of the set of BI Artifacts stored in a memory of the external version control. The second conflict notification may identify whether a conflict exists between the transmitted second set of alterations and the second copy of the set of BI Artifacts. A determination may be made whether a second conflict exists between the transmitted second set of alterations and the second copy of the set of BI Artifacts based at least partially on the conflict notification. The second set of alterations may be committed to the external version control if a determination is made that a second conflict does not exist. The set of BI Artifacts in the BI environment may be changed based on the second set of alterations if a determination is made that the second conflict does not exist. In some implementations, determining a set of alterations may include intercepting communication(s) in the BI environment. Intercepting communication(s) may include intercepting database queries in the BI environment, communications from a message bus, and/or communications in the BI environment between a user and the BI environment related to changes to a set of BI Artifacts. In some implementations, a request from a first user for access to a set of BI Artifacts that reside in a first BI environment may be identified, and the contents of the requested set of BI Artifacts may be determined. A version identification may be determined for at least one of the BI Artifacts in the requested set of BI Artifacts from the external version control (e.g., the SI system may request version identification information from the external version control). A first copy of the requested set of BI Artifacts may be generated in the first BI environment such that the generated first copy of the requested set of BI Artifacts does not overwrite the set of BI Artifacts that reside in the first BI environment. A check out record may be generated based on the determined version identification of one or more of the BI Artifacts in the requested set of BI Artifacts and user information associated with the first user, and the generated check out record may be stored in a memory coupled to the SI system. Generating a first copy of the requested set of BI Artifacts in the first BI environment may include generating the first copy on a local drive (e.g., of a BI environment, such as a portion associated with user information).

In various implementations, the SI system may utilize information from an external ticket manager when deploying BI Artifact(s). A listing of tickets may be requested from an external ticket manager. A ticket may be associated with one or more BI Artifacts, and to obtain approval of the ticket at least one of the associated BI Artifacts is changed. A listing of approved tickets may be presented to a user. The listing of the approved tickets may be based on the requested listing of tickets and identification of approval of tickets from the external ticket manager. A selection of a set of approved tickets may be retrieved from the listing of approved tickets, and a set of alterations to one or more BI Artifacts associated with the selected set of approved tickets may be identified. A selection of at least a portion of the set of alterations may be received to generate a second set of alterations to deploy in a BI environment, and the second set of alterations may be transmitted to an external version control. A conflict notification may be received from the external version control based on the transmitted second set of alterations and a first copy of the set of BI Artifacts stored in a memory of the external version control. The conflict notification may identify whether a conflict exists between the transmitted second set of alterations and the first copy of the set of BI Artifacts. A determination may be made whether a conflict exists between the transmitted second set of alterations and the first copy of the set of BI Artifacts based on the conflict notification. If a determination is made that a conflict does not exist, commitment of the second set of alterations to the set of BI Artifacts residing in external version control and/or changes to the set of BI Artifacts in the BI environment based on the second set of alterations may be requested.

Implementations may include one or more of the following features. Determining whether a conflict exists between the transmitted second set of alterations and the second copy of the set of BI Artifacts may be based on one or more conflict assistance tests. At least one of the conflict assistance tests may be based on a comparison between the first copy of the set of BI Artifacts and the one or more BI Artifacts associated with the selected set of ticket. In some implementations, a third copy of the associated set of BI Artifacts may be generated by retrieving the second copy of the set of BI Artifacts in the external version control. The set of BI Artifacts may be merged with the third copy of the set of BI Artifacts to generate a merged set of BI Artifacts. Merging the set of BI Artifacts with the third copy of the set of BI Artifacts may include applying the second set of alterations to the third copy of the set of BI Artifacts. The merged set of BI Artifacts may be transmitted to the external version control, and a determination may be made whether a conflict exists based on the transmission of the merged set of BI Artifacts to the external version control. If a determination is made that a conflict does not exist, change(s) to the set of BI Artifacts in the BI environment may be requested based on the second set of alterations and/or the merged copy. Determining if a conflict exists is may be based on conflict assistance test(s), and at least one of the conflict assistance tests may be based on a comparison between the third copy of the set of BI Artifacts and the set of BI Artifacts associated with the selected set of tickets.

In various implementations, versions of BI Artifacts may be managed by accessing communications in a BI environment between a user and a BI environment related to a set of BI Artifacts. A first change requested by a user via an interface in the BI environment to the set of BI Artifacts may be identified prior to allowing the first change to be transmitted to other component(s) of the BI environment to process the first change. A determination may be made whether to allow the requested first change to the set of BI Artifacts in the BI environment based at least partially on conflict assistance test(s). At least one of the conflict assistance tests may be based at least partially on the change to at least one of the BI Artifacts of the set of BI Artifacts. At least one notification may be presented to the user in an interface of the BI environment based at least partially on one or more results of at least one of the conflict assistance tests. The requested first change may be allowed to the set of BI Artifacts in the BI environment by transmitting the requested first change to one or more of the other components of the BI environment if a determination is made to allow the requested first change to the set of the BI Artifacts.

Implementations may include one or more of the following features. The requested first change to the set of BI Artifacts in the BI environment may be restricted if a determination is made to not allow the requested first change to the set of the BI Artifacts. Presenting at least one of the notifications may include presenting a conflict. In some implementations, a second change in the BI environment may be received from the user to resolve the conflict, if a determination is made to not allow the requested first change. A set of alterations may be generated based on the identified first change and the received second change, and the generated second set of alterations may be transmitted to one or more of the other components of the BI environment to allow the set of alterations to be allowed to the set of BI Artifacts in the BI environment. Identifying a first change requested by a user in the BI environment to the set of BI Artifacts may include determining if at least one of the communications in a BI environment between a user and a BI environment related to a set of BI Artifacts is included a predetermined listing of changes. A determination may be made that a first change has occurred if at least one of the communications in a BI environment between a user and a BI environment related to a set of BI Artifacts is included a predetermined listing of changes. A determination may be made that a first change has not occurred if at least one of the communications in a BI environment between a user and a BI environment related to a set of BI Artifacts is not included a predetermined listing of changes. In some implementations, accessing communications in a BI environment between a user and a BI environment related to a set of BI Artifacts may include intercepting communications from a BI Bus of the BI system. In some implementations, a second change requested by a user may be identified based on the intercepted communications from the BI Bus, and conflict assistance test(s) may be allowed based at least partially on the second change to at least one of the BI Artifacts of the set of BI Artifacts. Allowing one or more of the conflict assistance tests may include requesting execution of at least one conflict assistance test in the BI environment and/or executing at least one conflict assistance test in the BI environment. In some implementations, at least one notification may be presented to the user in an interface of the BI environment based on one or more of the results of one or more of the conflict assistance tests. In some implementations, accessing communications in a BI environment between a user and a BI environment related to a set of BI Artifacts may include intercepting database queries of the BI system. A second change requested by a user may be identified based on the intercepted database queries, and conflict assistance test(s) may be allowed based at least partially on the second change to at least one of the BI Artifacts of the set of BI Artifacts. At least one notification may be presented to the user in an interface of the BI environment based on one or more results of at least one of the conflict assistance tests. In some implementations, accessing communications in a BI environment between a user and a BI environment related to a set of BI Artifacts may include intercepting communications. Intercepting communications may include intercepting database queries, HTTP/HTTPS requests, SOAP requests, RMI requests, CORBA requests, API invocations, library requests (e.g., as methods or operations defined in a jar file, DLL or shared library), system calls, communications from a message bus of the BI system (e.g., BI Bus) and/or communications from other components of the BI system. A second change requested by a user may be identified based on the intercepted database queries, and conflict assistance test(s) may be allowed based at least partially on the second change to at least one of the BI Artifacts of the set of BI Artifacts. At least one notification may be presented to the user in an interface of the BI environment based on one or more results of at least one of the conflict assistance tests.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of the present disclosure and its features, reference is now made to the following description, taken in conjunction with the accompanying drawings, in which:

FIG. 1I depicts a schematic illustration of an example report execution profile, namely a UML Analysis Class Diagram.

Like reference symbols in the various drawings indicate like elements.

DETAILED DESCRIPTION

Enterprises may utilize commercially available business intelligence (BI) software, such as IBM Cognos available from International Business Machines Corp (Armonk, NY), to collect, access, analyze, and/or create presentations of business data, such as sales, workforce, costs, etc. Using the BI software, one or more BI environments may be created on computer system(s). For example, to minimize disruptions to a production environment, one or more other environments, such as a quality assurance (QA) environment and/or development environment, may be utilized to develop and/or test new, altered, and/or deleted BI Artifacts.

A supplemental (SI) system, such as a continuous integration (CI) system and/or a modified CI system (e.g., as described in U.S. Pat. No. 7,885,929 filed on Jan. 3, 2006 and entitled "Continuous Integration of Business Intelligence Software"), may communicate with BI environment(s), external database(s), datasource(s), webservice(s), and/or other system(s). In some implementations, the SI system may operate on a separate computer system from the BI environment(s) and/or portions of the SI system may be included in the BI environment (e.g., links to SI operations in a graphical user interface generated by the BI environment).

Figure 1A:
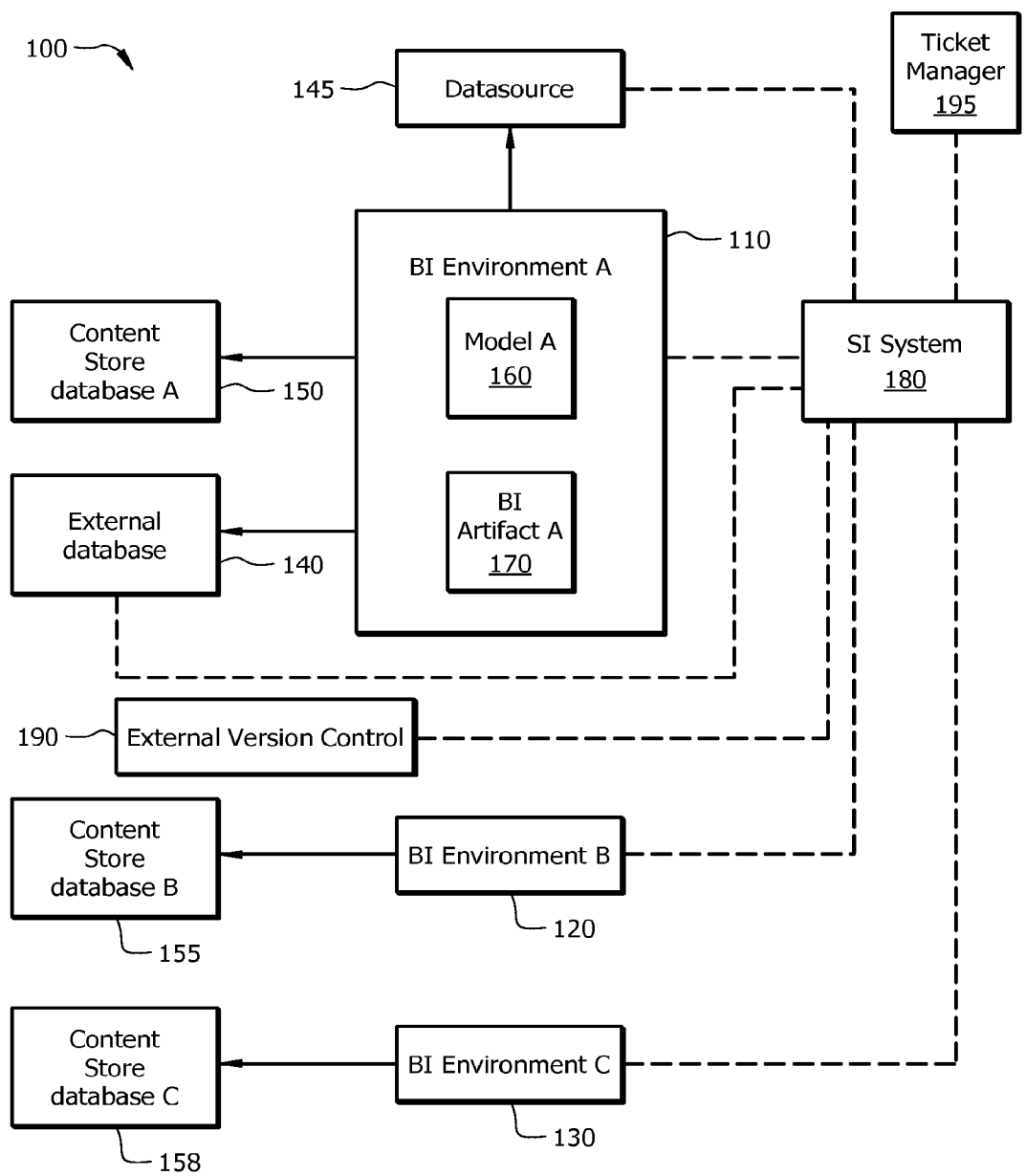
FIG. 1A illustrates an implementation of a simplified example of a system that includes a SI system and more than one BI environment.

FIG. 1A illustrates an implementation of an example system 100. The system 100 may be utilized by an enterprise. As illustrated, a system 100 may include one or more BI environments (e.g., instances of a BI system such as IBM Cognos instances). For example, an enterprise may utilize business intelligence software, such as IBM Cognos to create BI environment(s). In some implementations, a first BI software may be utilized to create a first BI environment and a second BI software may be utilized to create a second BI environment(s). For example, a first region of an enterprise may utilize IBM Cognos to create a first BI environment and a second region of an enterprise may utilize SAP Business Objects to create a second BI environment.

As illustrated, more than one BI environment may be operated, in some implementations, such as BI environment A 110, BI environment B 120, and BI environment C 130. For example, an enterprise may operate separate BI environments for development, quality assurance (QA), and/or production. In some implementations, different parts of the enterprise (e.g., during a merger and/or for regulatory compliance) may operate different BI environments.

In some implementations, each BI environment may be run on separate computer systems (e.g., servers and/or databases) and/or may share one or more components of a computer system. In some implementations, the BI environments may not be able to communicate directly with each other. In some implementations, at least one of the BI environments may be at least partially independent of another BI environment, such that a BI Artifact associated with a first BI environment may not be directly run from a different BI environment. For example, a BI Artifact, such as Report A, may be created in BI environment A. BI environment B may be restricted from executing BI Artifacts outside of BI environment B, and thus, may not be able to execute Report A. Thus, Report A, which was created in BI environment A, may be deployed in BI environment B to allow Report A to be executed in BI environment B. In some implementations, BI environment B may include BI Artifacts, such as Query B. BI environment A may be restricted from reading, retrieving, and/or executing Query B, which resides in BI environment B. In some implementations, Query B may be deployed in BI environment A to allow BI environment A to execute Query B in BI environment A. The SI system may communicate with one or more of the BI environments. Thus, the SI system may facilitate deployments between BI environments since the SI system may communicate with the BI environment(s) and/or may be able to read, retrieve, and/or cause execution of BI Artifact(s) in BI environment(s).

In some implementations, the BI environments may have different or similar properties to each other. For example, the permissions (e.g., access, editing, and/or other permissions of a user and/or group) may differ between BI environment A and BI environment B. In some implementations, the datasource(s) (e.g., relational database, OLAP cube or dynamic cube) that the BI environment is coupled to may differ.

The BI environment(s) may be coupled to one or more external databases. As illustrated, the BI environment A 110 may be coupled to external database 140. The external database may include business data (e.g., sales, workforce information, and/or any other information useful to the business). The BI environments may be coupled to the same and/or different external databases (e.g., a database may be replicated and/or partially replicated for use with one or more BI environments; for example, a development BI environment may be coupled to a partially replicated version of the database to which the production BI environment is coupled). For example, the BI environments may be coupled to different external databases that store at least a portion of the same business data.

In some implementations, the BI environment(s) may be coupled to datasource(s) (e.g., database, cube, flatfile, and/or webservice). A BI environment, such as BI environment A 110, may be coupled to a datasource 145 in addition to being coupled to an external database 140, as illustrated, and/or may be coupled to a datasource instead of being coupled to an external database. For example, the BI environment may be coupled to the datasource, which provides access to data, such as business data. The data may be stored on a database, in some implementations, and access to the data may be obtained by the BI environment through the datasource.

The BI environment, such as BI environment A 110, may include a content store database A 150. As illustrated, each BI environment may include a content store database (e.g., BI environment B 120 may include content store database B 155 and BI environment C 130 may include content store database C 158). The content store database A 150 may include, for example, information such as BI Artifacts; report specifications; models; packages, such as published model(s) and/or deployment packages (e.g., a set of one or more BI Artifacts in a first BI environment to deploy to a second BI environment); and/or properties of the BI Artifacts.

In some implementations, to facilitate creation of a BI Artifact that references a set of data, a user may create a metadata model. A user may create a metadata model that references datasouce(s) and/or databases. As illustrated in FIG. 1A, a user may create a Model A 160 in BI environment A 110 (e.g., using Framework Manager in IBM Cognos). The Model A 160 may allow data to be retrieved using a datasource 145 and/or an external database 140. When creating the metadata model (e.g., Model A 160), a metadata model file (e.g., a file associated with the creation of the metadata model; the file may include metadata regarding the metadata model) may be created. The metadata model file may reside on a user computer, in some implementations. The user may then create one or more BI Artifacts based at least partially on the created metadata model. Thus, the BI Artifact may obtain access to a set of data based on the datasources and/or databases in the metadata model. For example, a BI Artifact, such as Report A, may retrieve data using a datasource. A BI Artifact, such as Query A, may perform a query of data using a connection to an external database provided by the metadata model.

The BI environment may include one or more BI Artifact studios (e.g., a BI environment created by IBM Cognos may include Report Studio, Query Studio, Analysis Studio, Metric Studio, etc.) that allow BI Artifact(s) to be authored (e.g., created, edited, and/or deleted) by the user. The SI system may communicate with, intercept communications from, and/or present data via one or more of the BI Artifact studio(s). The user may access the BI Artifact studio via one or more web-based graphical user interfaces. The BI Artifact studio(s) may allow a user to create, delete, and/or edit BI Artifacts. Thus, a user may access a BI Artifact studio to create, for example, a BI Artifact A 170 in the BI environment A 110. The BI Artifact A 170 may be created using the Model A 160 to allow access to data stored in the external database 140 and/or accessed via the datasource 145.

In some implementations, the user may create a package in a BI environment. One or more BI Artifacts in the BI environment may be associated with the package (e.g., the reference to a package may be a property of a BI Artifact). A BI Artifact may be associated with more than one package, in some implementations. The BI environment may contain report BI Artifacts, such as R1, R2, and R5 (e.g., R1, R2, and R5 may be associated with the package). The SI system may create a label and associate the label with the package and its associated BI Artifacts (R1, R2 and R5) in order to facilitate deployment. When a BI Artifact is created in the BI environment, a set of properties may be associated with the created BI Artifact. For example, properties may include: Name, Description, Tooltip, Specification, Policies, Metadata Model, and/or other appropriate properties. In some implementations, a first set of properties may be associated with a first BI Artifact created in a first BI environment. When the first BI Artifact is deployed in a second BI environment, the first collection of properties may be deployed with the first BI Artifact. When the SI system is utilized in the deployment, the user may generate a property set that includes one, more than one, or none of the properties selected from the first collection of properties and/or other properties. The property set generated in the SI system may be utilized when deploying the first BI Artifact in the target BI environment. For example, when a BI Artifact resides in a first BI environment, a first collection of properties may be utilized (e.g., to grant appropriate permissions to users). When the BI Artifact resides in a second BI environment, a second collection of properties may be associated with the BI Artifact that provides different and/or the same properties. When the second property set is different than the first property set, the SI system may utilize a property set with deployment of BI Artifact(s), content(s) of package(s), and/or content(s) of label(s) to retain the existing property set and/or selectively deploy a portion of the first collection of properties with the deployment of the BI Artifact in the second BI environment. For example, the property set may include a listing of properties from the first collection of properties to deploy with the BI Artifact and/or to restrict from deploying with the BI Artifact.

Figures 2A, 2B:
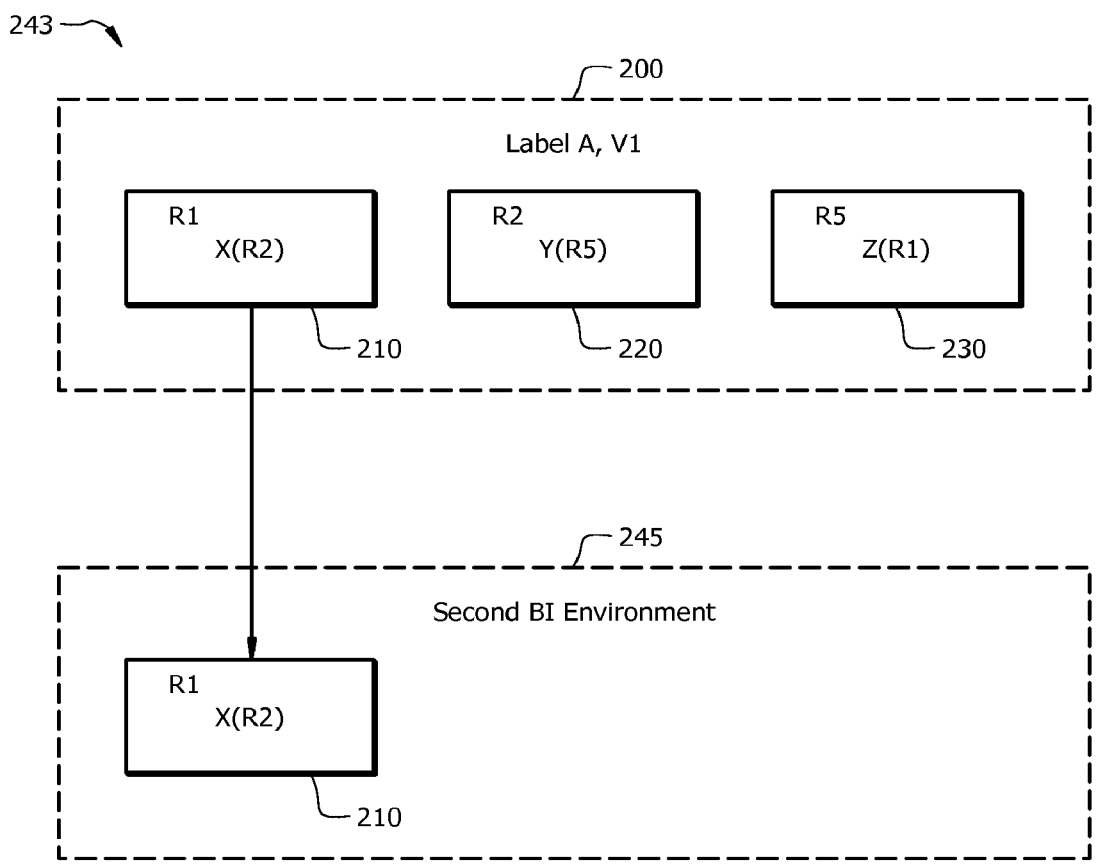
FIG. 2A illustrates an implementation of an example label.
FIG. 2B illustrates an implementation of an example deployment.

In some implementations, the SI system (e.g., instruction(s) executed by a processor of the SI system) may allow a label to be assigned to one or more BI Artifacts (e.g., a set of selected BI Artifacts and/or a package for deployment) and/or property sets. A BI Artifact may be associated with more than one label, in some implementations. In some implementations, a label may be associated with a specific version of a BI Artifact and/or property set. FIG. 2A illustrates an example label 200. The label may include (e.g., associate) one or more selected BI Artifacts 210, 220, 230 and/or one or more selected Property Sets 240. The property set may be associated with a BI Artifact. The property set may be the same and/or different from the property set associated with the BI Artifact, when created in a BI environment. For example, when BI Artifact 210 is created in a BI environment, a BI Artifact Studio may automatically associate the BI Artifact 210 with a first property set. The property set 240 may be the first property set, for example, and/or the property set 240 may be a different property set. In some implementations, a BI Artifact may not be associated with a property set in a label. For example, BI Artifact 220 may not be associated with a property set in the label 200. Thus, when the BI Artifact 220 is deployed in another BI environment, an existing property set (e.g., in the BI environment) may not be overwritten.

In some implementations, in the SI system, a label may be associated with one or more packages from a BI environment. For example, a package may be defined in a BI environment as including one or more BI Artifacts. The label may be associated with package(s) and/or portions thereof, in the SI system. In some implementations, a label may be restricted from being associated with property set(s) associated with a package and/or a user may select to not associate property set(s) associated with the package. When the set of package(s), BI Artifact(s) and/or Property Set(s) is stored in the SI system, an identifier, such as Label A, may be associated with the label. As illustrated, the label 200 may include three BI Artifacts, such as reports R1 210, R2 220, and R5 230.

In some implementations, BI artifacts may be executed, viewed, presented, and/or edited in one or more of the BI environments. For example, a Report A created in BI environment A may be modified by a user in BI environment A. If Report A is deployed in BI environment B, the deployed Report A may be modified in BI environment B and the originally created Report A may be modified in BI environment A, in some implementations.

A supplemental system, such as a SI system 180, may be coupled to one or more of the BI environments. For example the SI system 180 may be communicably coupled to the BI environment A 110, BI environment B 120, and BI environment C 130. The SI system 180 may include a computer system, which includes a server and a memory, such as a database (e.g., SI database), in some implementations. The SI system 180 may access databases, such as external database 140, coupled to BI environment(s) through the BI environment(s) and/or independently.

The SI system may be accessed independently of a BI environment and/or through the BI environment (e.g., via one or more user interface elements, such as buttons, generated by the SI system for presentation in a graphical user interface of the BI environment; pop-ups, windows, and/or portions of a user interface generated by the BI environment to present data, such as test results, to a user). The instructions (e.g., a module) for operation(s) of the SI system may at least partially reside on the SI system. In some implementations, at least a portion of the instructions may reside in a BI environment.

The SI system may facilitate (e.g., via instruction(s) stored on a memory of the SI system and executed by a processor of the SI system): deployment of BI Artifacts (e.g., from one BI environment to another BI environment); assignment of labels to one or more BI Artifacts and/or property sets; identification, management and/or storage of versions of various components (e.g., BI Artifacts, files, Aspects of BI Artifacts, property sets, labels, tests, assertions, test scripts, etc.) of the SI system and/or BI system; testing of one or more components of the SI system and/or BI system (e.g., BI Artifacts); versioning of BI Artifacts, merging versions of BI Artifacts, generating copies of BI Artifacts in BI environments, communicating with external version control 190, communicating with ticket managers 195, and/or messaging. The SI system may perform one or more other operations, as appropriate.

The external version control 190 may be coupled to one or more components of the system 100. The external version control 190 may store files (e.g., in a memory of the external version control) that include one or more versions of components of the BI environment, such as BI Artifacts, packages, labels, etc. The external version control 190 may include a server operating a version control manager such as Subversion, IBM Rational ClearCase, Perforce, Team Foundation Server, CVS, Razor, and/or any other version control manager. The external version control 190 may store files in a different format from the files that operate in the BI environment. For example, the external version control 190 may store files in a hierarchical database in a memory of the external version control. However, the BI environment may not be able to directly export BI Artifacts as files storable by the external version control (e.g., due to the structure of the BI Artifact, the BI Artifact may not be directly stored from the BI environment by the external version control as a file).

The SI system may be able to communicate with the BI environment(s) and the external version control. Thus, the SI system may retrieve a component of the BI environment (e.g., one or more BI Artifacts), transform the component of the BI environment from a first format to a second format, and transmit the component in the second format to the external version control for storage. The first format may be executable by the BI environment and/or the second format may not be executable by the BI environment. The first format may not be a format that may be stored in a memory of the external version control and/or the second format may be a format that may be stored in a memory of the external version control. In some implementations, the external version control may request that the SI system transmit a component of the BI environment to the external version control and/or may request that the SI system transmit a version of a component of the BI environment, stored in the external version control, from the external version control to one or more BI environments. For example, since due to the nature of a BI Artifact, the BI Artifact may not be directly stored as a file by the external version control, the SI system may transform the data such that a file may be generated based on the BI Artifact and this generated file may be stored and/or associated with the BI Artifact.

In various implementations, a ticket manager 195 may operate to manage workflow of one or more projects of the system 100. The ticket manager 195 may be communicably coupled to the SI system 180 and/or to one or more devices (e.g., user devices) through which users access the ticket manager. For example, the ticket manager may manage, issue, receive, and/or delete tickets that are associated with a project. A project may include tasks such as, but not limited to, altering BI Artifacts, resolving error messages, and/or generating BI Artifacts. A ticket may be approved (e.g., by an administrator and/or by a user completing the tasks in a project) and/or unapproved. A user may be assigned and/or may check-out tickets and perform one or more of the tasks in the project of the ticket. When the ticket is approved, the changes provided as a result of the project may be implemented by, for example, deploying altered BI Artifacts to the BI environment and/or updating the files stored by the external version control related to the BI Artifacts.

Figure 1B:
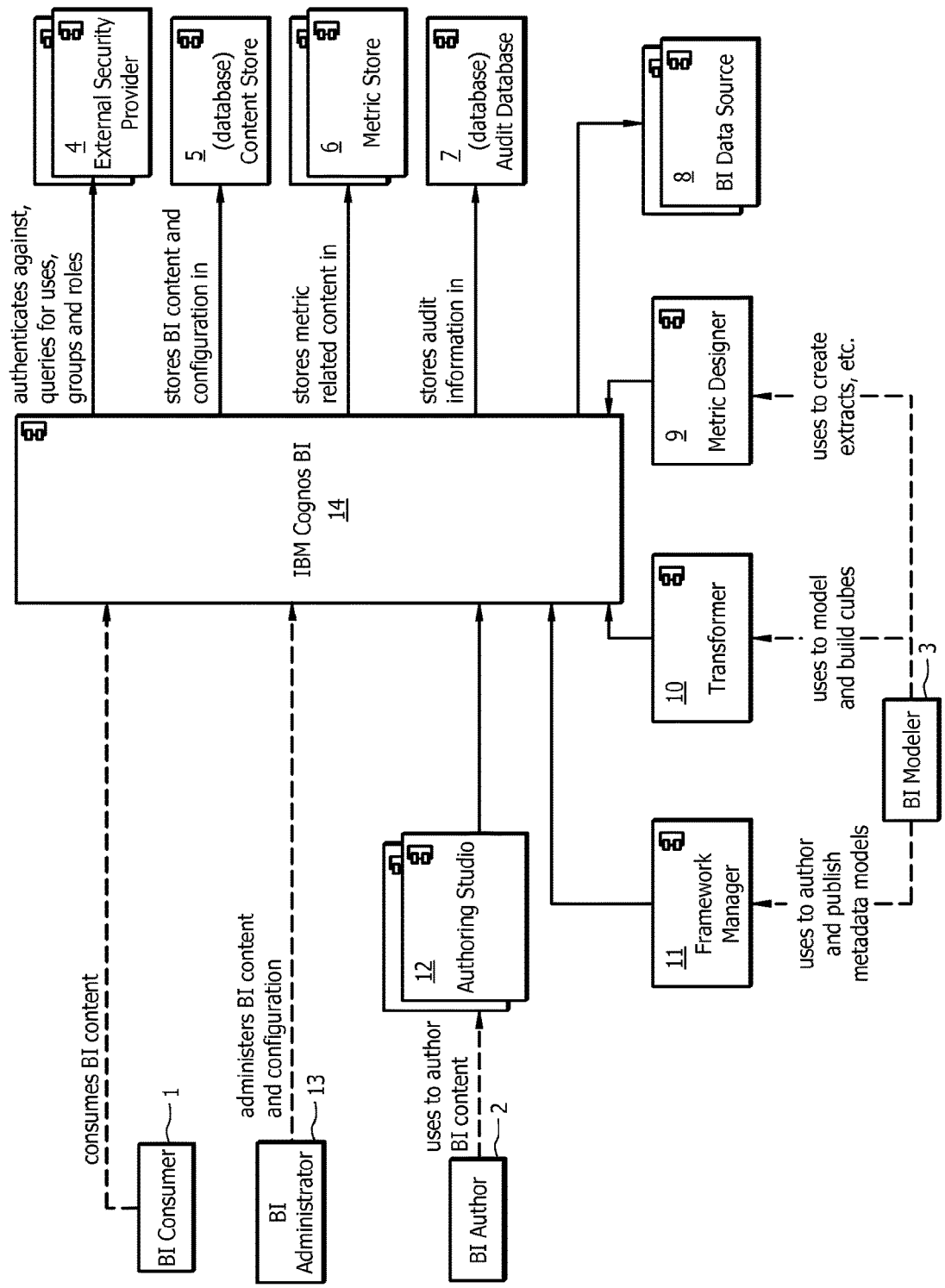
FIG. 1B depicts a simplified schematic illustration of example components of an implementation of a BI environment, namely, a UML (Unified Modeling Language) Component Diagram.
Figure 1C:
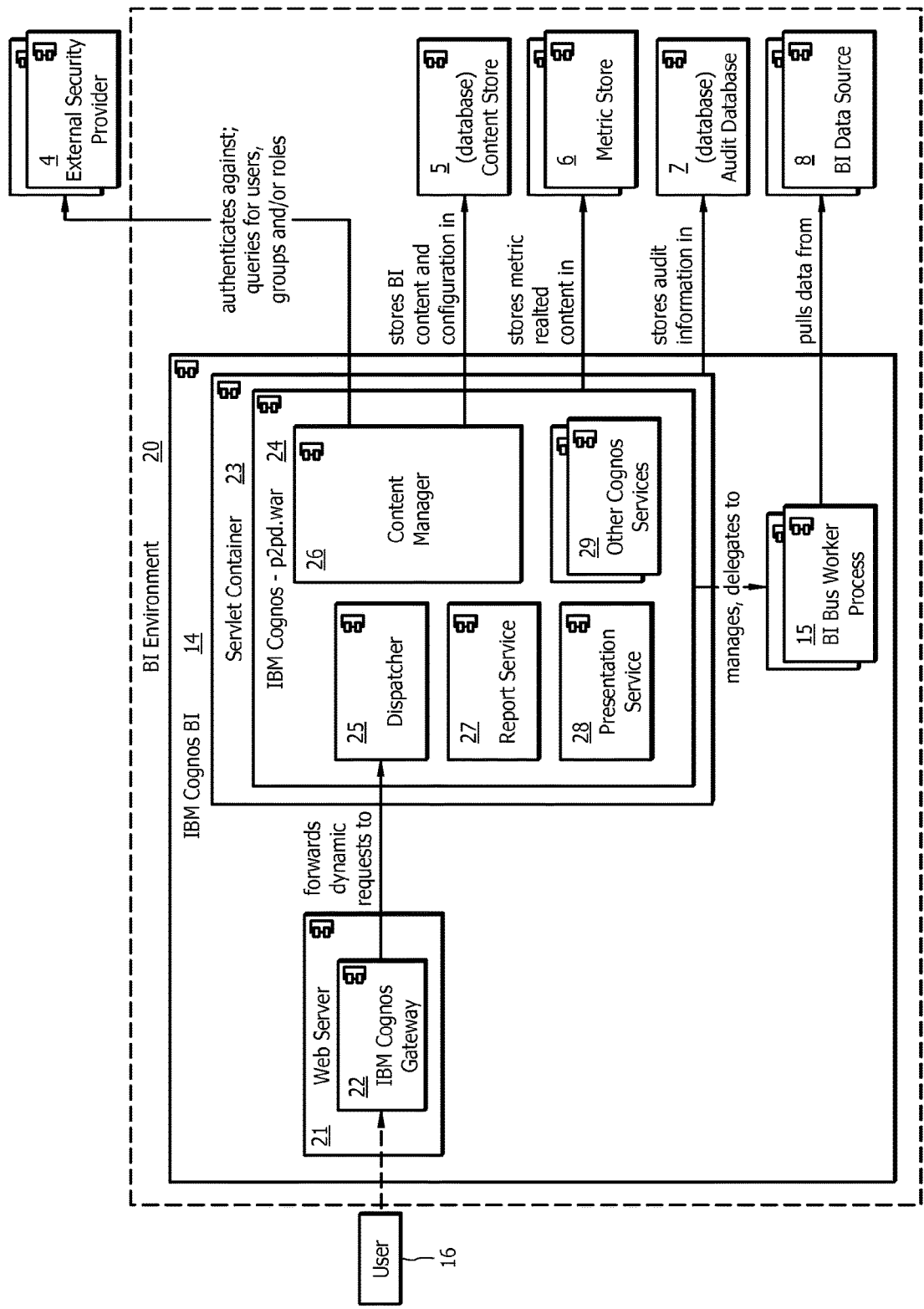
FIG. 1C depicts a schematic illustration of an expanded view of example components of an implementation of a BI environment, namely, a UML Component Diagram.
Figure 1D:
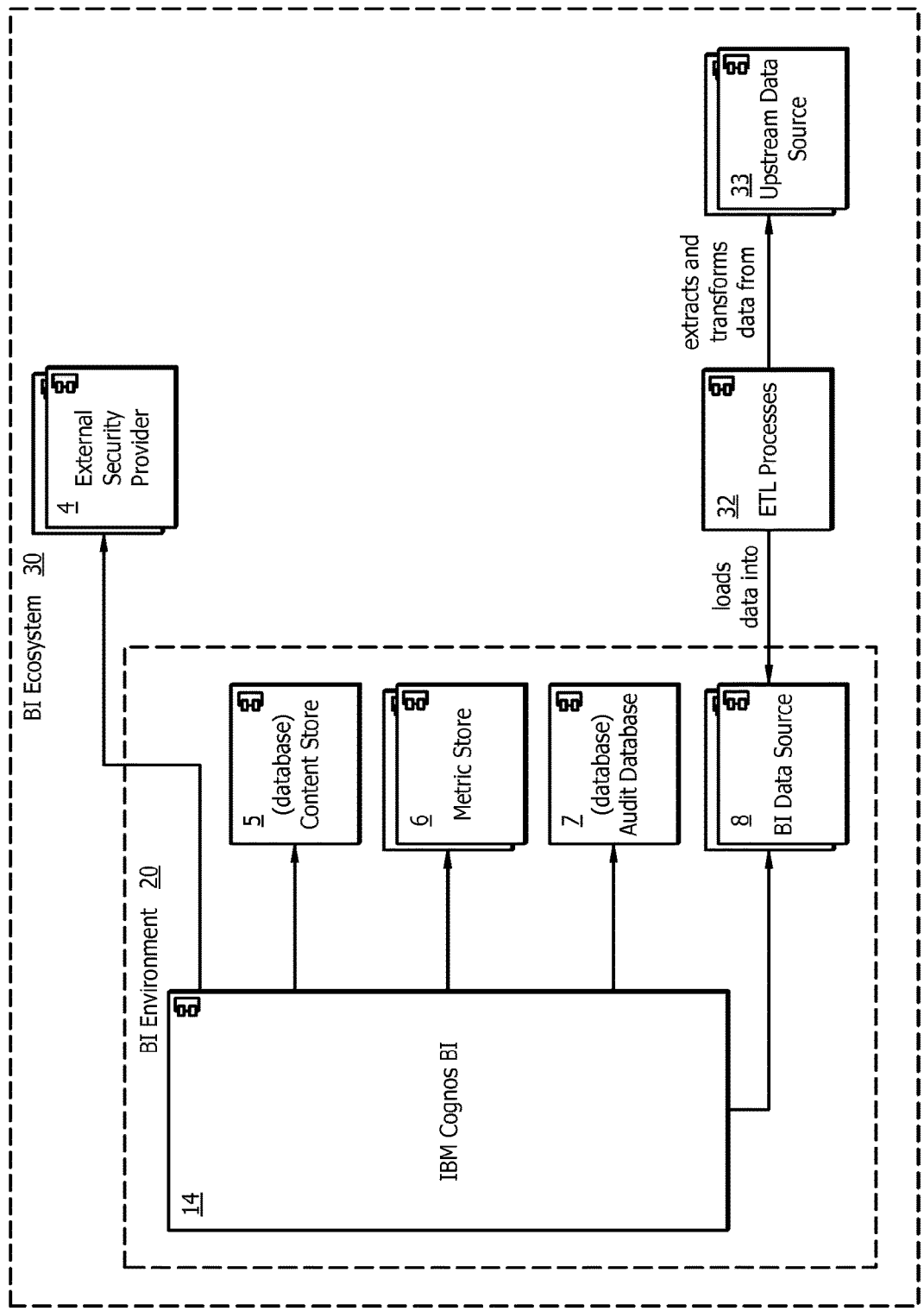
FIG. 1D depicts a schematic illustration of example components of an implementation of a BI ecosystem, namely, a UML Component Diagram.

FIGS. 1B through 1D are schematic illustrations of an implementation of an example BI ecosystem and various components. It should be understood that BI ecosystem and its components shown in FIGS. 1B through 1D are for illustrative purposes only and that any other suitable system or subsystem may be used in conjunction with, or in lieu of, the depicted BI ecosystem according to the described systems and processes.

FIG. 1B illustrates an implementation of a UML (Unified Modeling Language) Component Diagram that depicts a high level view of selected components in an example BI environment. An IBM Cognos BI environment is illustrated in FIG. 1B, but a BI environment utilizing BI software provided by any other appropriate software vendor (or open source BI software) may be utilized. In FIG. 1B, a single instance (i.e., single UML component) 14 of the BI software is depicted for the sake of simplicity. In some implementations, however, instance 14 may comprise a plurality of collaborating software processes running on a plurality of computers (e.g., Gateways, Application Servers, and/or BI Bus Processes in an IBM Cognos® based implementation).

To develop, maintain, and/or use a BI environment, several Users may be involved. As depicted in FIG. 1B, Users may include one or more BI consumers 1, BI administrators 13, BI authors 2, and BI modelers 3. The "Users" may include a discrete individual or a group/team of individuals such that there may be a plurality of BI consumers 1, a plurality of BI administrators 13, a plurality of BI authors 2, and/or a plurality of BI modelers 3. In some implementations, a User may perform the action(s) of more than one User and/or the User may be more than one category of User.

A BI consumer 1, one example category of User, may represent a consumer of information available in and/or produced by instance 14 of the BI software. Activities of a BI consumer 1 may include, but are not limited to: executing BI artifacts to examine the BI outputs; scheduling BI artifacts, such as reports, to be executed according to a selected frequency (e.g., every morning at 7:00 AM); requesting that generated report outputs be transmitted to BI consumer 1 (and/or other recipients) via a specified process of transmission (e.g., email); and/or viewing multiple BI outputs aggregated into different panes of a dashboard or workspace hosted within instance 14 of the BI software.

A BI administrator 13, an example category of User, may be responsible for administering the content and/or the configuration of instance 14 of the BI software. Activities of a BI administrator 13 may include, but are not limited to: changing tuning parameters; configuring BI data sources 8; mapping Users, groups and/or roles from an External Security Provider 4 to specific entitlements on content and/or capabilities in instance 14 of the BI software; mapping Users, groups and/or roles from an External Security Provider 4 to groups and/or roles in an internal Cognos security namespace; installing or upgrading instance 14 of the BI software; and/or otherwise administering the configuration and/or the content of instance 14 of the BI software.

BI author 2, an example category of User, may represent a BI professional and/or a "power User" who creates and/or updates BI content. The BI author 2 and/or a plurality of BI authors may be responsible for creating and/or updating new BI artifacts such as reports, queries, and/or analysis objects. BI author 2 may use vendor-supplied authoring studio(s) 12 when editing BI content. In some implementations in which IBM Cognos is used for the BI environment, different types of authoring studios 12 may be provided for different types of BI artifacts. For example, Report Studio may be used to edit reports, Analysis Studio may be used to author analyses, Business Insight Advanced may be used to author dashboards, Event Studio may be used to author events, Cognos Insight may be used to author BI artifacts and/or other suitable authoring studios may be used for additional BI artifacts.

BI modeler 3, another category of User, represents a BI professional (e.g., a power User) who creates and/or updates foundational BI content. BI modeler 3 may be generally responsible for building and/or publishing models upon which other BI artifacts are created. Examples of such models may include, but are not limited to: metadata models (e.g., both framework models and their associated packages), models used to generate OLAP cubes, metrics extracts and/or scorecards, and/or any other suitable models. In some implementations, a single individual may perform the role of both BI modeler 3 and BI author 2. In some implementations, in which IBM Cognos is used for the BI environment, different modeling tools may be provided for authoring different types of models. For example, Framework Manager 11 may be used to author framework models (e.g., offline) and/or publish slices of these models (e.g., "packages") to instance 14 of the IBM Cognos BI software. Transformer 10 may be used to author models that are used to build OLAP cubes and/or other modeling tools may be used to build additional models, as appropriate.

Instance 14 of the BI software depicted in FIG. 1B may be configured to authenticate Users against one or more External Security Providers 4. For example, External Security Providers 4 may include Microsoft Active Directory, LDAP or Netegrity SiteMinder, NTLM, and/or any other suitable external security providers. In some implementations, in addition to authenticating Users against an External Security Provider 4, an instance 14 of BI software of FIG. 1B may also discern some or all of an authenticated User's group and/or role membership from the External Security Provider 4. Instance 14 of the BI software of FIG. 1B may query an External Security Provider 4 for information such as Users, groups, roles and/or organizational hierarchies. For example, BI administrator 13 may define permissions on BI content and/or capabilities, or define group and/or role membership by mapping from an External Security Provider 4 to an internal security namespace.

Instance 14 of the BI software may store content and/or configuration data in a Content Store database 5. For example, the Content Store Database 5 may store various BI artifacts, configurations, and/or content, such as packages (e.g., metadata models or portions thereof), report specifications, report outputs (e.g., by default and/or by User selection), folder structure, dashboards, portal pages, configurations, and/or User profiles and/or preferences. In some implementations, certain configuration data may be maintained in Content Store database 5, and additional configuration data may be stored on the file system(s) of the computer(s) hosting instance 14 of the BI software (e.g., XML configuration files, property files, xsd files, xslt files, etc.).

Instance 14 of the BI software may store metric related information in one or more Metric Stores 6.

Instance 14 of the BI software may further log "audit information" to an optionally configured audit database 7. Audit information may include historical audit data including, but not limited to, information on: User sessions, User actions, which BI artifacts have been executed in the system (e.g., including information about how the BI artifacts were executed and/or by whom), and/or any other suitable historical data. Instance 14 of the BI software may be configured to log this type of audit information at various levels and to various destinations (e.g., local log files and/or an audit database).

Instance 14 of the BI software may query for data stored in one or more BI data sources 8. BI data source 8 may include any one or more of a plurality of data store types that the BI environment may utilize. For example, relational databases (e.g., Oracle 11g, Microsoft SQL Server, and/or IBM DB2), ODBC data sources, OLAP cubes, flat files, XML files, web services, and/or physical and/or virtualized data sources (e.g., Composite Information Server®).

FIG. 1C illustrates an implementation of a UML (Unified Modeling Language) Component Diagram that depicts a more detailed view of an example BI environment—more particularly, FIG. 1C illustrates BI environment 20, which is an expanded view of instance 14 of the BI software in FIG. 1B. As in FIG. 1B, an IBM Cognos BI environment is shown as an example but a BI environment utilizing the BI software provided by any other appropriate BI vendor would be equally applicable. Also as in FIG. 1B, a single instance (i.e., single UML component) 14 of the BI software is depicted in FIG. 1C for the sake of simplicity. In some implementations, however, instance 14 may comprise a plurality of collaborating software processes running on a plurality of computers.

BI environment 20 depicted in FIG. 1C may include instance 14 of the BI environment (e.g., an IBM Cognos BI environment), its associated Content Store database 5, associated metrics store databases 6, an optional audit database 7, and/or BI data sources 8.

Figure 1E:
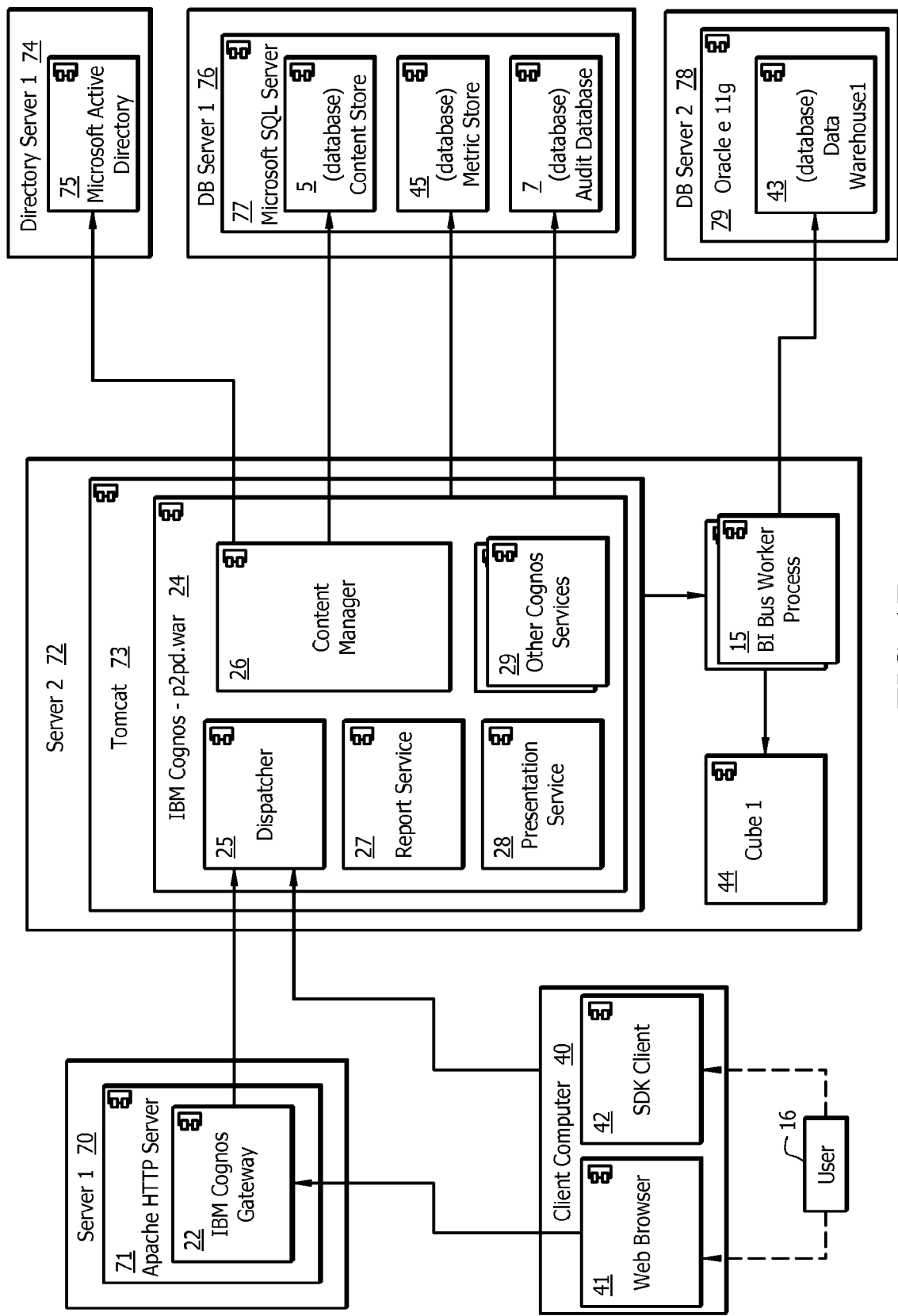
FIG. 1E depicts a schematic illustration of an example deployment of an implementation of a BI environment, namely, a UML Deployment Diagram.

An instance of a BI environment may be configured and deployed in many variations. For example, the instance of the BI environment may be hosted on single or multiple servers, configured with single or multiple gateways, configured with single or multiple servlet containers/application servers, and/or any other suitable configurations. While FIG. 1C depicts a single set of the components and FIG. 1E depicts one way to deploy this single set of components, various implementations may use different appropriate configurations deployed in different manner(s).

In some implementations, instance 14 may be divided into two tiers—the web tier and the application tier. The web tier may include a gateway 22 of the BI environment that may be hosted in a web server 21, such as Apache's HTTP Server or Microsoft's IIS, for example. The application tier may include a web application 24 and/or a BI Bus Worker Process 15. A web application 24 is depicted as p2pd.war and may be hosted in an application server and/or servlet container 23 (e.g., IBM Websphere Application Server or Apache Tomcat). Zero or more BI Bus Worker Processes 15 may be managed by p2pd.war 24.

Webserver 21 may handle incoming HTTP requests that are generated by a web browser and/or some other HTTP based client. While the term "HTTP requests" is used herein, any suitable protocol can be utilized, including but not limited to HTTP protocol, HTTPS protocol, SPDY protocol, and/or any other suitable alternative to HTTP. Gateway 22 may be responsible for serving static web content such as, HTML, CSS, JavaScript, images of various formats, and/or any other suitable static content. This static content may constitute at least a portion of the web interfaces of the BI environment. Examples of such web interfaces may include Cognos Connection, authoring studios 12, and/or any other suitable web interfaces. Gateway 22 may be responsible for forwarding certain HTTP requests to the dispatcher 25 that is hosted inside p2pd.war 24 of the BI environment.

p2pd.war 24 may be responsible for managing and/or orchestrating much of the behavior of instance 14 of the BI software, such as, rendering dynamic content (e.g., as shown in Cognos Connection), in response to an HTTP request from a browser based client; responding to requests to execute BI artifacts, such as reports; initiating scheduled activities, such as scheduled report execution; initiating delivery of the generated report outputs; and/or any other suitable actions. p2pd.war 24 may host service(s) and/or component(s) including, but not limited to the following examples:

1. Dispatcher 25, which may be responsible for routing incoming requests to their appropriate target.
2. Report service 27, which may be responsible for servicing various BI artifact execution related requests.

BI Artifact execution related requests may be delegated in whole or in part to BI Bus Worker Process 15. The BI Bus Worker Processes 15 may be responsible for performing queries, aggregating results, etc.

3. Presentation service 28, which may be responsible for rendering various visual representations used in interface screens and/or components for transforming generic XML responses from other services into an output format such as HTML or PDF.

4. Content manager 26, which may be responsible for serving as access point for objects that live in Content Store database 5. Operations may include add, query, update, delete, move and/or copy. The content manager 26 may be responsible for import and/or export of content and/or archives; and/or may serve as the conduit for authentication requests for interacting with External Security Provider(s) 4.

5. Other BI services 29 which may represent the numerous other services that are or may be deployed inside of p2pd.war 24. Services may include agent service, batch report service, data movement service, delivery service, event management service, job service, log service, metric studio service, migration service, planning job service, planning web service, planning administration console service, planning data service, system service, and/or any other suitable services.

As noted, FIG. 1C depicts an IBM Cognos BI environment as an example. As such, reference to IBM Cognos documentation, such as the "IBM Cognos Business Intelligence Version 10.1.1 Architecture and Deployment Guide" as well as Version 8.4.1, is hereby incorporated by reference (to the extent that it does not conflict with the described systems and processes) and may help to further describe details of the UML Component Diagram of FIG. 1C (available at "Cognos Business Intelligence Version 10.1.1 Product Documentation." IBM. N.p., n.d. Web. 22 October 212. <http://www-01.ibm. com/support/docview.wss?uid=swg2721353>; and "Cognos 8 Business Intelligence Version 8.4.1 Product Documentation." IBM. N.p., n.d. Web. 22 October 212. <http://www-01.ibm.com/support/docview.wss?uid=swg2722336>.).

Certain services in p2pd.war 24 may delegate to BI Bus Worker Process 15, which may be responsible for querying, aggregating, and/or summarizing data stored in one or more BI data sources 8.

As depicted in FIG. 1C, User 16 may be a generic classification for a User of instance 14 of the BI software. As noted with reference to FIG. 1B, User 16 may be a BI consumer 1, a BI administrator 13, a BI author 2, a BI modeler 3, and/or some other category of User of the system. In some implementations, User 16 may interact with instance 14 of the BI software via a web browser and the web browser, in turn, issues HTTP or HTTPS requests to the gateway 22. In some implementations, a User 16 may use a tool that targets requests directly at Dispatcher 25 (e.g., a tool that utilizes a Software Development Kit (SDK) from the relevant BI vendor to issue SOAP (simple object access protocol) requests or other remote requests and/or a tool that directly issues raw SOAP requests and/or other remote requests which are targeted at remotely accessible services exposed by instance 14 of the BI software).

FIG. 1D illustrates an implementation of a UML Component Diagram that depicts a high level view of selected components in an example BI ecosystem 30. As illustrated in FIGS. 1B and 1C, a single instance 14 of the BI software is depicted; however, in other implementations, instance 14 may comprise a plurality of collaborating software processes running on a plurality of computers. In some implementations, depiction of instance 14 may include more than one UML component.

The BI Ecosystem 30 may include the BI environment 20, data sources accessed by the BI environment, external security provider 4, ETL processes 32 which load the data into the BI Data sources 8, and/or Upstream Data sources 8, from which the ETL Processes pull data. BI environment 20 may include instance 14, an associated Content Store database 5, associated metrics store databases 6, an optional audit database 7, and/or BI data sources 8 (e.g., a variety of data source types, such as relational database, OLAP cubes, flat files, XML files, web services, and/or other physical and/or virtual data sources).

In some implementations, Upstream data sources 33 may include sources of data not intended for direct use by instance 14 such as, databases that support OLTP systems, databases conceived and/or used for other purposes, databases not designed for efficient access by BI systems, data sources that contain data duplicative of other data accessible by instance 14, data sources that contain data that must be transformed to increase its usefulness when accessed by instance 14, flat files and/or data exports from other systems, and/or various other sources of data not directly accessible by instance 14 (e.g., for either technical or non-technical reasons).

ETL (extract, transform, and/or loading) processes 32 may be responsible for extracting and/or transforming data from one or more upstream data sources 33, and pushing the data into one or more BI data sources 8 (e.g., operational data sources and/or data warehouses). ETL processes 32 may be implemented using third party ETL software (e.g., Informatica Power Center, IBM InfoSphere DataStage, IBM Cognos Data Manager, Talend Open Studio and/or Microsoft SQL Server Integration Services) and/or via software programs written in a selected programming/scripting language. In some implementations, both third party ETL software and custom ETL program(s) may be used in combination.

BI ecosystem 30 may include BI environment 20, External Security Provider(s) 4, and/or a set of ETL processes 32 and/or upstream data sources 33.

Figure 1F:
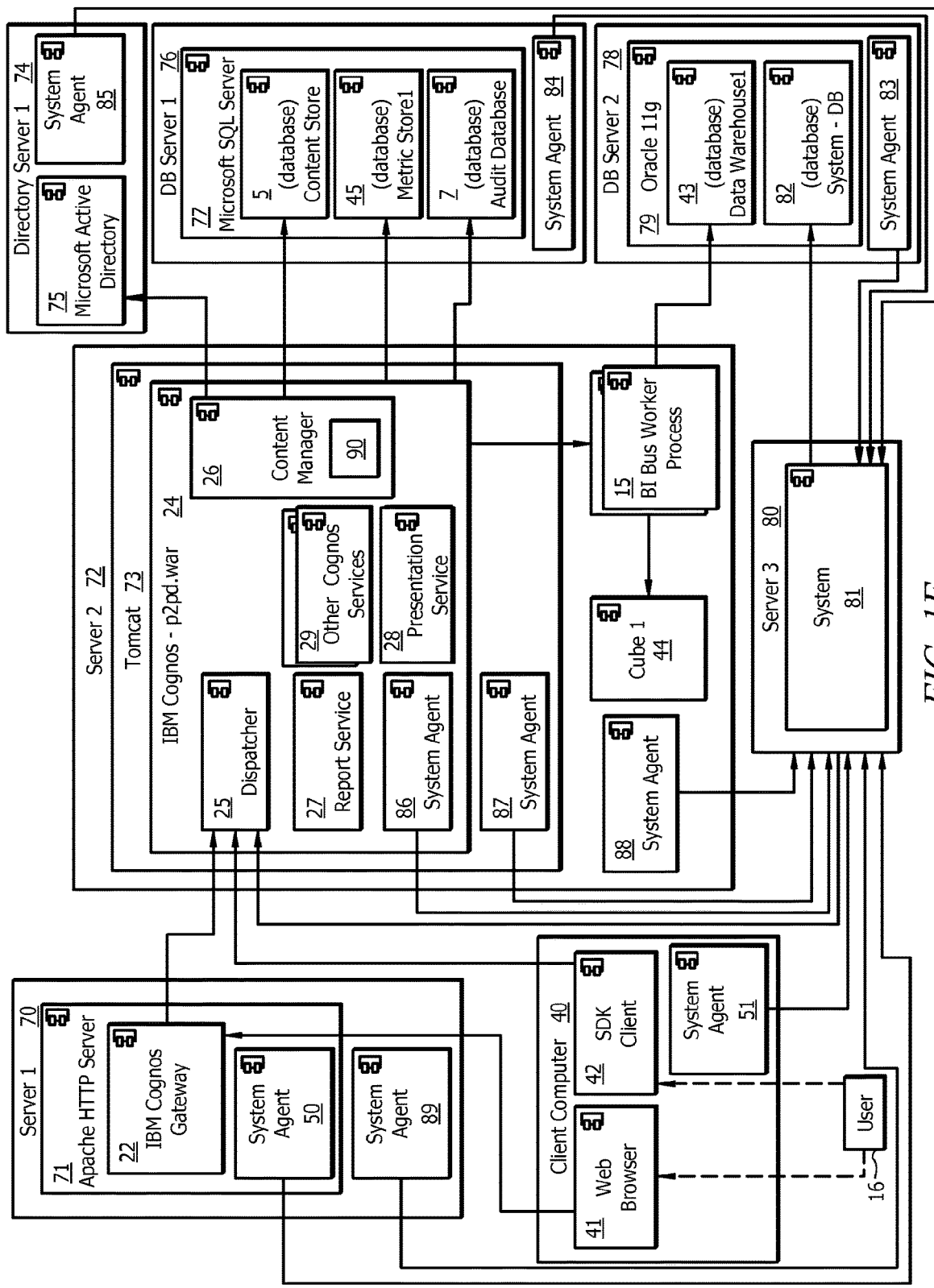
FIG. 1F depicts a schematic illustration of an example deployment of an implementation of a BI environment and system, namely, a UML Deployment Diagram.

FIGS. 1E and 1F are schematic illustrations of an implementation of an example deployment of a BI environment and various components. It should be understood that BI ecosystem, and the deployment thereof, shown in FIGS. 1E and 1F are for illustrative purposes only and that any other suitable system or subsystem could be used in conjunction with, or in lieu of, the described BI ecosystem.

FIG. 1E illustrates an implementation of a UML Deployment Diagram that depicts a high level view of an example of how a portion of the components of the BI environment 20 may be deployed on one or more physical computers.

Addressing first the client side components depicted in FIG. 1E, User 16 may utilize client computer 40 to access a BI environment and an instance of a BI software. Client computer 40 may host a web browser 41 and an SDK client 42.

Web browser 41 may be directed by User 16 to issue requests (e.g., HTTP requests) to Gateway 22, which is hosted in Apache HTTP server 71, running on server 1 70. The Gateway 22 may forward the requests or at least a portion of the requests to the Dispatcher 25, in some implementations. When utilizing web browser 41 to access instance 14, various components of instance 14 may be depicted and utilized from web browser 41 including, but not limited to, authoring studios 12, BI dashboards, BI prompt screens, BI outputs, BI administration screens, and/or any other suitable information generated by or pertaining to instance 14.

SDK client 42 may be an example of any client program that issues SOAP requests and/or other remote invocation requests. These SOAP requests may be frequently targeted directly at dispatcher 25. In some implementations in which IBM Cognos is used for the BI environment, examples of SDK client 42 may include certain modeling tools provided by IBM Cognos such as framework manager 11, transformer 10, and/or metrics designer 9. In some implementations in which third party tools are used (e.g., instead of and/or in addition to those provided by IBM Cognos), examples of SDK client 42 may include third party tools that utilize SOAP requests and/or other remote invocation requests to access and/or manipulate content and/or configurations in instance 14 and/or orchestrate various activities in instance 14. Although not shown in FIG. 1E, in some implementations, SDK client 42 may issue requests to gateway 22.

Now addressing the server side components depicted in FIG. 1E, Apache HTTP server 71 may be an implementation of web server 21 depicted in FIG. 1C. Tomcat 73 may be an implementation of servlet container 23 depicted in FIG. 1C. Cube 1 44 and Data Warehouse1 43, alone or together, may be implementations of BI data sources 8 depicted in FIG. 1C.

In some implementations as illustrated in FIG. 1E, server 1 70 may run Apache HTTP server 71, which is configured with gateway 22. Gateway 22 may be configured to serve static content deployed on a file system accessible to Apache HTTP server 71 processes. Gateway 22 may recognize one or more instances of dispatcher 25. Although depicted in FIG. 1E as a single instance of dispatcher 25, a plurality of instances of dispatcher 25 may be used. In some implementations, at least a portion of the requests targeted at gateway 22 (e.g., requests for non-static content) may be forwarded to dispatcher 25 for processing.

As depicted in the implementation of FIG. 1E, Tomcat 73 (a servlet container) may be a process that can run on server 2 72. The p2pd.war 24 web application may also be deployed and run inside of Tomcat 73. In some implementations, zero or more instances of BI Bus Worker Process 15 may run on server2 72. The p2pd.war 24 web application may manage and/or delegate processes to BI Bus Worker Process 15. BI Bus Worker Process(es) 15 may be used to access data from data warehouse1 43 (e.g., an Oracle Database 79) and/or Cube 1 44.

The directory server 1 74 may host Microsoft active directory 75, which is an implementation of an external security provider (e.g., External Security Provider 4 depicted in FIG. 1C). Content manager 26 may interact with Microsoft active directory 75 for operations such as authentication requests, enumerating lists of Users, groups, roles and/or organizational hierarchy structures, and/or querying for Users, groups and/or roles (e.g., that match predetermined criteria).

The DB server 1 76 may be a server that hosts an instance of Microsoft SQLServer 77. The instance of Microsoft SQLServer 77 may host database(s) that are utilized by instance 14, including, but not limited to, the p2pd.war 24 component of instance 14. The databases may include the Content Store database 5, Metric Store database 45, and/or audit database 7. Moreover, content manager 26 may access, store, and/or manipulate BI content and/or configuration in Content Store database 5. The p2pd.war 24, and/or components or delegates thereof, may store and/or access metric related data in Metric Store database 45 and may store and/or access audit data in audit database 7. DB server 2 78 may host an instance of Oracle 11g 79 and this instance of Oracle 11g 79 may host data warehouse1 database 43 (e.g., a database schema). The BI Bus Worker Process 15 may access data in the Data warehouse1 database 43.

FIG. 1F illustrates an implementation of a UML Deployment Diagram that depicts a high level view of an example of how BI environment 20 may potentially change when the described system(s) and/or process(s) are implemented and/or configured.

System 81 (e.g., SI system) depicts an implementation of the described system(s) and process(s). As illustrated in FIG. 1F, system 81 may be hosted on server 3 80 (e.g., system 81 may include instructions that when executed by the processor of server 3 80 perform one or more of the described operations). The system 81 may be communicably coupled (e.g., directly coupled and/or indirectly coupled through a network connection) with component(s) of the BI ecosystem and/or system agent(s). System 81 may orchestrate one or more modules (e.g., instructions stored on a memory and that when executed by a processor perform one or more of the described operations), such as one or more of system agents 50-51 and 83-90. The described systems and/or processes are not limited to any particular number or type of system agents, and any suitable number and/or type of system agents may be orchestrated by system 81. One or more of system agents 50-51 and 83-90 may be utilized to collect, record (e.g., store on a memory coupled to the system and/or remote from the system such as an external version control), and/or transmit statistics, such as resource usage, server load, and/or network traffic on any one or more components of BI environment 20 or BI ecosystem 30. One or more of system agents 50-51 and 83-90 may also be utilized to intercept, accept, transmit, restrict transmission, and/or record (e.g., on a memory coupled to the system and/or external to the system, such as an external version control) communication requests issued by and/or targeted to components of BI environment 20 or BI ecosystem 30. Module(s) (e.g., instructions executed by processor(s) of the SI system) such as the described system agent(s) may perform and/or facilitate (e.g., collaborate, assist, and/or be involved in) one or more of the operations as described in FIGS. 3A, 3B, 4, 5, 6, and/or 7. Although FIG. 1F illustrates one example configuration of the deployment of system agents, system agents may be deployed inside and/or alongside any of the components or servers in the BI ecosystem, as appropriate.

In some implementations, system 81 may direct one or more of the system agents 50-51 and 83-90 remotely by instructing them to perform operations such as: start recording, stop recording, transmit recorded data, respond to queries regarding recorded data or local environment, purge recorded data, update configuration, list configuration, shutdown, reset, recalibrate and/or initialize. One or more of system agents 50-51 and 83-90 may be deployed on the various computers hosting components related to BI ecosystem 30 and/or inside container components that are related to BI ecosystem 30. The locations and/or configurations of system agents depicted as 50-51 and 83-90 in FIG. 1F are illustrations of an implementation of the described systems and processes; however, and any appropriate location and/or configuration may be utilized.

In some implementations, system agent 50 (e.g., when executed by a processor) may monitor and/or record data, such as requests and timings, residing within Apache HTTP server 71.

In some implementations, system agent 51 (e.g., when executed by a processor) may monitor and/or record relevant data such as resource usage, machine load, and network traffic and requests on a client side computer 40 that is utilizing BI environment 20 or viewing outputs produced from BI environment 20.

In some implementations, system agent 83 may (e.g., when executed by a processor) monitor and/or record data such as resource usage, server load and network traffic on DB server 2 78.

In some implementations, system agent 84 may (e.g., when executed by a processor) monitor and/or record data such as resource usage, server load and network traffic on DB server 1 76. For example, the system agent 84 may intercept communications, such as database queries. Intercepting communications (e.g., using a system agent, such as system agent 84) may include receiving communications and allowing the communications to pass to the recipient of the communications; reading the contents of communications as the communications travel to the recipient of the communications; acting as an intermediary for requests; and/or acting in place or in conjunction with a database driver, such as JDBC, Oracle ODBC, and/or SQL Server driver. The system agent 84 may intercept queries transmitted from the content manager 26 to the content store database 5. In some implementations, the content manager 26 may transmit a query to a content store database 5 using a database driver, and the database driver may process the query and transmit the results of the query to the content manager 26. The system agent 84, in some implementations, may intercept communications transmitted by the content manager 26 prior to the communications being received by the database driver. The system agent 84 may analyze the communications to determine if a change (e.g., an update to BI Artifact(s)) is included in the communications). The system agent 84 may be able to identify communications that cause changes and communications that do not cause changes to BI Artifact(s) (e.g., by comparing the communication to listing(s) of communications that cause and/or do not cause changes and/or by identifying the type of communications). For example, the system agent may determine that a change has occurred when a communication that includes a Delete query is identified in the communication and/or may determine that a change has not occurred when a Select query is identified in the communication.

The system agent may transmit a notification to the system 81 (e.g., system agent 84) that a change has been identified. The notification may include the BI Artifact(s) associated with the change and/or the contents of the change (e.g., modified reference to a file path). The system 81 (e.g., system agent 84) may transmit the identification of a change to other systems, may record the identification of the change (e.g., in association with a version of the BI Artifact(s)), may transmit the change to the external version control and/or other repository for storage; may allow (e.g., execute or cause to be executed) one or more conflict assistance tests; and/or present results based on the conflict assistance test(s) to a user. For example, the system 81 may receive the notification, from system agent 84, that includes a location of the BI Artifact(s). The system 81 (e.g., system agent 84) may retrieve the BI Artifact from the BI environment (e.g., using SDK calls in a Cognos BI environment). The system 81 may update the copy of the BI Artifact in the external version control based on the identified changes to the BI Artifact and commit (e.g., save) the changes to the external version control. By committing the change to the copy of the BI Artifact in the external version control, a record of changes may be managed and/or maintained.

In some implementations, intercepting the communications prior to the communication being received by the database driver, the system agent 84 may allow the system 81 to identify changes that may not be identified from BI Bus communications and/or user requests (e.g., via interfaces of the BI environment). For example, a system job may update objects to the content store, such as an upgrade (e.g., alter a report specification to a different version) by the content manager 26 through the content store database 5. Since the content manager 26 has direct access to the content store database 5, the content manager 26 may directly communicate changes with the content store database 5 rather than transmitting messages to the BI Bus Worker Process 15. In some implementations, identifying changes based on the intercepting of communications to a database driver may identify some identical changes identified from user requests. The system 81 may determine if a change identified from intercepted communications is identical to a change identified from user requests (e.g., by comparing the change identified from the intercepted communication to other changes identified by the system 81). The system 81 may restrict updating the copy of the BI Artifact in the external version control and/or may restrict committing the change to the external version control if the system determines that the change is an identical change.

In some implementations, system agent 85 (e.g., when executed by a processor) may monitor and/or record data such as resource usage, server load and network traffic on directory server 1 74.

In some implementations, SI system agent 86 (e.g., when executed by a processor) may monitor and/or record data such as process calls (e.g., including the corresponding context and timings thereof), resource usage, and/or other suitable data residing within p2pd.war 24.

In some implementations, SI system agent 86 (e.g., when executed by a processor) may receive messages directed to content manager 26. Messages may be received from any other service in web application 24, for example, dispatcher 25. Messages may also be received from another application running on server 2 72 or another server. SI system agent 86 receives the messages directed to content manager 26 and identifies particular content in the messages. In one illustrative embodiment, SI system agent 86 identifies the type of operation to be performed by content manager 26, as requested by the sender of the message.

The SI system agent 86 may identify the content in Content Store database 5 to which the operation is to be performed. For example, SI system agent 86 may be configured to identify messages directed to content manager 26 that include a request to create, update or delete content in Content Store database 5. SI system agent 86 may identify other operations and/or other types of messages directed to content manager 26 in other illustrative embodiments.

When SI system agent 86 identifies a message that matches a predefined type of message, SI system agent 86 generates a notification containing information from the message and/or information derived from the message. For example, SI system agent 86 may identify a message directed to content manager 26 requesting that content manager 26 update metadata about an object in Content Store database 5. SI system agent 86 receives the message and determines whether SI system agent 86 is configured to generate a notification based on the message. In one illustrative embodiment, SI system agent 86 identifies messages that request content manager 26 modify and/or delete an object in Content Store database 5. In such an illustrative embodiment, SI system agent 86 identifies the object in the message that is to be modified and how the object is to be modified. SI system agent 86 then generates a notification with the type of operation, the object to be modified, and the new metadata to be saved.

SI system agent 86 may then retransmit the message to content manager 26. In some implementations, SI system agent 86 may not retransmit the message and/or inhibit content manager 26 from receiving the message (e.g., restrict transmission of the message). In some implementations, SI system agent 86 may retransmit the message to another server, module, or other similar entity.

The SI system agent 86 may send the notification to system 81 on server 3 80 when SI system agent 86 generates such a notification. In some implementations, the SI system agent 86 may notify multiple servers from a predefined group of servers, another module in web application 24, a module in Tomcat 73, or another such entity.

In some implementations, the SI system agent 87 (e.g., when executed by a processor) may monitor and/or record data relevant to hosted components, services, requests and/or other data within Tomcat 73.

The SI system agent 87 may receive requests for information, in some implementations. The information requested may include connection information for establishing a connection with system 81, information for identifying web application 24 when communicating with system 81, and other such information. For example, the connection information may include a URL for accessing system 81 and an identifier for web application 24 that identifies web application 24 to system 81.

When a request for information is received from SI system agent 87, SI system agent 87 provides the requested information. In some implementations, the SI system agent 87 verifies an authentication and/or an authorization for the requestor. In other illustrative embodiments, SI system agent 87 includes a proxy component. The proxy component in SI system agent 87 receives a request for information in system 81 from a requestor. In such illustrative embodiments, SI system agent 87 may forward at least a portion of the request for information to system 81. SI system agent 87 may then receive a response from system 81 and return at least a portion of the response to the requestor.

In some implementations, system agent 88 (e.g., when executed by a processor) may monitor and/or record data such as resource usage, server load and network traffic on server 2 72. The system agent 88 may intercept communications from the BI Bus Worker Process 15. For example, BI Bus messages may be intercepted by the system agent 88 prior to being transmitted to the content manager 26. The intercepted communications (e.g., BI Bus messages) are transmitted by the system agent 88 to the system 81. The system 81 may determine whether a change to a BI Artifact has occurred based on the intercepted communications. If the system 81 determines that a change has occurred, the system (e.g., the SI system) may commit the change to the external version control (e.g., by applying the change to a copy of the BI Artifact and committing the change to the external version control).

In some implementations, the system agent 89 (e.g., when executed by a processor) may monitor and/or record data such as resource usage, server load and network traffic on server 1 70.

In some implementations, the system agent 90 (e.g., when executed by a processor) may monitor and/or record data such as resource usage, server load and network traffic within the content manager 26. The system agent 90 may intercept messages, in some implementations, from the content manager 26 and/or that were transmitted in an interface of the content store database 5. By intercepting messages from the content manager 26 and transmitting the intercepted messages to the system 81, the system may be able to process the change before allowing the change in the BI environment. Thus, the system agent 90 may intercept a communication and transmit the communication to the system 81 prior to allowing the intercepted communication to be transmitted by the BI environment and/or prior to the change being applied in the BI environment. The system 81 may determine whether the intercepted communications include a change (e.g., by comparing the intercepted communication to listing(s) of communications associated with changes or not associated with changes and/or by identifying the type of communication). The system 81 may perform conflict assistance test(s) and/or may attempt to commit the identified change(s) to an external version control. The system 81 may present notification(s) (e.g., graphical, auditory, and/or textual) to a user based on result(s) from the conflict assistance test(s) and/or the attempt to commit the identified change to the external version control. For example, if a conflict is identified (e.g., based on a conflict notification such as an error message from the external version control and/or based on results from conflict assistance test(s)), then the user may be prompted and/or requested to resolve the conflict and/or the transmission of the intercepted communication to one or more components of the BI environment (e.g., based on BI system node processing) may be restricted.

In some implementations, a system agent (not shown) may allow communications with an external version control. The system 81 may direct the system agent to perform operations such as monitoring and/or recording data relevant to hosted components, services, requests and/or other data within the BI environment. The system agent may retrieve BI Artifact(s), retrieve version(s) of BI Artifact(s), transmit changes to the external version control, commit changes to BI Artifact(s) to the external version control, receive communications (e.g., requests for deployments, conflict notifications, etc.), facilitate versioning of BI Artifact(s), and/or any other appropriate operation. By allowing the system 81 (e.g., SI system) to manage communications with an external version control, the external version control may be allowed to version and/or manage versioning of components of the BI environment (e.g., BI Artifact(s)) that may not be able to be directly versioned from the BI environment (e.g., due to formatting differences, communication protocol differences, etc.)).

In some implementations, system 81 (e.g., when executed by a processor, such as the processor of server 3 80) may monitor and/or record persistent information such as content, configuration, history and/or statistics in system DB database 82. The data monitored and/or recorded by the system agent(s) may be delivered to and/or stored in a memory (e.g., coupled to the system and/or of the system).

In some implementations, system 81 and/or portions thereof (e.g., modules of the system) may render a User experience for the described system(s) and process(es), respond to User input for various User interactions with the described system(s) and process(es), including but not limited to the described User interactions; execute and/or orchestrate tests; perform and/or orchestrate analysis of selected BI content or BI configuration; and/or perform other operations disclosed (e.g., operations described in FIGS. 3A-7 and/or other operations and/or combinations of operations) as part of the described system(s) and process(es).

Figure 1G:
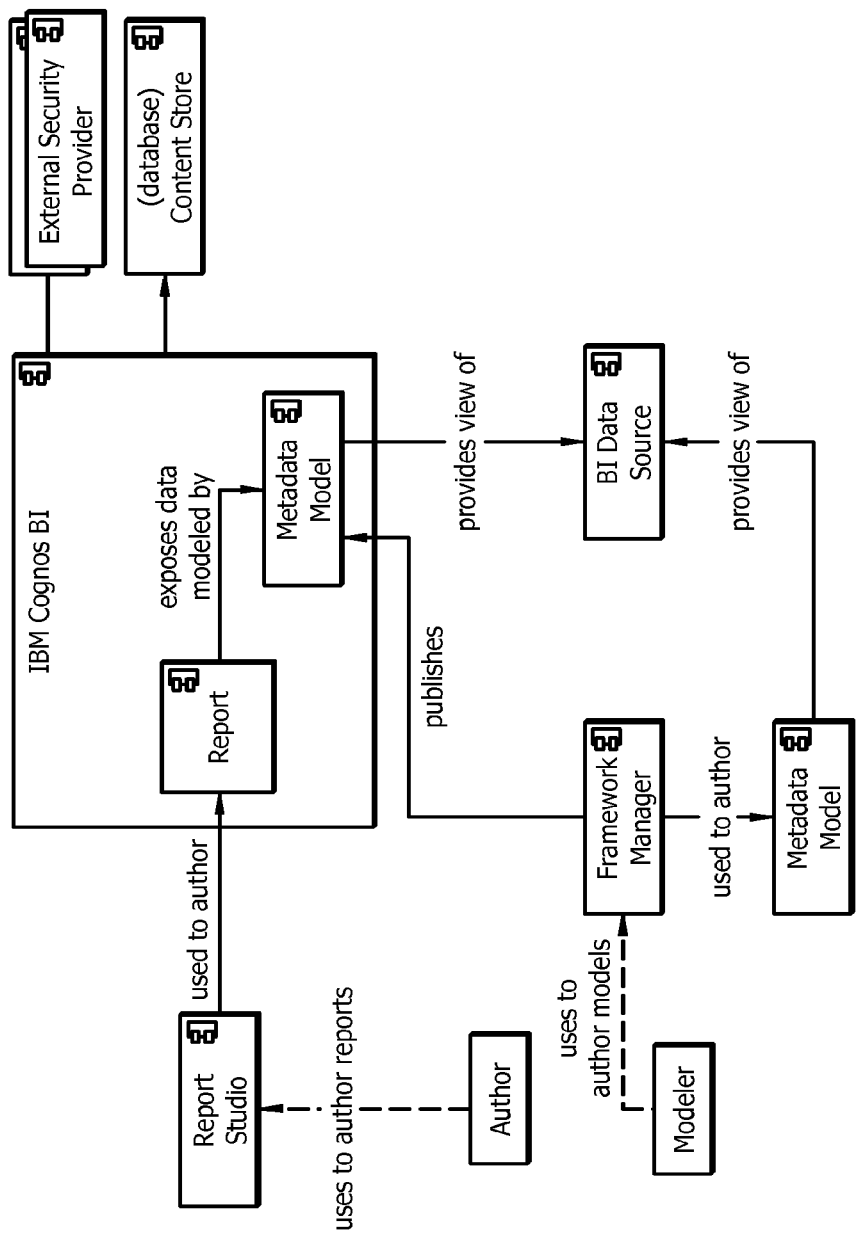
FIG. 1G depicts a schematic illustration of an example metadata model in an implementation of a BI environment, namely a UML Component Diagram.

FIG. 1G depicts a schematic illustration of an example metadata model in a BI environment, namely a UML Component Diagram, according to an implementation of the present disclosure. A metadata model (e.g., package in Cognos) may provide a view of one or more data sources. The metadata model may provide a more business friendly and/or User-friendly "semantic" layering on top of one or more physical data sources. This layering may be used to organize data into hierarchical dimensions, define aggregation (e.g., "rollup") rules, define row level security, internalizations, etc. A portion may be an exposed portion (e.g., slice) of a larger metadata model that is authored in the Framework Manager. For example, a User may build a metadata model and publish at least a portion as a package. The package may be stored in a database, such as IBM Cognos Content Store database.

In some implementations, BI artifacts such as reports may be associated with a metadata model. The report may expose data through the associated metadata model (or in some cases, a report may expose data directly from a BI data source, effectively bypassing the metadata modeling layer). In some implementations, the BI environment may include a Framework Manager Metadata Model. The Framework Manager Metadata Model may be offline and/or unpublished. The Framework Manager Metadata Model may be stored in a file system.

Figure 1H:
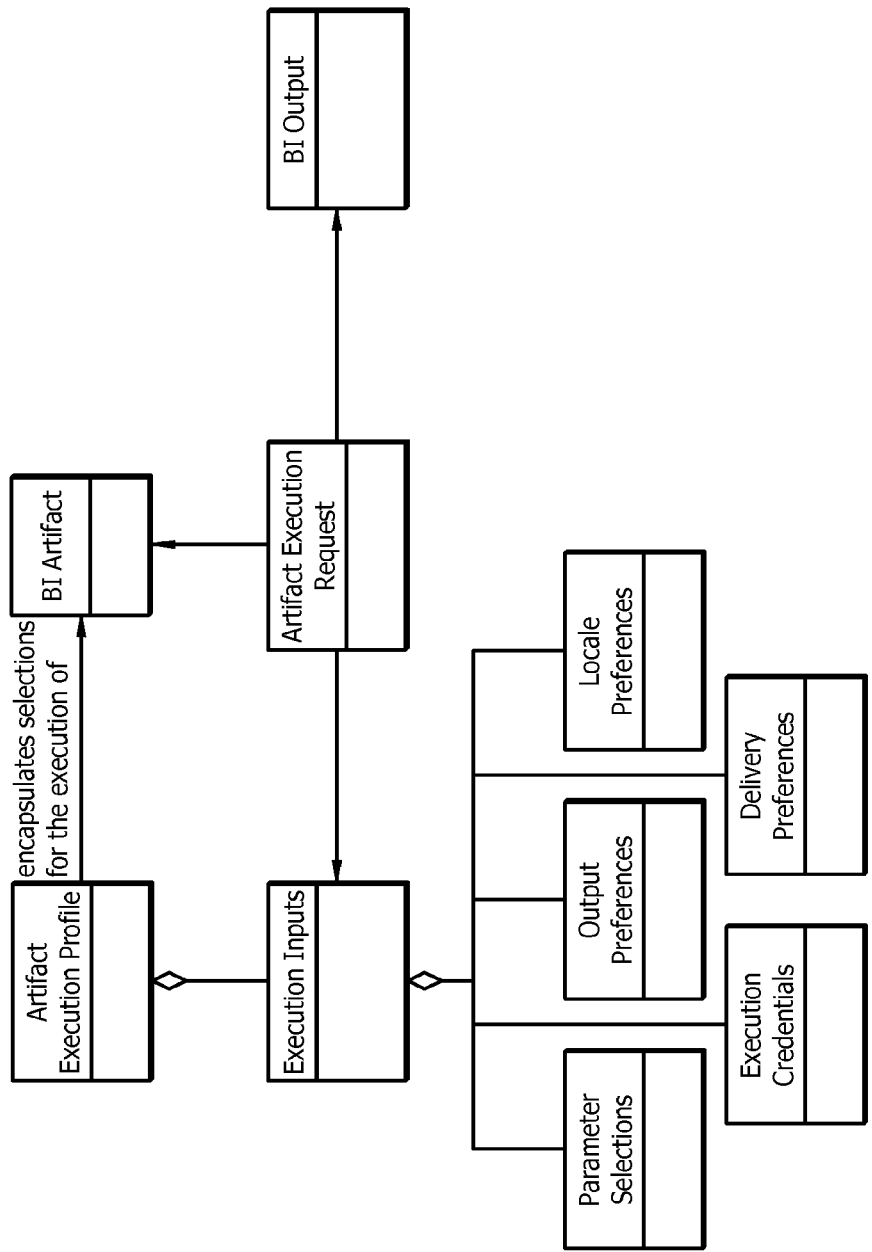
FIG. 1H depicts a schematic illustration of an example artifact execution profile, namely a UML Analysis Class Diagram.
Figure 11:
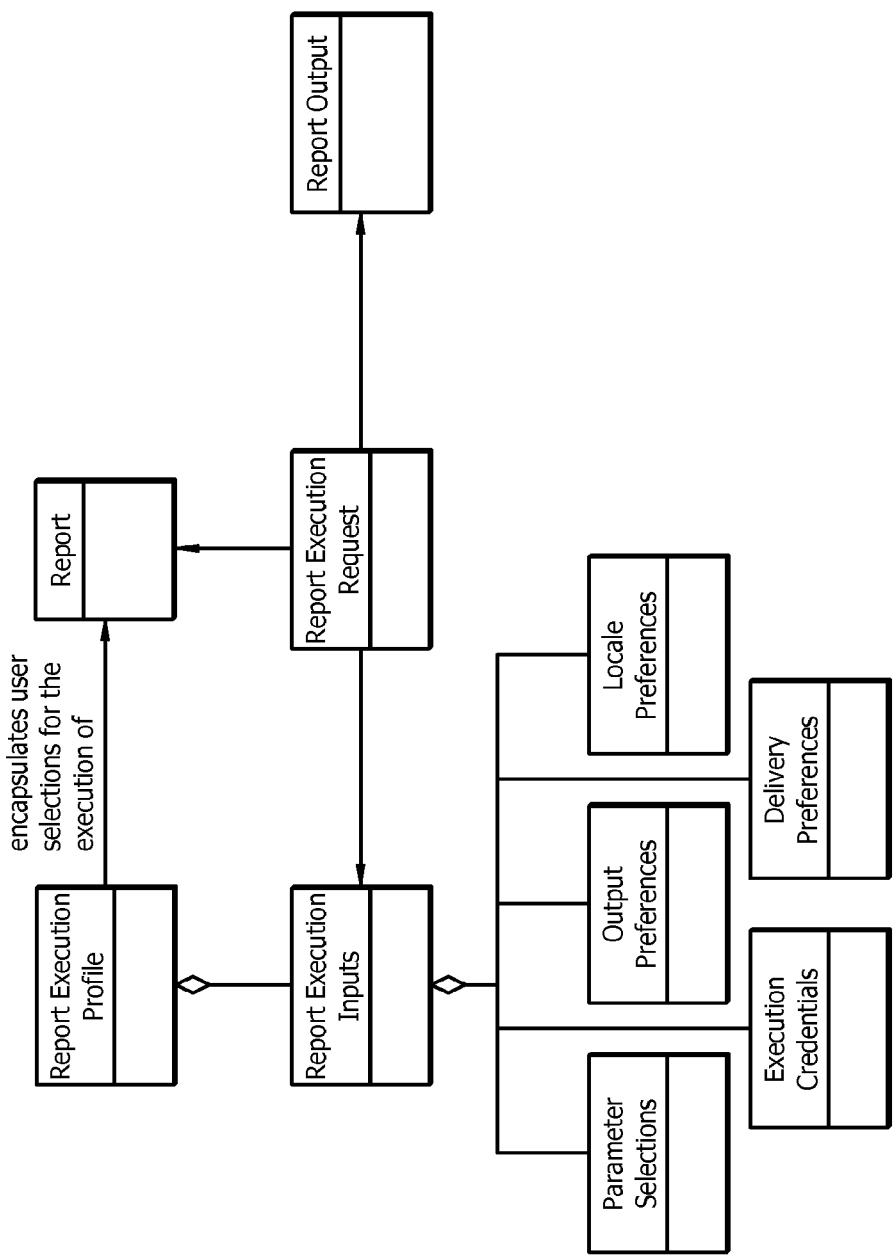

FIG. 1H depicts a schematic illustration of an example artifact execution profile, namely a UML Analysis Class Diagram, according to an implementation of the present disclosure. An artifact execution profile represents one way to execute a BI artifact. An artifact execution profile aggregates and persists one set of execution input selections. It can be burdensome on Users if there are a large number of choices that must be made each time they execute a BI artifact. An artifact execution profile allows a User to save off these selections so that they can later re-execute the same BI artifact with the exact same selections. One or more BI outputs (e.g., one for each requested format) may be generated by the BI system in response to the execution of a BI artifact in the BI environment (e.g., successful execution). For example, the BI Output may be a PDF, an Excel, an HTML, and/or any associated resource and/or any other appropriate type of file. The BI output may be delivered as a file or a stream of data (in compressed or uncompressed form).

FIG. 1I depicts a schematic illustration of an example report execution profile, namely a UML Analysis Class Diagram, according to an implementation of the present disclosure. A report execution profile represents one way to execute a report. A report execution profile aggregates and persists one set of execution input selections. It can be burdensome on Users if there are a large number of choices that must be made each time they execute a report. A report execution profile allows a User to save off these selections so that they can later re-execute the same report with the exact same selections (e.g., parameters such as "North America", "Europe", and/or "Asia"). One or more report outputs (e.g., one for each requested output format) may be generated by the BI System in response to an execution of a report (e.g., a successful execution). For example, the report output may include a PDF, an Excel, an HTML, an MHTML and/or any associated resource and/or any other appropriate type of file. The report output may be delivered as a file or a stream of data (in compressed or uncompressed form).

In various implementations, BI Artifact(s), property set(s), package(s), content associated with packages, and/or content associated with label(s) may be deployed to a BI environment. In some implementations, a BI Artifact, a package, and/or a contents of a label (e.g., one or more BI Artifacts, packages and/or a property set identified in the SI system) associated with a first BI environment may be deployed in a different BI environment. For example, BI Artifact(s), package(s), and/or the content of label(s) may be created in a development BI environment by BI developers and may be later deployed in a QA BI environment. In some implementations, for example, a package may be tested in a QA BI environment by QA professionals and may be deployed in a production BI environment for consumption by BI consumers. When the BI Artifact(s), package(s), and/or content(s) of label(s) are deployed by the SI system, the SI system may access the BI Artifact(s), package(s), and/or label(s). For example, the SI system may retrieve a BI Artifact and/or a label (e.g., label and/or contents of the label) from a memory of the SI system and/or the BI environment. In some implementations, the SI system may determine a label associated with the BI Artifact and/or package (e.g., from a memory coupled to the SI system) and retrieve (e.g., from a memory of the SI system) the BI Artifact and/or package based on the associated label. The SI system may generate a copy of the BI Artifact, content of a package, and/or content of a label in the second BI environment, such that the BI Artifacts (e.g., in the copied BI Artifact(s), package(s) and/or label(s)) may be tested and/or executed in the second BI environment. For example, the SI system may retrieve a copy of a package from a database coupled to the SI system (e.g., SI database) and generate the package in the second BI environment based at least partially on the retrieved copy. In some implementations, the SI system may retrieve a copy of the contents of a label associated with a package selected for deployment and generate the label contents and/or the selected package in the second BI environment based at least partially on the retrieved copy.

In some implementations, the first BI environment and the second BI environment may include different BI software or different versions of the same BI software. For example, the first BI environment is based at least partially on IBM Cognos version 10.1 and the second BI environment is based at least partially on IBM Cognos version 10.2.

Although FIG. 1A illustrates a simplified system in which BI environments and a SI system are utilized, other implementations may be utilized as appropriate. Although FIGS. 1B-1I illustrate an implementation of an example system in which one or more of the described processes and/or operations may be implemented, other implementations may be utilized.

Although FIGS. 1A-1I illustrate examples of systems in which BI environments and a SI system are utilized, other implementations may be utilized as appropriate. U.S. Pat. No. 7,885,929 filed on Jan. 3, 2006 and entitled "Continuous Integration of Business Intelligence Software" describes example systems that may be at least partially utilized with various described processes and/or systems. In some implementations, one or more of the features of U.S. Pat. No. 7,885,929 may be utilized with one or more of the described systems and/or processes.

In various implementations, versions of components of a BI environment may be identified by the SI system and transmitted to the external version control. The components of the BI environment may not be directly storable in the external version control (e.g., attempting to transmit a BI Artifact to the external version control may produce an error and/or result in the BI Artifact not being saved in a memory of the external version control). Thus, prior to transmitting the component(s) of the BI environment to the external version control for storage, the SI system may transform the data such that the transformed data may be storable by the external version control. The transformed data may not be executable by the BI environment (e.g., if the transformed data was directly copied from the external version control to the BI environment), and thus, the SI system may transform the data prior to generating components, such as BI Artifacts, in the BI environment based on data stored in the external version control.

The versions of components may be identified by the SI system by identifying changes or alterations to components of the BI environment. The changes may be identified manually (e.g., when a user transmits a change to the SI system and/or external version control) and/or automatically (e.g., using the SI system). For example, the SI system may identify alteration(s) to BI Artifacts. The SI system may identify the alteration(s) to the BI Artifacts by communicating with the BI environment, intercepting communication(s) in the BI environment, comparing a BI Artifact to a stored version of a BI Artifact, etc.

By maintaining BI Artifacts, versions of BI Artifacts, and/or records of BI Artifacts in the external version control, enterprise level views of the enterprise and/or activities of the enterprise may be monitored. For example, upgrades and/or updates may be pushed out based on records in the external version control. Enterprise level changes may be made to BI Artifacts and/or enterprise level deployments may be facilitated. In addition, maintaining version control of the BI environment and/or portions thereof on the external version control may allow enterprise wide version management rather than piecemeal solutions (e.g., files tracked by a file manager, BI Artifacts managed and/or stored in the SI system, etc.).

However, external version control systems are adapted to version files stored in hierarchical structures. Since components of the BI environment, such as BI Artifact(s) may not be stored directly as files, the external version control may not be able to directly version files of the BI environment. The portions of the BI environment, such as BI Artifacts, may store content in different types of files and/or different types of data (e.g., XPath notations, XML tags, strings, etc.). Thus, the external version control may not be able to identify and/or version the content of a BI Artifact.

The SI system may identify changes in the BI environment (e.g., changes to BI Artifacts, etc.), convert the file from the BI environment from a first format to a second format, and then transmit the file with the change to the external version control. Thus, the external version control may be able to manage and store versions of the BI environment(s) and portions thereof.

Figure 3A:
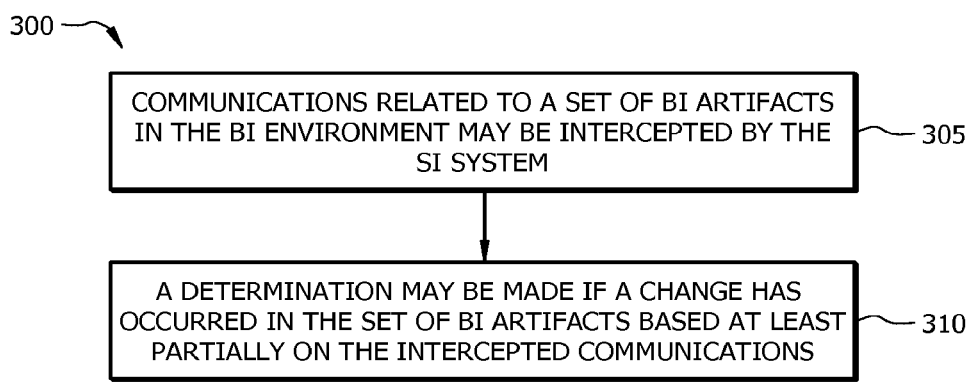
FIG. 3A illustrates an implementation of an example process to identify versions of components of a BI environment.

FIG. 3A illustrates an implementation of an example process 300 to identify versions of components of a BI environment. Communications related to a set of BI Artifacts in the BI environment may be intercepted by the SI system (operation 305). For example, the SI system may include a system agent coupled to component(s) of the BI environment such that communications to and/or from the component(s) may be intercepted (e.g., monitored and/or received and transmitted). The SI system may receive a communication prior to the communication being received by the component. The SI system may then transmit the communication to the component and/or restrict the transmission of the communication to the component.

A determination may be made if a change has occurred in the set of BI Artifacts based at least partially on the intercepted communications (operation 310). The SI system may determine if a change has occurred in a set of BI Artifact. The SI system may intercept a communication (e.g., from a content store manager) and compare the communication to a listing of communications to determine if the intercepted communication is a change. For example, the SI system may store a listing of communications that indicate a change and/or a listing of communications that do not indicate a change. The SI system may compare the intercepted communication to the listing of communications and determine whether a change has occurred.

Process 300 may be implemented by various systems, such as the systems illustrated in FIGS. 1A and 1F. In addition, various operations may be added, deleted, and/or modified. For example, the SI system may determine the type (e.g., change action and/or not a change action) of communication to determine whether a change has occurred based on the communication. For example, a delete communication may cause a change in the system. Thus, when a communication is a delete type of communication then a determination is made that a change has occurred. In some implementations, the SI system may determine if a communication will cause a change prior to and/or approximately concurrently with the BI environment causing the change to occur in the BI environment (e.g., to BI Artifacts).

In various implementations, when a change has occurred, the change may be transmitted to external version control. The external version control may monitor, store, and/or manage multiple versions of BI Artifacts.

In some implementations, the SI system (e.g., via a system agent) may intercept communications to and/or from the BI Bus. For example, changes to BI Artifact(s) may be identified by intercepting messages traveling across the BI Bus in the BI environment to identify change messages generated by components (e.g., nodes) of the BI environment that travel to the content manager. A system agent may reside in the BI environment such that communications from the BI Bus may be intercepted. The communications may be received from the BI Bus and then transmitted to other components of the BI environment to change the BI Artifact(s) based on the communication.

In some implementations, the SI system (e.g., via a system agent) may intercept communications from a content manager to a content store database (e.g., to and/or from the database driver). For example, a system agent may reside in the BI environment such that communications to a database driver from a content manger may be intercepted. The system agent may then analyze the intercepted communication. The system agent may then transmit the communication to the database driver and/or restrict transmission to the database driver, in some implementations.

In some implementations, one or more changes may include changes identified by the user. For example, the user may request transmittal of a BI Artifact to an external version control to be saved as a version of the BI Artifact.

Figure 3B:
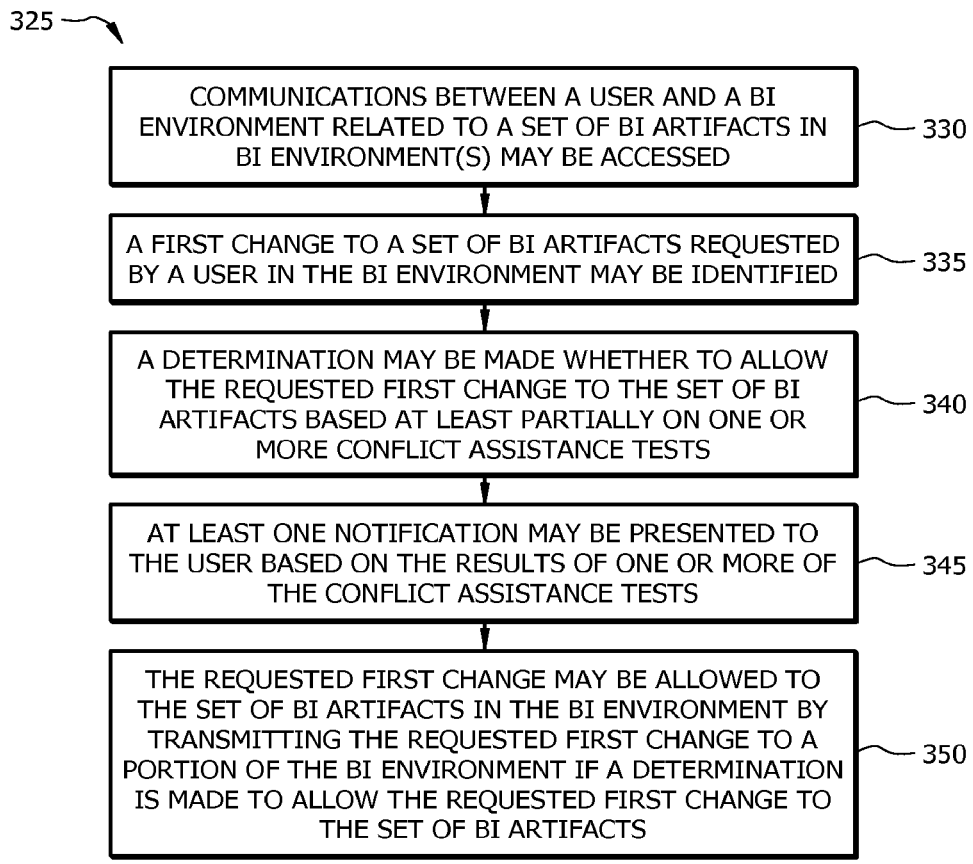
FIG. 3B illustrates an implementation of an example process to manage BI Artifacts.

In some implementations, changes in the BI environment may be managed by the SI system. The SI system may communicate with the external version control and/or the BI environment to facilitate management of the SI system. FIG. 3B illustrates an implementation of an example process 325 to manage BI Artifacts. When users perform change actions in a BI environment (e.g., in a content store), change messages may be generated and processed by the BI environment to change the content of BI Artifact(s). For example, a change action may be generated when a user updates a description (e.g., toolTip property of a BI Artifact in Cognos), copies a BI Artifact, moves a BI Artifact, edits a report specification, publishes an updated package and/or model from an external BI tool (e.g., IBM Framework in Cognos), etc.

Communications between a user and a BI environment related to a set of BI Artifacts in the BI environment(s) may be accessed (operation 330). For example, files in the BI environment may include system agents that generate and transmit messages to the SI system. A system agent may access a communication by receiving a communication and transmitting the communication to the SI system and/or a component (e.g., node) of the BI environment and/or copying communications transmitted in portions of the BI environment. In some implementations, a BI environment may generate graphical user interfaces to facilitate communications with users (e.g., receiving, presenting, and/or requesting information). The files utilized by the BI environment to generate user interface elements may be modified, in some implementations, to communicate one or more requests to the SI system. The SI system may receive these requests instead of, before, and/or after communicating the original user interaction to the BI environment. In some implementations, accessing communications between a user and a BI environment may include intercepting communications between a user and component(s) of the BI environment and/or between components of the BI environment, such as between the content manager and node(s) in a BI environment. For example, communications may be intercepted that are transmitted to a database driver, from a content manager, to a content database, identifying a type of communication (e.g., change actions such as save, create, add, delete, replace, select) and/or comparing the communication to a listing of communications.

A first change to a set of BI Artifacts requested by a user in the BI environment may be identified (operation 335). The first change may be identified prior to allowing the first change to be transmitted to other components of the BI environment to process the change, in some implementations. The communications may be analyzed by the SI system to identify a first change to a set of BI Artifacts. The first change may include one or more alterations to one or more of the BI Artifacts in the set of BI Artifacts. For example, reference(s) in a BI Artifact may be altered, deleted, and/or added.

A determination may be made whether to allow the requested first change to the set of BI Artifacts based at least partially on one or more conflict assistance tests (operation 340). Conflict assistance tests may include any appropriate test to facilitate identification of conflicts that might affect performance of the BI Artifacts and/or the BI environment. The conflict assistance tests may facilitate identification of conflicts that may cause errors on commitment of the change to the external version control and/or conflicts that may not cause errors on commitment of the change to the external version control but may affect whether a user would like to continue to apply a change to a BI Artifact (e.g., if a first user highlights section headings in a first portion and the first change underlines section headings in a second portion, the different treatment of section headings may be identified by a conflict assistance test).

At least one notification may be presented to the user based on the results of one or more of the conflict assistance tests (operation 345). For example, a notification may be presented to the user on and/or proximate to an interface generated by the BI environment. The SI system may request generation, by the BI environment, of a portion of a graphical user interface generated by the BI environment that includes the notification(s). For example, a generated graphical user interface may include a pop-up, frame, and/or other portion. In some implementations, the user may be presented with a version of a BI Artifact stored in an external version control and the changed BI Artifact and differences and/or similarities may be presented to the user.

The requested first change may be allowed to the set of BI Artifacts in the BI environment by transmitting the requested first change to a portion of the BI environment if a determination is made to allow the requested first change to the set of BI Artifacts (operation 350). The requested first change may be allowed if a conflict does not exist and/or if a conflict has been resolved (e.g., based on the conflict assistance test results).

Process 325 may be implemented by various systems, such as the systems illustrated in FIGS. 1A and 1F. In addition, various operations may be added, deleted, and/or modified. For example, a system agent may analyze communications accessed to determine if the communication is a change message (e.g., by analyzing the contents, identifying the type of communication, and/or comparing the communication to a listing of communications). The system agent may transmit the communication to the SI system when the communication is determined to be a change message and may restrict transmission of the communication to the SI system when the communication is determined not to be a change message, in some implementations.

In some implementations, the communications are accessed before BI Artifact(s) are changed in the BI environment. By allowing the communications to be accessed by the SI system prior to the changes being processed in the BI environment, the SI system may provide the user with test results (e.g., conflict assistance test results and/or other test results) prior to allowing the BI environment to process the change. For example, notifications of test results may be provided to a user (e.g., via interfaces in the BI environment and/or via interfaces or portions thereof generated by the SI system). The user may provide modifications to the changes (e.g., as a result of the test results) included in the communication prior to allowing the change in the communication (e.g., prior to allowing the communication to be transmitted to the appropriate node for processing).

In some implementations, accessing communications may include at least one of intercepting communications to a database driver or identifying a type of communication. For example, changes in the BI environment may not be based on changes provided by a user (e.g., via the content store). For example, a user may schedule a job to perform tasks automatically at a later date, which may generate changes. Thus, to identify the changes, communications may be intercepted (e.g., proximate the BI Bus, the content manager, the content store database driver, and/or the content store database; between a user and a component of the BI environment; and/or between components of the BI environment).

In some implementations, the SI system (e.g., via a system agent) may intercept communications such as database queries (e.g., SQL queries). The SI system may analyze the intercepted communications to determine if the database query includes a change message. For example, a delete query may be identified as a change message since it causes a change to a BI Artifact and/or a select query may not be identified as a change message since it may not cause a change to a BI Artifact. The system agent may then determine which BI Artifact(s) are associated with the change and/or the communication and transmit a message to the system. This transmitted message may include an indication that a change has occurred and the determined BI Artifact(s) associated with the change. In some implementations, the transmitted message may include the intercepted communication and/or the change to be applied to BI Artifact(s). The system may then receive the message and retrieve a copy of the BI Artifact(s) from the BI system (e.g., via SKD calls in Cognos). The system may then update the copy of the BI Artifact and commit the changes to the external version control. In some implementations, the system agent may determine if the intercepted message includes a change message prior to transferring the message to the system (e.g., system 81 on server 80).

In some implementations, conflict assistance tests may be stored in a memory of the SI system. The SI system may retrieve a conflict assistance test and execute the test. Conflict assistance tests may include XSD schema validation, BI Artifact specification validation, and/or other appropriate tests applied to the BI Artifact being changed and/or referenced BI Artifact(s).

In some implementations, allowing the SI system to identify changes in the BI environment and commit changes to the external version control may allow a record to be generated of the changes applied to a specific BI Artifact. Since the external version control may not be able to directly version the contents of the BI environment, by allowing the SI system to identify the changes and commit the changes to the external version control the external version control may be able to version the BI Artifact(s) of the BI environment even though the external version control is restricted (e.g., due to formatting differences) from directly versioning BI Artifact(s).

In some implementations, identifying changes based on the intercepting of communications (e.g., to a database driver) may identify some identical changes identified from user requests. The SI system may determine if a change identified from intercepted communications is identical to a change identified from user requests (e.g., by comparing the change identified from the intercepted communication to other changes identified by the SI system). The SI system may restrict updating the copy of the BI Artifact in the external version control and/or may restrict committing the change to the external version control if the system determines that the change is an identical change.

In various implementations, the SI system may at least partially manage changes to the BI environment. For example, the SI system may allow users to request access to BI Artifacts to make changes, identify changes, allow changes, and/or restrict changes. In some implementations, the SI system may allow users to check-in and check-out BI Artifact(s) to allow and/or restrict access to the BI Artifact(s). By managing access to BI Artifacts, conflicts (e.g., changes that may cause error messages on transmission, unintended changes to BI Artifacts and/or BI Artifact Outputs, inconsistencies, etc.) may be identified, presented to users, and/or resolved by users.

In some implementations, to manage changes and/or versions of BI Artifacts, the SI system may allow BI Artifacts to be checked-out and/or checked-in. For example, the external version control may store versions of BI Artifact(s) (e.g., versions currently deployed in BI environment, versions previously deployed, and/or working copy versions). User(s) may check out one or more copies of a version of a BI Artifact. The SI system may generate a copy (e.g., a local copy and/or working copy) of the BI Artifact, for example, but not limited to, associated with a user. The copy may be generated in the content store and/or be associated with user information. The copy of the BI Artifact may be executable in a BI environment but the copy of the BI Artifact may be generated such that the BI Artifact that resides in the BI environment may not be overwritten by the copy of the BI Artifact executable in the BI environment. Thus, the copy of the BI Artifact and the BI Artifact that currently resides in the BI environment may be independent (e.g., changes to one do not affect the other). User(s) may analyze, provide alterations, create new BI Artifacts and/or portions thereof (e.g., file paths, references, etc.). A user may then check-in the user's copy of the BI Artifact. The SI system may manage the check-in of the copy and/or any alterations to the copy. For example, conflicts may be identified, a history of the alterations made to the BI Artifact may be preserved (e.g., in a memory of the external version control), etc.

In some implementations, the SI system may allow BI Artifacts to be checked-out. A request for BI Artifact(s) may be received from a user. For example, a user may request access via an interface of the BI environment to BI Artifact(s). A first copy of the requested BI Artifact(s) may be generated. The first copy may be a copy of the BI Artifact generated by the SI system based on the contents of a BI Artifact in the BI environment. The user may have access to the first copy. The first copy of the BI Artifact may be a local copy (e.g., reside on the user directory in a BI environment, reside in a BI environment associated with user information, reside on a working copy branch of an external version control, and/or reside on a portion of the BI environment to which the user has access). The first copy of the BI Artifact may be stored such that the same BI Artifact (e.g., same version or different version of the same BI Artifact, the BI Artifact of which the copy was made) in the BI environment is not overwritten. The first copy of the BI Artifact may be stored such that changes to the first copy of the BI Artifact does not cause the changes to be automatically applied to the same BI Artifact and/or BI Artifacts which are referenced by and/or which reference the BI Artifact in the BI environment.

Figure 4:
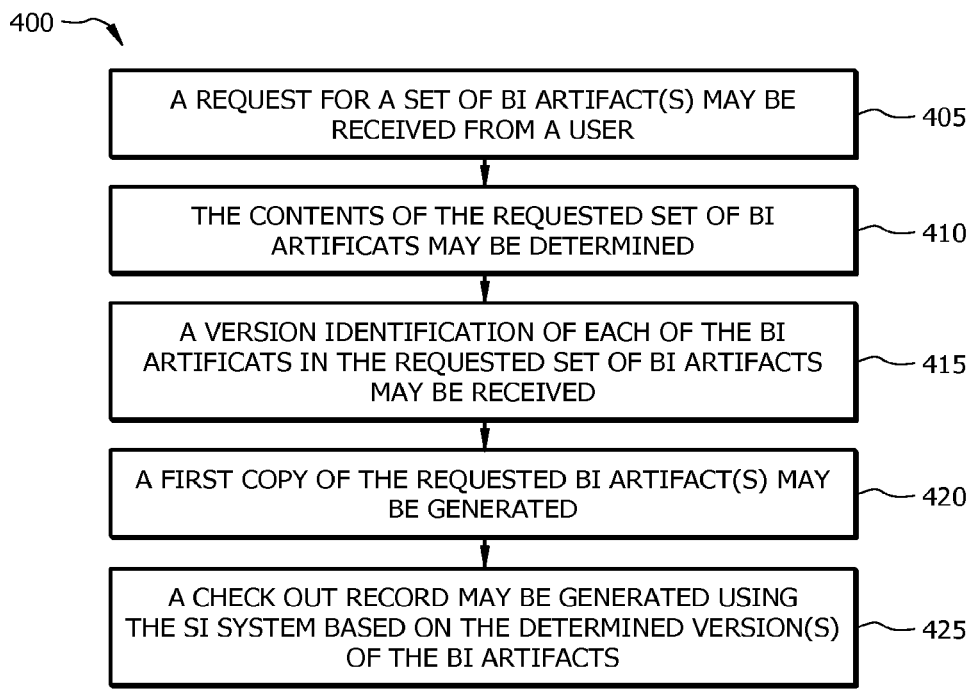
FIG. 4 illustrates an implementation of an example process to manage check out of BI Artifact(s).

FIG. 4 illustrates an implementation of an example process 400 to manage check out of BI Artifact(s). A request for a set of BI Artifact(s) may be received from a user (operation 405). For example, a user may request access to one or more BI Artifacts via an interface of the BI environment and/or generated by the SI system. The user may request a specific version of a BI Artifact, a version currently deployed in the BI environment, and/or a previously deployed version of the BI Artifact.

The contents of the requested set of BI Artifacts may be determined (operation 410). For example, the SI system may determine the identity of each of the BI Artifact(s) in the set of BI Artifacts. The SI system may identify each BI Artifact based on an identification code associated with the BI Artifact. The identification code may be stored in one or more properties of the object, may be a combination of one or more properties of the object, may be calculated from one or more properties of the object using a predefined algorithm, may be associated with the path of the BI Artifact in the content store, and/or any combination thereof. The identification code may associate a set of versions of a BI Artifact with a single BI Artifact. For example, as a BI Artifact changes, a new version may be assigned to the changed BI Artifact but the BI Artifact may retain the same identification code.

A version identification of each of the BI Artifacts in the requested set of BI Artifacts may be received (operation 415). A BI Artifact may be associated with one or more versions. An identification (e.g., a combination of numbers, letters, and/or symbols) of the version of a BI Artifact deployed in a BI environment may be stored in the SI system. Thus, when a user requests access to a BI Artifact deployed in the BI environment, the SI system may be able to retrieve the identification associated with the deployed BI Artifact.

A first copy of the requested BI Artifact(s) may be generated (operation 420). The SI system may retrieve a copy of the BI Artifact from the external version control based on the determined identification of the version. The SI system may then generate or request generation of a copy of the version of the BI Artifact. The first copy of the BI Artifact may be generated in the BI environment such that the BI Artifact that resides in the BI environment may not be overwritten by the generated first copy. In some implementations, the first copy of the BI Artifact may be generated in a branch of the external version control. In some implementations, the first copy of the BI Artifact may be generated as a local copy for the user (e.g., in a BI environment and associated with user information).

A check out record may be generated using the SI system based on the determined version(s) of the BI Artifacts (operation 425). When the SI system generates a first copy, the SI system may transmit a message to the external version control to check out the BI Artifact from the external version control (e.g., and inhibit others from editing the BI Artifact). In some implementations, the SI system may create a check out record that includes the contents checked out (e.g., version of BI Artifact, identification code, user information, etc.). The check out record may include an indication of which version of the BI Artifact a user checked out and user information (e.g., user name), in some implementations. The check out record may be stored in a memory of the SI system, a database associated with the SI system, and/or in a BI Artifact associated with user information. Thus, more than one user may check out and apply changes to the same version of a BI Artifact via the SI system. By allowing more than one user to check out the same version of a BI Artifact, users may concurrently work on projects (e.g., tickets) that are related to the same BI Artifact(s).

Process 400 may be implemented by various systems, such as the systems illustrated in FIGS. 1A and 1F. In addition, various operations may be added, deleted, and/or modified. For example, a set of BI Artifacts may include different versions of the same BI Artifact. In some implementations, a set of BI Artifacts may include one BI Artifact.

In some implementations, alterations to a first copy may be identified. For example, communications may be monitored and/or accessed (e.g., intercepted from the BI Bus; intercepted between the content manager and the content store database; and/or intercepted after user action on portions of the interface, such as "Save" buttons, etc.). The communications may be analyzed by the SI system (e.g., system agents) to determine if a communication includes a change. The change may be identified based on the contents of the communication. The identified changes or alterations may be stored in a memory of the SI system, the external version control, and/or a local memory associated with a user device.

In some implementations, alteration(s) (e.g., a set of alterations) to the first copy may be identified and the alteration(s) may be transmitted to the external version control. By transmitting the alteration(s) to a BI Artifact to the external version control, the external version control may track, monitor, and/or manage changes to BI Artifacts. A conflict notification from the external version control (e.g., commit successful and/or unsuccessful) may be received. A determination may be made whether a conflict exists based at least partially on the conflict notification and/or conflict assistance test(s) (e.g., initiated and/or executed by the SI system). The alteration(s) to the checked out copy (e.g., the first copy) may be committed and/or may be allowed to a BI Artifact in a BI environment if a determination is made that a conflict does not exist. If a conflict exists, a user may be prompted to resolve the conflict. In some implementations, the results of the conflict assistance tests may facilitate identification of conflicts and/or resolution of conflicts. The user may provide one or more changes to the alterations to generate a second set of alterations to resolve a conflict, if a conflict is determined to exist, and the second set of alterations may be committed to the external version control. In some implementations, the user may (e.g., based on user permissions) commit the alterations to the external version control and/or a BI environment even if a conflict is determined to exist.

In some implementations, the SI system may generate a portion of an interface in the BI environment to check out a BI Artifact. For example, an interface generated for the content store may include a button or other portion of the interface generated by the SI system to allow the user to check out BI Artifact(s). The user may select the button or other portion to check out the BI Artifact(s).

In some implementations, a user (e.g., a developer) may check out a set of BI Artifacts (e.g., the SI system may receive a request for access and/or check out of a set of BI Artifacts from the user). For example, the user may check out the latest version of a set of BI Artifacts in a Development BI environment and/or deployed in a BI environment. The SI system may generate a first copy of the requested set of BI Artifacts by retrieving the BI Artifact(s) in the set of BI Artifacts from the external version control. The first copy of the requested set of BI Artifacts may be generated in a local drive (e.g., a memory of the BI environment associated with user information). The local drive may reside in a folder in a memory associated with the content store and the SI system, in some implementations.

In some implementations, when a first copy of the BI Artifacts is generated (e.g., based on retrieving information from the external version control), references of the BI Artifacts may be altered (e.g., automatically and/or manually). For example, referenced other BI Artifacts in a BI Artifact may be automatically altered to reference checked out copies of the other BI Artifacts. The other BI Artifacts may be automatically checked out when the BI Artifact that references the other BI Artifacts is checked out.

In some implementations, the first copy may be generated by the SI system by retrieving the contents of a BI Artifact from the external version control. The SI system may then generate the first copy in the BI environment (e.g., using SDK calls). By generating the first copy based on information from the external version control (e.g., contents of the BI Artifact from the external version control), metadata associated with the BI Artifact may be accessed (e.g., since metadata associated with the BI Artifact may be stored in association with the BI Artifact in the external version control).

In some implementations, the first copy may be generated by the SI system by retrieving a copy of the BI Artifacts from the content store (e.g., a public area of the content store) and generating the first copy.

Figure 5:
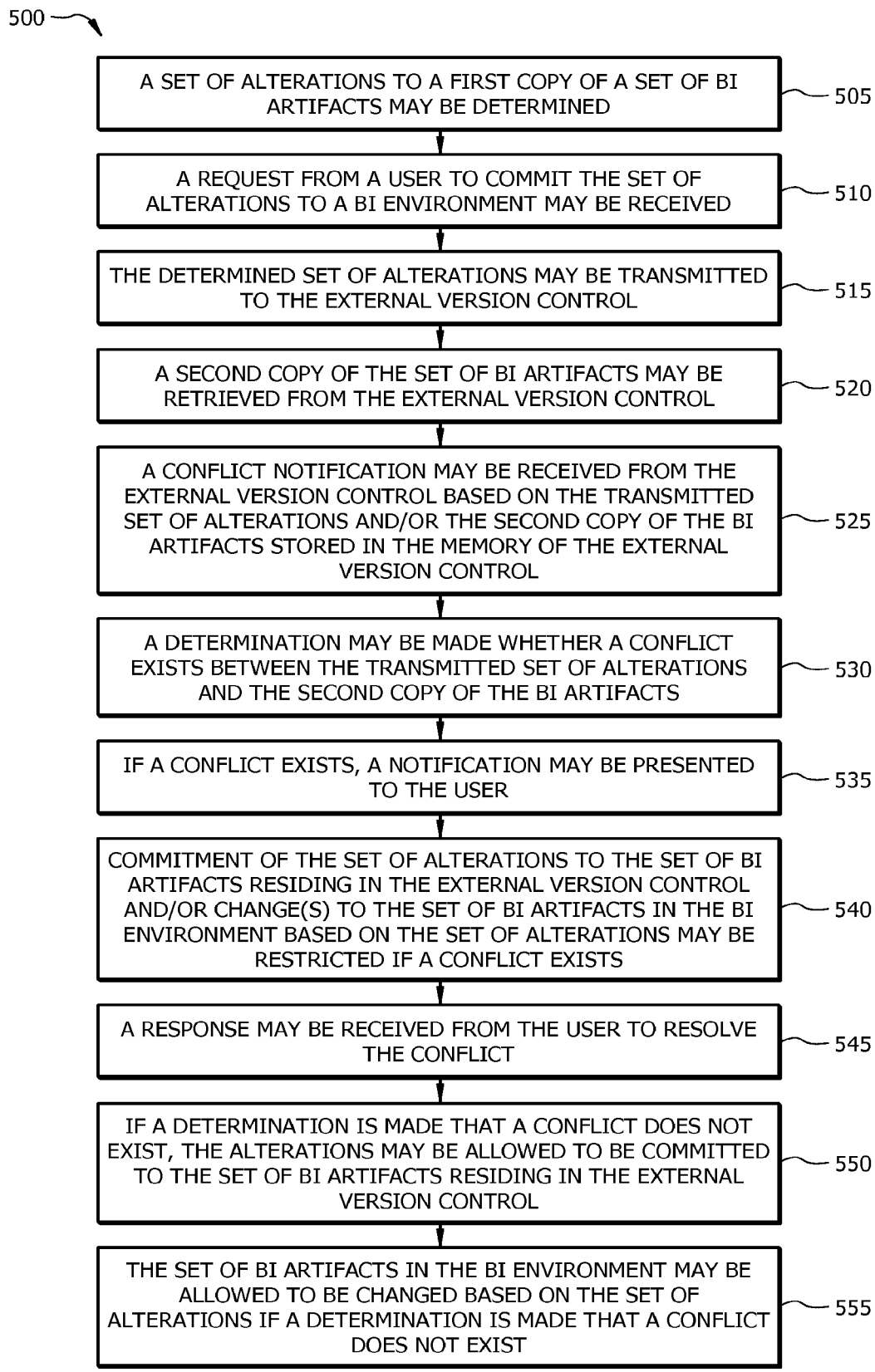
FIG. 5 illustrates an implementation of an example process to manage changes to a BI environment.

The user may check in a set of BI Artifacts, in some implementations. The BI Artifacts may have been checked out by the user and/or altered (e.g., a set of alterations may have been applied to the BI Artifact(s)). FIG. 5 illustrates an implementation of an example process 500 to manage changes to a BI environment.

The user may check in a set of BI Artifacts, in some implementations. The BI Artifacts may have been check out by the user and/or altered (e.g., a set of alterations may have been applied to the BI Artifact(s)). FIG. 5 illustrates an implementation of an example process 500 to manage changes to a BI environment.

A set of alterations to a first copy of a set of BI Artifacts may be determined (operations 505). A set of alterations may include one or more changes. A set of BI Artifacts may include one or more BI Artifacts. The SI system may automatically identify a set of alterations (e.g., based on accessing communications between a user and a BI environment) and/or a user may transmit a set of changes to the SI system.

A request from a user to commit the set of alterations to a BI environment may be received (operations 510). An interface of the BI environment may include a button, link, or other portion generated by the SI system to allow the user to request commitment of the set of alterations. For example, a user may alter the first copy of a set of BI Artifacts using interfaces generated by the BI environment. The user may then request that the set of alterations be committed to the external version control and/or deployed in the BI environment.

The determined set of alterations may be transmitted to the external version control (operation 515). The SI system may transmit the set of alterations and/or the BI Artifacts with the set of alterations applied to the external version control. The SI system may transmit an indication of the version(s) and/or BI Artifact(s) (e.g., using an identification code) associated with the set of alterations. In some implementations, the SI system may use at least a portion of the information in the check out record to transmit the set of alterations to the external version control. By applying the alterations to BI Artifacts in the copy of the BI Artifact in the external version control, a record of the alterations may be maintained and/or managed. For example, rather than generating a new BI Artifact record in the external version control, committing the alterations to the BI Artifact in the external version control may allow maintenance of a record of alterations in association with the BI Artifact.

A second copy of the set of BI Artifacts may be retrieved from the external version control (operation 520). The SI system may request the current working version of the BI Artifacts related to the set of BI Artifacts in the first copy. In some implementations, the SI system may request a copy of the set of BI Artifacts that were checked out to the user to create the first copy.

A conflict notification may be received from the external version control based on the transmitted set of alterations and/or the second copy of the BI Artifacts stored in the memory of the external version control (operation 525). The conflict notification may be based on an attempt to transmit the set of alterations to the external version control. The external version control may attempt to merge the alterations with a copy of the BI Artifact in the external version control (e.g., working copy, BI Artifact from which the second copy is created). If the merge fails, then the external version control may transmit a conflict notification to the SI system that indicates that a conflict exists. If the merge is successful, the external version control may transmit a conflict notification to the SI system that indicates that a conflict does not exist.

A determination may be made whether a conflict exists between the transmitted set of alterations and the second copy of the BI Artifacts (operation 530). A determination of whether a conflict exists may be based on the conflict notification received from the external version control. The conflict notification may indicate if a conflict exists (e.g., commitment of the set of alterations was not successful) and/or if a conflict does not exist (e.g., successful commitment of the set of alterations). Thus, the SI system may receive the conflict notification and determine whether a conflict exists based on the conflict notification.

If a conflict exists, a notification may be presented to the user (operation 535). For example, a message that indicates that a conflict exists may be presented to the user. In some implementations, the first copy of the set of BI Artifacts and/or the second copy of the set of BI Artifacts may be presented to the user (e.g., via an interface generated by the SI system and/or in the BI environment). One or more differences or similarities between the second copy and the first copy may be identified (e.g., via indicia, such as highlighting, flags, etc.). In some implementations, the set of alterations may be applied to the second copy and conflicts may be identified with indicia. For example, if a first header was deleted in a second copy and a change in the set of alterations was to highlight the first header, the SI system may present indicia to identify the conflict.

Commitment of the set of alterations to the set of BI Artifacts residing in the external version control and/or change(s) to the set of BI Artifacts in the BI environment based on the set of alterations may be restricted if a conflict exists (operation 540). The SI system may transmit the set of alterations and/or the first copy of the set of BI Artifacts to the external version control. The SI system may alter the format of the BI Artifacts prior to commitment to the external version control. The SI system may transform the BI Artifacts and/or set of alterations from a first format that is executable in the BI environment to a second format that is not executable in the BI environment. The second format may be storable by the external version control and the first format may not be an appropriate format for storing files in the external version control. For example, the SI system may transform the BI Artifact(s) into one or more XML files. In one illustrative embodiment, the SI system transforms the BI Artifact(s) by storing one or more identifiers for the BI Artifact(s) as a directory name and a file within the directory representing each property of the BI Artifact(s). The SI system may also store one or more files representing metadata for the BI Artifact(s). For example, the SI system may store the identification code associated with the BI Artifact(s) in the metadata file(s). The metadata may also be stored as properties on the directory and/or one or more files associated with the BI Artifact(s) in the external version control.

A response may be received from the user to resolve the conflict (operation 545).

If a determination is made that a conflict does not exist, the alterations may be allowed to be committed to the set of BI Artifacts residing in the external version control (operation 550).

The set of BI Artifacts in the BI environment may be allowed to be changed based on the set of alterations if a determination is made that a conflict does not exist (operation 555).

Process 500 may be implemented by various systems, such as the systems illustrated in FIGS. 1A and 1F. In addition, various operations may be added, deleted, and/or modified. For example, the set of BI Artifacts may have been checked out or may not have been checked out. In some implementations, the second copy of the BI Artifacts may not be generated. In some implementations, the second copy of the BI Artifacts may be generated when a conflict notification indicates that a conflict exists (e.g., the external version control transmits an error message when commitment is attempted). In some implementations, conflict assistance tests may be executed by the SI system and/or requests for execution of the conflict assistance tests may be transmitted from the SI system to the BI environment when a conflict notification indicates that a conflict exists. A conflict notification to the SI system that indicates that a conflict does not exist may include a successful transmission notice and/or an affirmative notification that the commitment was successful.

In some implementations, a user may check out a first version of a BI Artifact (e.g., from a branch in the external version control in which a project is being stored). The SI system may generate a first copy of the BI Artifact from the BI environment (e.g., when completing tickets and/or when BI Artifacts in a BI environment are altered) and/or external version control (e.g., when a user is working on a project managed on the external version control, such as a software release). After a first user has applied alteration(s) (e.g., a set of alterations including one or more changes) to the BI Artifact(s) the first user may attempt to commit the alterations to the external version control and/or the BI environment. However, the BI Artifact (e.g., the same BI Artifact identified by the external version control, the SI system, and/or by an identification code) may have changed since the first user checked out the BI Artifact (e.g., since the check out is not exclusive to a single user). For example, a second user may have checked out a copy of the BI Artifact and committed alterations to the BI Artifact in the external version control to generate a second version of the BI Artifact prior to the first user requesting commitment of alterations to BI Artifact(s). Thus, if the alterations from the first user were applied to the second version of the BI Artifact, conflicts (e.g., inconsistencies, reference issues, etc.) may exist. The external version control may identify some of the conflicts (e.g., when a file path and/or other reference does not exist in the second version). Conflict assistance tests may also be executed by the SI system and/or be requested by the SI system to be performed on the BI Artifact. The conflict assistance tests may be based on a merged version of the alterations to the first version, the first version, and/or the second version. Thus the SI system may determine if a conflict exists based on the conflict notification from the external version control and/or the conflict assistance tests.

In some implementations, the SI system may retrieve a copy of the BI Artifact (e.g., second version) from the external version control to generate a second copy of the BI Artifacts. The second copy may be merged with the first copy, which includes the alterations. A second set of alterations may be identified based on the differences between the first copy and the second copy and/or the first set of alterations. The second set of alterations and/or the merged copy may be committed to the external version control (e.g., based on a request from the SI system). In some implementations, a conflict may be determined to exist in the merged copy. The merged copy may present the first copy and/or the second copy to the first user with one or more indicia to indicate conflicts and/or potential conflicts identified by the SI system and/or the external version control. The first user may choose to resolve the conflict. For example, the first user may accept the alteration from the second copy and/or the first copy, and/or the first user provide a second set of alterations to attempt to resolve the conflict(s). In some implementations, the first user may override the conflict.

In some implementations, the second copy of the BI Artifact may be merged with the first copy of the BI Artifact prior to transmitting the set of first alterations and/or the BI Artifact(s) (e.g., a merged copy) to the external version control. For example, a first user may check out and/or request generation of a first copy of a set of BI Artifacts. The BI Artifact may then be updated and/or altered (e.g., by other users). Thus, although the first user is applying changes to the first copy, the first copy is no longer the working copy or most current version of the BI Artifact(s). Thus, an attempt to commit the first copy to the external version control may fail (e.g., generate a conflict notification that indicates a conflict). The SI system may merge the first copy and the second copy by applying the alterations to the first copy to the second copy. One or more conflict assistance tests may be performed to facilitate resolution of any conflicts that may arise due to the merger. The merged copy may then be transmitted to the external version control and a conflict notification may be received. The SI system may determine whether a conflict exists based on the conflict notification and/or conflict assistance test(s). A user may resolve any determined conflicts (e.g., by altering the merged copy, by generating a second set of alterations based on resolution(s) to the conflict(s) and the first set of alterations, and/or by ignoring the conflicts and choosing to commit the merged copy with the conflict).

In some implementations, the external version control may be utilized to facilitate collaborative projects, such as complex ticket projects, software development, software updates, etc. The external version control may store data in a hierarchical structure, with a trunk and several branches (e.g., in a tree structured database). The trunk may include the most current development, for example labeled as version 3, and may include a set of BI Artifacts, in some implementations. Branches may include a copy of the trunk, updates to the trunk, working copies of the trunk, etc. In a collaborative project, a plurality of users may be working on altering the fourth version of a set of BI Artifacts in the trunk. The fourth version of the set of BI Artifacts includes bold headers in generated Report Outputs. A first user may check out (e.g., non exclusively) the fourth version of the set of BI Artifacts, and the SI system may generate a first copy of the fourth version of the set of BI Artifacts in branch 3. A second user may check out (e.g., non exclusively) the fourth version of the set of BI Artifacts, and the SI system may generate a second copy of the fourth version of the set of BI Artifacts in branch 4. A third user may check out (e.g., non exclusively) the fourth version of the set of BI Artifacts, and the SI system may generate a third copy of the fourth version of the set of BI Artifacts in branch 5. The second user may change the second copy by applying a first alteration such as changing the headers in generated Report Outputs to blue font, rather than bold style (e.g., delete style and add font color). The second user may commit the changed second copy (e.g., by submitting the alterations and/or by submitting the changed second copy) to the trunk by requesting that the SI system request commitment of the second copy to the trunk of the external version control. The fourth version of the set of BI Artifacts in the trunk now includes the first alteration. In some implementations, this altered fourth version may be identified as a fifth version or retain the fourth version.

However, the first copy in branch 3 and the third copy in branch 5 do not include the first alteration since the first user and the third user checked out their copies prior to the first alteration being applied to the fourth version of the set of BI Artifacts in the trunk. Thus, the first user may alter the first copy with a second alteration that the headers in generated Report Outputs are changed from bold style to underline. The first user may then request that the SI system commit the first copy to the altered fourth version of the set of BI Artifacts in the trunk of the external version control. In some implementations, the SI system may retrieve a copy of the altered fourth version of the set of BI Artifacts from the trunk as a fourth copy of the set of BI Artifacts and merge the fourth copy, the first copy, and the second alteration. During the merger, one or more conflict assistance tests may be executed or requested to be executed by the SI system on the merged copy. For example, a conflict assistance test may identify alterations to portions of the merged copy that include changes to references, changes to references that are included in altered portions of the first copy or the fourth copy, portions that are unaltered and refer to altered portions, portions that are unaltered but are related to alterations (e.g., alteration(s) to a subgroup of a larger portion, such as a style or color of a larger group of font selection), and/or any other appropriate identification. The result(s) of one or more of the conflict assistance tests may be presented to the user. In some implementations, the SI system may present conflict assistance test result(s) that indicate conflicts. Thus, the SI system may execute a conflict assistance test on the merged copy and identify a conflict that an alteration to the style was made in the fourth copy and the color in the first copy. The conflict (e.g., the result of the test) may be presented to the first user and/or the second user who created the first alteration that resulted in the conflict. The users (e.g., first user and/or second user) may provide an additional alteration (e.g., change header color to black), may delete an alteration (e.g., delete the second alteration and/or the first alteration), and/or may choose to provide an override request and ignore the conflict. The merged copy, the first alteration, and/or an altered first alteration may be committed by the SI system to the external version control to the altered fourth version of the set of BI Artifacts in the trunk.

In some implementations, copies may be merged prior to committing the merged copy and/or set of alterations to the external version control. In some implementations, the set of alterations may be transmitted by the SI system to the external version control and the external version control may transmit a conflict notification. The conflict notification may identify that a conflict exists (e.g., when a style of font has been deleted and a transmitted first alteration request changing the style to italics) and/or that a conflict does not exist. The conflict assistance test(s) may be executed on the set of BI Artifacts (e.g., first copy, merged copy, etc.) when the SI system determines that a conflict exists based on the received conflict notification (e.g., which indicates that a conflict exists) from the external version control.

In some implementations, copies may be merged prior to committing the merged copy to the external version control. For example, the first copy with a first alteration and the third copy with a third alteration may be merged to generate a fifth copy that may reside in branch 5. The third copy may be overwritten by the first copy in the merger (e.g., at least one of the copies may be deleted and/or overwritten when the copies are merged). The fifth copy may include a fourth alteration that includes the merged alterations from the first alteration and the third alteration. Conflict assistance tests and/or conflict notifications from the external version control may be utilized by the SI system to determine if conflicts exist in the fifth copy. When the SI system commits the fifth copy to the external version control (e.g., to merge with the version of the set of BI Artifacts in the trunk, for example) the SI system may transmit the fourth alteration in addition to and/or instead of the fifth copy. By transmitting the fourth alteration, the record of changes may be maintained by the external version control (e.g., when compared with just overwriting BI Artifacts and losing the record of alterations). For example, when the SI system transmits the fourth alteration, the alteration record from the first copy and the alteration record from the third copy are maintained in the fourth alteration. Thus, when the fourth alteration and/or the fifth copy is committed to the external version control, the changes from the first copy when the first copy and the third copy were merged are not lost.

In some implementations, the SI system may communicate with the ticket manager to facilitate deployments. For example, a ticket may describe a project. A user may alter at least a portion of BI Artifact(s) associated with the ticket to complete the project. Once the project has been completed, the ticket may be approved by the ticket manager. Changes to BI Artifacts may be allowed when the associated ticket has been approved and/or may be restricted when associated tickets are not approved. For example, when a portion of a ticket has been completed, deployment of the changes associated with the partial completion may be restricted until the ticket has been completed (e.g., approved for deployment). Restricting deployment of changes associated with tickets that are not approved may increase user satisfaction (e.g., since multiple deployments interfere with user activities) and/or improve BI environment performance (e.g., since tests may be performed on completed tickets prior to deployment which may catch errors, etc.).

In some implementations, when the first copy and/or the second copy is generated based on content in the external version control, the BI Artifacts may be converted from a second format to a first format. The SI system may alter the format of the BI Articles prior to generating the first copy and/or the second copy. The first format may be executable in the BI environment and the second format may not be executable in the BI environment. The second format may be storable by the external version control and the first format may not be an appropriate format for storing files in the external version control.

In various implementations, when a determination is made that a conflict does not exist, the first copy of the BI Artifact(s) altered by the set of alterations, the merged copy of the BI Artifact(s), the set of first alterations, and/or the second alterations may be deployed in the BI environment. For example, the SI system may request that the first alterations be applied to the BI Artifact(s) by the BI environment. In some implementations, the SI system may cause the first copy to be deployed in the BI environment.

Figure 6:
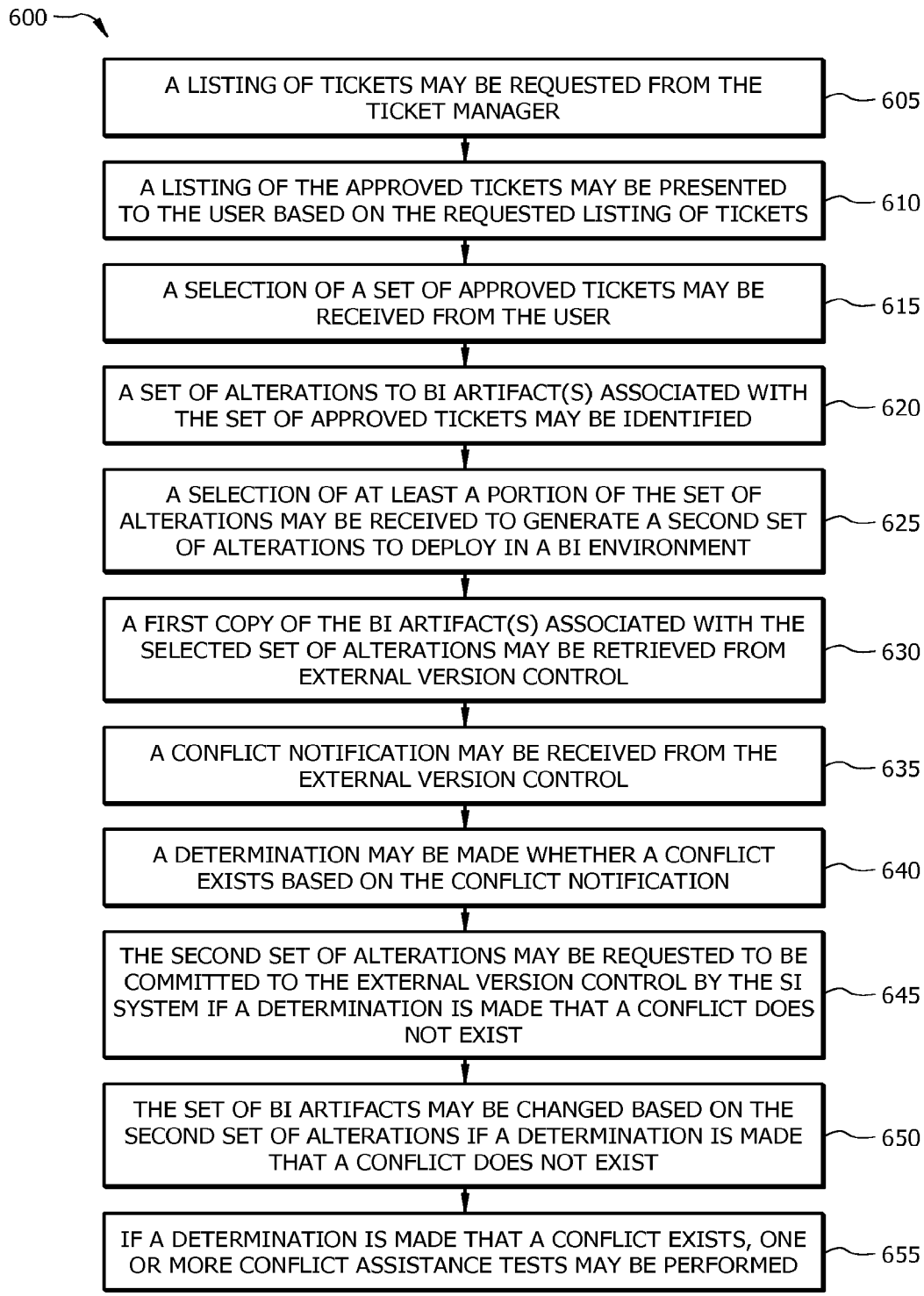
FIG. 6 illustrates an implementation of an example process to deploy BI Artifact(s) in association with tickets.

FIG. 6 illustrates an implementation of an example process 600 to deploy BI Artifact(s) in association with tickets. The ticket manager may be an external ticket manager that manages projects via tickets. The tickets may be assigned to users and/or may be selected for completion by users. The tickets may be associated with a problem, an upgrade, and/or a patch, in some implementations. Users may change one or more BI Artifacts associated with the ticket to complete a ticket and to obtain approval for the ticket. A listing of tickets may be requested from the ticket manager (operation

605). The listing of tickets may include which tickets have been approved and which tickets have not been approved. The listing may include one or more tickets. The SI system may request the listing of tickets from the ticket manager.

A listing of the approved tickets may be presented to the user based on the requested listing of tickets (operation 610). A ticket may be automatically approved when BI Artifacts associated with the ticket are altered or checked in via the SI system. In some implementations, a user, such as the user who altered BI Artifacts in response to a ticket and/or a supervisor, may indicate that a ticket has been approved. The SI system may generate a listing of approved tickets based on the request for a listing of tickets. In some implementations, the SI system may request identification of the approved tickets and present at least a portion of the listing of approved tickets to a user.

A selection of a set of approved tickets may be received from the user (operation 615). The user may select a set of approved tickets from the listing of approved tickets (e.g., via an interface generated to present the listing of approved tickets). The set of approved tickets may or may not include all of the approved tickets.

A set of alterations to BI Artifact(s) associated with the set of approved tickets may be identified (operation 620). One or more changes (e.g., a set of alterations) to BI Artifact(s) are made in response to a project in a ticket. Thus, in approved tickets a set of alterations may include the changes made to associated BI Artifact(s). The SI system may identify the set of alterations based on requests to external version control, ticket manager, users, etc.

A selection of at least a portion of the set of alterations may be received to generate a second set of alterations to deploy in a BI environment (operation 625). The user may select a part of or the entire set of alterations associated with the selected set of approved tickets. For example, the set of alterations may be presented to the user (e.g., via an interface generated in the BI environment by the SI system), and user selections from the set of alterations may be received by the SI system via the interface. The selection may be stored (e.g., in a memory of the SI system and/or external version control).

A first copy of the BI Artifact(s) associated with the selected set of alterations may be retrieved from external version control (operation 630). The SI system may determine which BI Artifact(s) are associated with the selected set of alterations and may retrieve the BI Artifact(s) from external version control. The SI system may check out the BI Artifact(s) to the user. The SI system may generate a first copy based on the retrieved BI Artifact(s) from the external version control. The selected set of alterations may be applied to the first copy of the BI Artifact(s). In some implementations, the first copy of the BI Artifact(s) may be merged with the BI Artifact(s) to which the selected set of alterations has been applied. The first copy of the BI Artifact(s) and/or the merged copy may be transmitted by the SI system to the external version control.

A conflict notification may be received from the external version control (operation 635). The conflict notification may be transmitted from the external version control to the SI system. The conflict notification may include whether the commitment to the external version control had a conflict and/or did not have a conflict.

A determination may be made whether a conflict exists based on the conflict notification (operation 640). The SI system may determine whether a conflict exists for the selected set of alterations based on the received conflict notification. In some implementations, one or more conflict assistance tests may be executed (e.g., by the SI system and/or by the BI environment based on a request from the SI system) to facilitate determining whether a conflict exists.

The second set of alterations may be requested to be committed to the external version control by the SI system if a determination is made that a conflict does not exist (operation 645). If a conflict exists, the user may attempt to resolve the conflict by making one or more changes to the selected set of alterations to generate a second set of alterations. The second set of alterations may be merged into a second copy of the BI Artifacts and/or may be transmitted to the external version control for commitment.

The set of BI Artifacts may be changed based on the second set of alterations if a determination is made that a conflict does not exist (operation 650). The external version control may transmit a conflict notification based on the commitment of the second set of alterations to the external version control and a determination may be made at least partially on the conflict notification if a conflict exists. If a conflict does not exist, the second set of alterations may be committed to the external version control and the second set of alterations may be applied to the BI Artifacts in the BI environment.

If a determination is made that a conflict exists, one or more conflict assistance tests may be performed (operation 655). The SI system may determine that a conflict exists based at least partially on the conflict notification. The SI system may execute and/or request execution of conflict assistance tests by the BI environment. The results of the conflict assistance test(s) may be presented to a user.

The user may attempt to resolve the conflict based on the results of the conflict assistance test(s). One or more alterations to the second set of alterations may be provided by the user (operation 660). The user may provide the second set of alterations based on the results of the conflict assistance test(s). The second set of alterations may then be committed to the external version control and/or applied to the BI Artifacts in the BI environment.

One or more override requests may be provided by the user (operation 665). The user may select to provide an override request to a determination that a conflict exists rather than alter the BI Artifact when presented with a conflict notification and/or results of a conflict assistance test. The override request may allow BI Artifacts in which a conflict has been determined to exist by the SI system to be committed to the external version control and/or be applied to BI Artifacts in the BI environment. In some implementations, a user may need to have a specific permission (e.g., such as a supervisor in a BI environment) to provide an override request.

Process 600 may be implemented by various systems, such as the systems illustrated in FIGS. 1A and 1F. In addition, various operations may be added, deleted, and/or modified. For example, conflict resolution tests may be performed if a conflict is determined not to exist based at least partially on the conflict notification.

In some implementations, the set of BI Artifacts in the first copy of the BI Artifacts may be merged with the set of BI Artifacts in the set of BI Artifacts to generate a merged set of BI Artifacts. The merged set may be transmitted to the external version control. A determination may be made if a conflict exists based on the transmission of the merged set of BI Artifacts to the external version control. The set of BI Artifacts in the BI environment may be requested to be changed based on the set of alterations if a determination has been made that the conflict does not exist.

In some implementations, determining whether a conflict exists between the transmitted set of alterations and the second copy of the BI Artifacts may be based at least partially on the conflict notification from the external version control and/or conflict assistance test. The conflict assistance test(s) may be based on a comparison between the retrieved first copy of the set of BI Artifacts and the second set of alterations.

Figure 7:
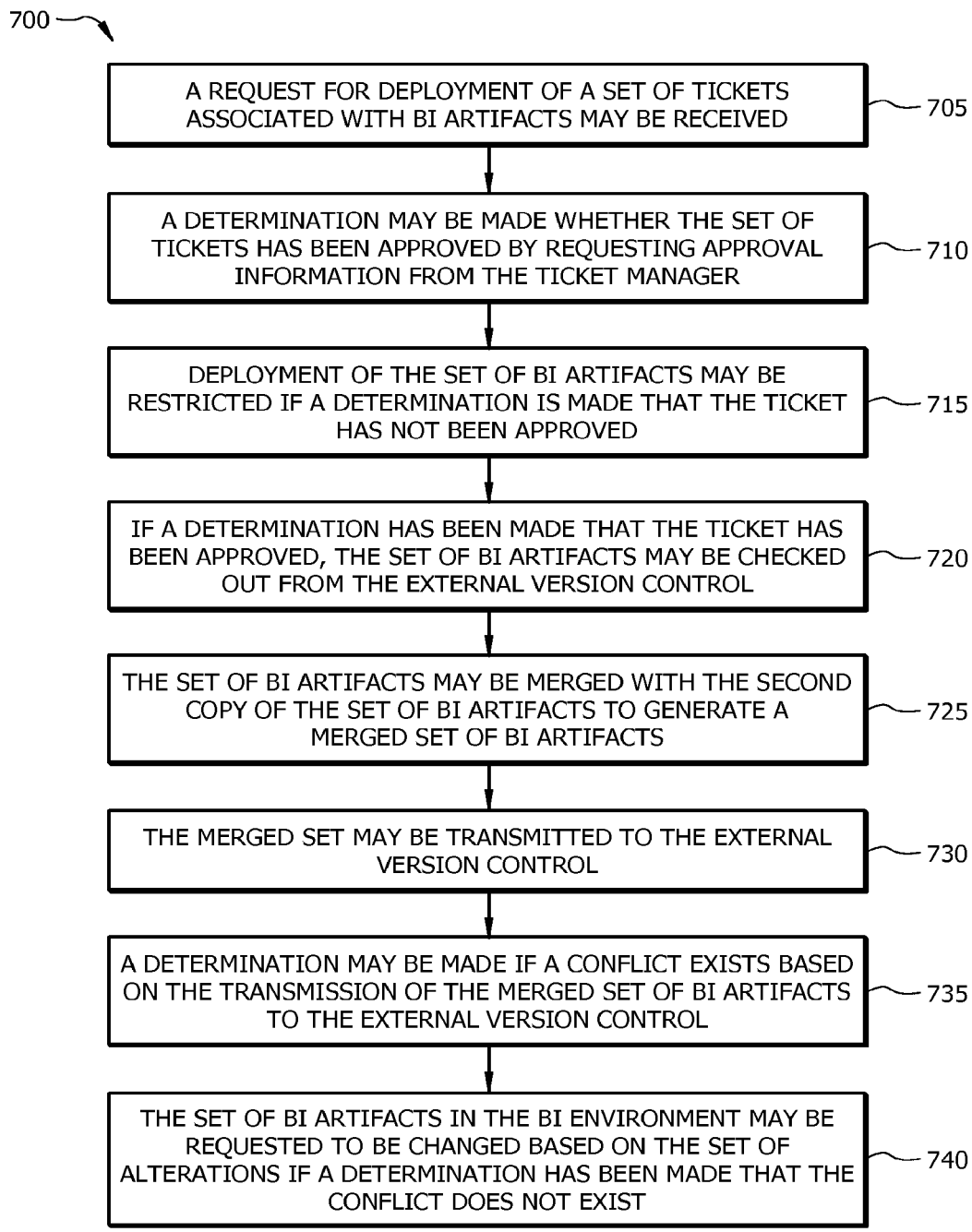
FIG. 7 illustrates an implementation of an example process to deploy BI Artifact(s) in association with tickets.

FIG. 7 illustrates an implementation of an example process to deploy BI Artifact(s) in association with tickets. A request for deployment of a set of tickets associated with BI Artifacts may be received (operation 705). For example, a user may request deployment of a set of tickets. The user may select the tickets and/or provide other ticket identifying information to the SI system.

A determination may be made whether the set of tickets has been approved by requesting approval information from the ticket manager (operation 710). For example, the SI system may communicate with the ticket manager to determine if the set of tickets has been approved. In some implementations, the SI system may transmit the set of tickets and/or identifying information related to the set of tickets to the ticket manager and receive an indication from the ticket manager of whether the set of tickets or portions thereof have been approved.

Deployment of the set of BI Artifacts may be restricted if a determination is made that the ticket has not been approved (operation 715). The SI system may restrict deployment of the set of BI Artifacts associated with the ticket(s) if the ticket manager indicates that the set of tickets has not been approved. By restricting deployment of unapproved tickets, instability and/or errors based on hasty deployment and/or partial deployments may be minimized.

If a determination has been made that the ticket has been approved, the set of BI Artifacts may be checked out from the external version control (operation 720). For example, the SI system may determine which BI Artifact(s) and/or which version(s) of BI Artifacts are associated with the set of tickets. The SI system may then generate a check out record for the BI Artifact(s) (e.g., which include a version of the BI Artifact and/or user information). The SI system may generate a second copy of the BI Artifact(s) in the set of BI Artifacts based on BI Artifacts retrieved from the external version control.

The set of BI Artifacts may be merged with the second copy of the set of BI Artifacts to be generate a merged set of BI Artifacts (operation 725). The second copy of the set of BI Artifacts may include alterations to the BI Artifact(s) from other users, thus the copy of the BI Artifacts utilized by the SI system to generate the set of BI Artifacts for the approved tickets may not be the most recent version. To apply the alterations associated with the tickets to the most recent version of the BI Artifact deployed in the BI environment and/or present as the working copy, the set of BI Artifacts may be merged with the second copy. The merged copy may include the alterations provided in association with the tickets and the alterations that make the second copy different, if the second copy is different, from the set of BI Artifacts on which the alterations were made.

The merged set of alterations (e.g., based on the alterations provided in association with the tickets and the alterations that make the second copy different) may be transmitted to the external version control (operation 730). The SI system may transmit the merged set to the external version control. By transmitting the merged set to the external version control a record of changes to the same BI Artifact (e.g., based on record of alterations, based on same identification code, etc.) may be maintained. Maintaining a record of changes may facilitate identification of introduction of errors, historical views, etc.

A determination may be made if a conflict exists based on the transmission of the merged set of BI Artifacts to the external version control (operation 735). The external version control may transmit a conflict notification and/or conflict assistance tests may be executed (e.g., by the SI system and/or at the request of the SI system) on the merged set. The SI system may determine whether a conflict exists based on the conflict notification, results of conflict assistance tests, and/or user provided information (e.g., changes and/or override requests) to resolve conflicts.

The set of BI Artifacts in the BI environment may be requested to be changed based on the set of alterations if a determination has been made that a conflict does not exist (operation 740). The SI system may request deployment of the set of BI Artifacts in the BI environment and/or commitment in the external version control.

Process 700 may be implemented by various systems, such as the systems illustrated in FIGS. 1A and 1F. In addition, various operations may be added, deleted, and/or modified. For example, a request for deployment of a set of BI Artifacts may be received rather than and/or in addition to a request for deployment of a set of tickets. The ticket associated with the set of BI Artifacts may be determined by the SI system (e.g., the SI system may communicate with the ticket manager to determine with which ticket(s) a set of BI Artifacts are associated and/or the SI system may retrieve from a memory of the SI system, external version control, etc. with which ticket the set of BI Artifacts are associated).

In some implementations, determining if a conflict exists may be based at least partially on the conflict notification and/or conflict assistance test(s). The conflict assistance test(s) may be based on a comparison between the checked out set of BI Artifacts and the merged set of BI Artifacts.

In some implementations, the set of BI Artifacts (e.g., first copy) and the second copy of BI Artifacts may include the same contents (e.g., the contents were not updated and/or otherwise altered).

In some implementations, BI artifacts may be executed, viewed, presented, and/or edited in one or more of the BI environments. For example, a Report A created in BI environment A may be modified by a user in BI environment A. If Report A is deployed in BI environment B, the deployed Report A may be modified in BI environment B and the Report A may be modified in BI environment A, in some implementations.

In some implementations, a package (e.g., including one or more BI Artifacts and/or a property set including one or more Aspects of BI Artifact(s)) of a first BI environment may be deployed in a different BI environment. For example, a package may be created in a development BI environment and may be deployed in a QA BI environment. In some implementations, a package tested in a QA BI environment may be deployed in a production BI environment. When the package is deployed, the SI system may access the package from the first BI environment and generate a copy of the package in the second BI environment, such that the BI Artifacts in the copied package may be tested and/or run in the second BI environment. For example, the SI system may retrieve a copy of the package from a database coupled to the SI system (e.g., SI database) and generate the package in the second BI environment based on the retrieved copy.

In some implementations, the SI system may alter (e.g., automatically and/or manually, for example, by prompting the user to provide the appropriate alteration) BI Artifact(s) prior to deploying BI Artifact(s). For example, the SI system may receive a request from a user for deployment of a BI Artifact, such as Report A, from BI environment B to BI environment C. Report A may have been created in BI environment A and previously deployed in BI environment B. The SI system may identify and retrieve a set of deployment criteria. For example, the deployment criteria may include predetermined rules (e.g., stored in a memory of the SI system). The SI system may modify and/or restrict modification of the BI Artifact for deployment based on the deployment criteria. For example, when deploying a BI Artifact from a BI environment to a different BI environment, file paths may need to be altered (e.g., to be associated with the correct database). Thus, for example, the deployment criteria may identify the origin (e.g., BI environment in which the BI Artifact was created), the residence (e.g., the BI environment from which the BI Artifact is requested to deploy), and/or the target (e.g., the BI environment in which the BI Artifact will be deployed). The deployment criteria may then alter the BI Artifact based at least partially on the identified origin, residence, and/or target. For example, if the BI Artifact includes images, then the file paths to the images may be altered such that they correspond to an appropriate source of the images that is accessible in the target BI environment. The deployment criteria may be user specified. In some implementations, a configuration of a BI artifact may be altered to be appropriate for a target BI environment.

In some implementations, when the SI system generates a copy of a set of BI Artifacts, the SI system may retrieve the set of BI Artifacts from the external version control and convert the file retrieved to a format appropriate for the BI environment. For example, the SI system may generate a copy of an object based on file(s) retrieved in the external version control by constructing files that represent the objects in a content store based on the retrieved file(s).

In various implementations, changes to BI Artifact(s) may be managed. A BI Artifact may be checked out for a user to alter and the BI Artifact may be checked in to apply the changes to the BI environment and/or to commit the changes to external version control. By committing the changes to external version control, the alterations to a BI Artifact may be tracked and/or saved. In addition, a record (e.g., a check out record) may track who applied the changes to the BI Artifact.

In some implementations, checking out BI Artifacts may include: identifying a request from a first user for access to a set of BI Artifacts that reside in a first BI environment; determining the contents of the requested set of BI Artifacts; requesting a version identification for each of the BI Artifacts in the requested set of BI Artifacts from the external version control; generating a first copy of the requested set of BI Artifacts in the first BI environment such that the generated first copy of the requested set of BI Artifacts does not overwrite the set of BI Artifacts that reside in the first BI environment; generating a check out record using a SI system based on the determined version identification of the requested set of BI Artifacts and user information associated with the first user; and/or storing the generated check out record in a memory coupled to the SI system. The set of BI Artifacts may include one or more BI Artifacts. The contents of the requested set of BI Artifacts may be determined from the BI environment. The SI system may be communicably coupled to the external version control and the BI environment.

In some implementations, the SI system may identify alterations to the first copy of the set of the BI Artifacts generated in the first BI environment. Identifying alterations to the first copy of the set of BI Artifacts generated in the first BI environment may include monitoring communication(s) in the first BI environment. The identified alterations may be stored (e.g., in a local copy, a memory of the SI system, and/or in an external version control).

In some implementations, alterations to the first copy of the set of the BI Artifacts generated in the first BI environment may be identified to generate a first set of alterations. The determined set of alterations may be transmitted to an external version control (e.g., for commitment). A second copy of the set of BI Artifacts may be retrieved from the external version control. A conflict notification may be received from the external version control based on the transmitted set of alterations and/or a second copy of the set of BI Artifacts stored in a memory of the external version control. The second copy of the set of BI Artifacts may be the same as the set of BI Artifacts in the BI environment (e.g., associated with the same identification code, identified manually as the same, such as by a user, and/or identified automatically as the same by the SI system and/or the external version control). The conflict notification may identify whether a conflict exists between the transmitted set of alterations and the second copy of the set of BI Artifacts. A determination may be made whether a conflict exists between the transmitted set of alterations and the second copy of the set of BI Artifacts based on the conflict notification and/or conflict assistance test(s). The conflict assistance tests may include a test based on a comparison between the retrieved second copy of the set of BI Artifacts and the first copy of the set of BI Artifacts. If a determination is made that a conflict does not exist, the set of alterations may be committed to the set of BI Artifacts residing in the external version control and/or the set of BI Artifacts in the BI environment may be changed based on the set of alterations. For example, the SI system may transmit the set of alterations and/or a copy of the set of BI Artifacts that include the set of alterations to the external version control. The SI system may change BI Artifacts in the BI environment by transmitting the set of alterations to the set of BI Artifacts in the content store and/or deploying a set of BI Artifacts with the alterations, in some implementations.

In some implementations, a determination may be made whether other BI Artifact(s) are referenced by the BI Artifact(s) in the set of BI Artifacts. A second set of BI Artifacts including one or more of the other BI Artifacts that are determined to be referenced by one or more of the BI Artifacts in the set of BI Artifacts may be generated (e.g., if a determination is made automatically by the SI system and/or manually by the user that one or more of the other BI Artifacts are referenced). The contents of the second set of BI Artifacts may be automatically determined from the external version control. For example, the SI system may request the contents of the BI Artifact(s) included in the second set of BI Artifacts. A second version identification may be requested for one or more of the BI Artifacts in the requested second set of BI Artifacts from the external version control. In some implementations, a version identification may be requested for each of the BI Artifacts. A first copy of the second set of BI Artifacts may be generated in the first BI environment such that the generated first copy of the second set of BI Artifacts does not overwrite the second set of BI Artifacts that resides in the first BI environment. A second check out record may be generated using the SI system based on the determined second version identification of the second set of BI Artifacts and user information associated with the first user. In some implementations, the second check out record may be a new check out record and/or an altered version of the first check out record. The generated second check out record may be stored (e.g., by the SI system) in the memory coupled to the SI system, in some implementations.

In some implementations, alteration of the first copy of the second set of BI Artifacts in the first BI environment may be restricted.

In some implementations, alterations to the first copy of the set of the BI Artifacts generated in the first BI environment may be identified to generate a first set of alterations. The first set of alterations may include one or more alterations (e.g., changes) to one or more of the BI Artifacts in the set of BI Artifacts. The determined set of alterations may be transmitted to an external version control. A second copy of the set of BI Artifacts may be retrieved from the external version control. A conflict notification may be received from the external version control based on the transmitted set of alterations and/or a second copy of the set of BI Artifacts (e.g., stored in a memory of the external version control). The second copy of the set of BI Artifacts may be the same as the set of BI Artifacts in the BI environment. The conflict notification may identify whether a conflict exists between the transmitted set of alterations and the second copy of the set BI Artifacts. A determination may be made by the SI system whether a conflict exists between the transmitted set of alterations and the second copy of the set of BI Artifacts based on the conflict notification and/or one or more conflict assistance tests. At least one of the conflict assistance tests may be based on a comparison between the retrieved second copy of the set of BI Artifacts and the first copy of the set of BI Artifacts, the set of alterations, and/or the first copy of the set of BI Artifacts and the first copy of the second set of BI Artifacts. If a determination is made that a conflict does not exist by the SI system, the set of alterations may be committed to the set of BI Artifacts residing in external version control (e.g., the SI system may request that the external version control commit the set) and/or the set of BI Artifacts in the BI environment may be changed based on the set of alterations (e.g., the SI system may transmit the changes to the BI environment).

In some implementations, generating a first copy of the requested set of BI Artifacts in the first BI environment may include generating the first copy on a local drive.

In some implementations, decisions regarding deployment of a set of BI Artifacts may be on an enterprise level. Thus, an enterprise may analyze the BI Artifacts in an external version control (e.g., a working copy, a development project, a previously deployed and/or generated version, etc.) and identify a set of BI Artifacts stored in the external version control to deploy. The SI system may receive an identification of the set of BI Artifacts for deployment and retrieve the set of BI Artifacts from the external version control (e.g., a memory of the external version control).

In some implementations, the external version control may include a server coupled to a memory such as a repository. The external version control may include instructions that version files from specified file paths. The external version control may include software, such as commercially available enterprise version control software, stored on a memory of the external version control and executed by a processor of the external version control. The SI system may be capable of communicating (e.g., receiving communications, retrieving data, transmitting data, etc.) with the external version control.

In some implementations, the ticket manager may include a server coupled to a memory. The ticket manager may include software, such as commercially available enterprise ticket management and/or workflow management software, stored on a memory of the ticket manager and executed by a processor of the ticket manager. The SI system may be capable of communicating (e.g., receiving communications, retrieving data, transmitting data, etc.) with the ticket manager.

In various implementations, a method for checking in a set of BI Artifacts may include: determining a set of alterations to a first copy of a set of BI Artifacts; receiving a request from a user to commit the set of alterations to a BI environment; transmitting the determined set of alterations to an external version control; retrieving a second copy of the set of BI Artifacts from the external version control; receiving a conflict notification from the external version control based on the transmitted set of alterations and a second copy of the set of BI Artifacts stored in a memory of the external version control, determining whether a conflict exists between the transmitted set of alterations and the second copy of the BI Artifacts based on the conflict notification and one or more conflict assistance tests; allowing the alterations to be committed to the set of BI Artifacts residing in external version control if a determination is made that a conflict does not exist; and/or allowing the set of BI Artifacts in the BI environment to be changed based on the set of alterations if a determination is made that a conflict does not exist. The second copy of the set of BI Artifacts is the same (e.g., same version, identified as the same based on an identification code, identified as the source of the generated copy from a check out record, and/or otherwise identified) as the set of BI Artifacts in the BI environment. The conflict notification may identify whether a conflict exists between the transmitted set of alterations and the second copy of the set of BI Artifacts. At least one of the conflict assistance tests may be based on a comparison between the retrieved second copy of the set of BI Artifacts and the first copy of the set of BI Artifacts. A conflict assistance test may be executed by the SI system and/or the SI system may request execution of the test. The conflict assistance test may include any appropriate test. Allowing the alterations to be committed to the set of BI Artifacts residing in external version control may include transmitting the set of alterations to the external version control. Allowing the set of BI Artifacts in the BI environment to be changed based on the set of alterations may include transmitting the set of alterations to the BI environment.

In some implementations, the first copy of the set of BI Artifacts resides in the BI environment such that the first copy of the set of BI Artifacts does not overwrite the set of BI Artifacts in the BI environment. Alterations to be committed to the external version control may be restricted if a determination is made that a conflict exists.

In some implementations, the set of BI Artifacts in the BI environment is not changed based on the set of alterations if a determination is made that a conflict does exist. For example, the alteration set may not be transmitted to the BI environment. In some implementations, a communication that causes the change may be intercepted and not retransmitted to a component of the BI environment (e.g., a node, such as a database driver).

In some implementations, at least one of the conflict assistance tests may be based on a comparison between a portion of the first copy of the set of BI Artifacts that was not altered by the set of alterations and a corresponding portion in the second copy of the set of BI Artifacts. At least one of the conflict assistance tests may be based on a comparison between a first portion of the first copy of the set of BI Artifacts and a corresponding portion in the second copy of the set of BI Artifacts. The first portion may include a portion of the first copy of the set of BI Artifacts that references a second portion of the first copy of the set of BI Artifacts that was altered by the set of alterations. The first portion may include a portion of the first copy of the set of BI Artifacts that was not altered by the set of alterations.

In some implementations, the first copy of the set of BI Artifacts may be checked in and/or merged with another existing version and/or copy of the set of BI Artifacts. Merging the first copy with another copy may include identifying a set of differences between the retrieved second copy of the set of BI Artifacts and the first copy of the set of BI Artifacts; merging the identified set of differences into the first copy of the set of BI Artifacts to create a merged copy of the set of BI Artifacts, if a conflict does not exist between the identified set of differences and the set of alterations; allowing one or more of the conflict assistance tests to be applied to the merged copy of the set of BI Artifacts; determining whether a conflict exist between the first copy of the set of BI Artifacts and the second copy of the set of BI Artifacts based at least partially on the results of one or more of the allowed conflict assistance tests; transmitting the determined set of alterations to an external version control, if a determination is made that a conflict does not exist between the first copy of the set of BI Artifacts and the second copy of the set of BI Artifacts; and/or restricting transmission of the determined set of alterations to an external version control, if a determination is made that a conflict does exist between the first copy of the set of BI Artifacts and the second copy of the set of BI Artifacts. The conflict may be identified if a determination is made that a conflict does exist between the first copy of the set of BI Artifacts and the second set of BI Artifacts, and a user may provide a second set of alterations to the first copy of the set of BI Artifacts such that the conflict is resolved.

In some implementations, the changes from resolving a conflict may be committed and/or applied to BI Artifact(s) in the BI environment by: determining whether to change the set of alterations based on the provided second set of alterations; determining a second set of alterations based on the determination of whether to change the set of alterations; transmitting the determined second set of alterations to the external version control; receiving a second conflict notification from the external version control based on the transmitted second set of alterations and the second copy of the set of BI Artifacts stored in a memory of the external version control; determining whether a second conflict exists between the transmitted second set of alterations and the second copy of the set of BI Artifacts based at least partially on the conflict notification; allowing the second set of alterations to be committed to the external version control if a determination is made that a second conflict does not exist; and/or allowing the set of BI Artifacts in the BI environment to be changed based on the second set of alterations if a determination is made that the second conflict does not exist. The second conflict notification may identify whether a conflict exists between the transmitted second set of alterations and the second copy of the set of BI Artifacts.

In some implementations, determining a set of alterations may include intercepting one or more communications in the BI environment, wherein intercepting one or more communications comprises intercepting at least one of database queries in the BI environment, communications from a message bus, or communications in a BI environment between a user and a BI environment related to a set of BI Artifacts.

In some implementation, deploying tickets using the SI system may include: receiving a request for deployment of a set of tickets associated with set of BI Artifacts; determining if the set of tickets is approved by requesting approval information from the ticket manager; and restricting deployment of the set of BI Artifacts if a determination has been made that the ticket has not been approved. A ticket may be associated with one or more BI Artifacts, and to obtain approval of a ticket one or more changes may be performed on at least one of the associated BI Artifacts.

In some implementations, if a determination has been made that the ticket has been approved, the set of BI Artifacts may be checked out from an external version control. The set of BI Artifacts may be merged with the checked out set of BI Artifacts to generate a merged set of BI Artifacts. Merging the set of BI Artifacts with the checked out set of BI Artifacts may include applying the set of alterations to the set of BI Artifacts. The merged set of BI Artifacts may be transmitted (e.g., for commitment) to the external version control by the SI system, and a determination may be made whether a conflict exists based on the transmission of the merged set of BI Artifacts to the external version control. The set of BI Artifacts in the BI environment may be changed based on the set of alterations if a determination is made that a conflict does not exist. For example, the SI system may alter the set of BI Artifacts in the content store.

In some implementations, determining if a conflict exists may be based at least partially on conflict assistance test(s) executed by the SI system and/or of which the SI system requests execution. The conflict assistance tests may be based on a comparison between the checked out set of BI Artifacts and the merged set of BI Artifacts, in some implementations.

In some implementations, a listing of tickets may be requested from the ticket manager, the listing of approved tickets may be presented to a user, and a selection of a set of approved tickets may be received from the listing of approved tickets.

In some implementations, a portion of a ticket may be selected for deployment. A set of alterations to one or more BI Artifacts associated with the set of approved tickets may be identified, and a selection of at least a portion of the set of alterations may be received to generate a second set of alterations to deploy in a BI environment. The second set of alterations may be transmitted to an external version control, and a conflict notification may be received from the external version control based on the transmitted second set of alterations and a first copy of the set of BI Artifacts stored in a memory of the external version control. The conflict notification may identify whether a conflict exists between the transmitted set alterations and the first copy of the set BI Artifacts. The SI system may determine whether a conflict exists between the transmitted set of alterations and the second copy of the BI Artifacts based at least partially on the conflict notification. If a determination is made that a conflict does not exist, the second set of alterations may be committed to the set of BI Artifacts residing in external version control and/or the set of BI Artifacts in the BI environment may be changed based on the second set of alterations. In some implementations, determining whether a conflict exists between the transmitted set of alterations and the second copy of the BI Artifacts is further based on one or more conflict assistance tests, wherein at least one of the conflict assistance tests is based on a comparison between the retrieved first copy of the set of BI Artifacts and the second set of alterations.

In some implementations, if a determination is made that a conflict does exist, the second set of alterations may not be committed to the set of BI Artifacts residing in external version control (e.g., the external version control may produce an error message) and/or change to the set of BI Artifacts in the BI environment may be restrict. For example, an SI system may intercept a communication and restrict transmission of the communication to restrict the BI environment from applying the change based on the second set of alterations. In some implementations, to restrict changes in the BI environment based on the second set of alterations, the second set of alterations may not be transmitted by the SI system to the BI environment.

In some implementations, the SI system may facilitate deployment of a set of BI Artifacts (e.g., one or more BI Artifacts). FIG. 2B illustrates an example package deployment 243. When the package is stored, a label, such as Label A 200, may be associated with the package. As illustrated the label may be versioned, and the illustrated Label A may be a first version or v1. In some implementations, a BI artifact may be associated with a package, in some implementations. The package may include one or more BI Artifacts, in some implementations. As illustrated, the package may include three BI Artifacts, such as reports R1, R2, and R5. The BI Artifacts may be related, in some implementations. For example, R1 may include a reference to R2 (e.g., the BI Artifact R1 may refer to an output of BI Artifact R2), and R2 may include a reference to R5, and R5 may include a reference to R1. In some implementations, the BI Artifact R1 may contain a drill through link to BI Artifact R2. Thus, when the package is deployed to a second BI environment 246, direct sequential copying (e.g., copy R1, then copy R2, then copy R5) of the BI Artifacts in the package may be inhibited due to the references to other BI Artifacts. For example, when deploying R1 in the second BI environment 246, deployment may fail since R1 refers to R2 but R2 has not yet been deployed and/or an appropriate version of R2 has not yet been deployed in the second BI environment.

Thus, the SI system may allow a multipart deployment. The SI system may first copy a shell BI Artifact for one or more of the BI Artifacts in the package to the BI environment and then copy the BI Artifact(s) to the BI environment. The shell BI Artifact may include less information than the BI Artifact (e.g., a minimum amount of properties of the BI Artifact to be a viable BI Artifact in a BI environment). For example, a specification of a BI Artifact may not be included in the associated shell BI Artifact. In some implementations, the shell BI Artifact may not include reference to one or more other BI Artifacts (e.g., other BI Artifacts in the BI environment and/or other BI Artifacts in the package). The shell BI Artifact may include a name and/or type of BI Artifact. In some implementations, the shell BI Artifact may include a subset of the information associated with a BI Artifact.

Figure 2C:
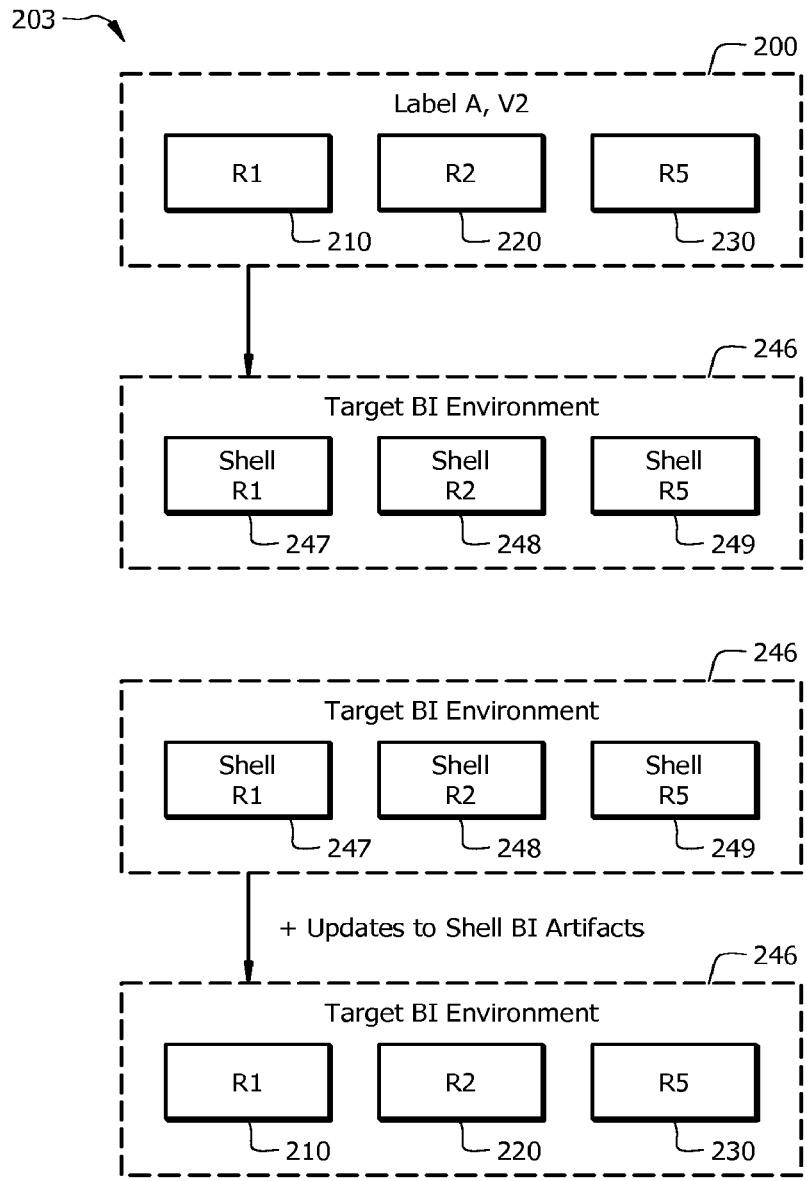
FIG. 2C illustrates an implementation of an example deployment.

For example, the SI system may receive a request for deployment of a package. The SI system may determine whether one or more of the BI Artifacts in the package include a reference to another BI Artifact in the package. For example, the SI system may perform a relational analysis on the package or portions thereof (e.g., based on path, depth of path, folder structure, etc.). The SI system may create a shell BI Artifact of one or more of the BI Artifacts in the package. The shell BI Artifact may include less information than the associated BI Artifact (e.g., may not include reference(s) to other BI Artifacts in the package). As illustrated in FIG. 2C, a package may include R1 210, R2 220, and R5 230. The SI system may first generate a shell R1 247, a shell R2 248, and a shell R5 249 and then generate R1, R2, and R5 in a target BI environment, such as second BI environment 246, after generating the shell BI Artifacts in the second BI environment. For example, the SI system may write shell R1, shell R2, and shell R5 and then overwrite each shell BI Artifact with the BI Artifact (e.g., R1, R2, and R5). The SI system may first write one or more of the shell BI Artifacts, and then, write additional information to the shell BI Artifact(s). For example, As illustrated in FIG. 2C the SI system may write shell R1 247, shell R2 248, and shell R5 249 and then write additional information to the shell R1 to create R1 210 in the second BI environment 246, to shell R2 220 to create R2 in the second BI environment, and/or to shell R5 to create R5 230 in the second BI environment 246. The additional information written to the shell BI Artifacts may differ and/or may be at least partially same.

In some implementations, the SI system may not determine whether references to other BI Artifacts in the package exist and may allow a multistep deployment. For example, if a package does not include BI Artifacts that reference each other, the SI system may allow a multipart deployment in which shells of the BI Artifacts are utilized. In some implementations, the SI system may identify a first set of BI Artifacts of a package that include a reference to other BI Artifacts and may allow multistep deployment (e.g., creation of a shell BI Artifact) for the identified first set of BI Artifacts. In some implementations, the SI system may retrieve the BI Artifacts in the package from a database coupled to the SI system rather than directly from the BI environment from which the package is being deployed. After the SI system has generated the package in the second BI environment, the package or portions thereof may be allowed to run in the second BI environment.

In some implementations, the SI system may be utilized to undo deployments and/or revert to previous deployments. The SI system may store versions of the BI Artifacts and/or other portions of the BI environments and/or SI systems (e.g., files, labels, etc.). Thus, as BI Artifacts, for example, are changed, the SI system may identify and/or store various versions of a BI Artifact (e.g., BI Artifact with a first change, BI Artifact with no change, etc.). In some implementations, if a user would like to revert to a previous version of a BI Artifact and/or package, the user may utilize the SI system to redeploy the previous version of the BI Artifact and/or package (e.g., since the BI environment may store only a single version (e.g., latest version, current version, etc.) of a BI Artifact and/or package).

Figure 2D:
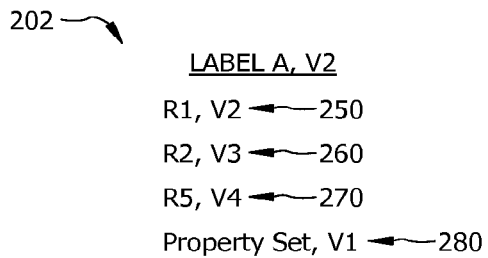
FIG. 2D illustrates an implementation of a second version of the example label illustrated in FIG. 2A.

The SI system may monitor and/or store (e.g., in a memory coupled to the SI system) versions of labels associated with packages, in some implementations. In some implementations, the SI system may allow a user to assign a label (e.g., alphanumeric characters) to package(s), property set(s), references (e.g., file paths) to package(s), and/or references to property set(s) associated with one or more of the packages. The SI system may allow changes to the package assigned to the label while retaining the label. The SI system may save the changes to the package as a version of the label. For example, the SI system may receive a label of Label A from a user to be associated with a package including BI Artifact, Query A, v1 (e.g., version 1 of the Query A). The user may change version of the Query A associated with Label A to Query A, v3 (e.g., version 3 of Query A) and the SI system may assign the modified package to a second version of the label, Label A, v2. FIG. 2D illustrates an implementation of an example second version of Label A.

For example, the SI system may receive a request for deployment of a previous version of a package. The previous version of the package may be the last version of the package deployed prior to the current version that has been deployed (e.g., to effectively undo a last deployment). The previous version of the package may be an earlier created package. The SI system may retrieve from a database (e.g., a SI database) coupled to the system the requested previous version of a package. The SI system may deploy the retrieved package. The SI system may utilize a multistep deployment, in some implementations.

In some implementations, the SI system may store a record of deployments. Thus, the user may request an undo and the SI system may automatically identify the version of the package that was deployed immediately prior to the last deployment and retrieve the identified version of the package. For example, since the SI system may utilize labels associated with one or more BI Artifacts, and identify and store versions of the labels. As illustrated in FIGS. 2A and 2D, the SI system may identify the version of the BI Artifact based at least partially on the label and/or version of a label. For example, if a user deploys a package associated with Label A, v2 and requests that the SI system undo the deployment, the SI system may automatically identify the previous version of the package based on the label. The SI system may identify Label A, v1 as the previous version of the package and deploy the package, Label A, v1, based on the user request.

In some implementations, the SI system may utilize version control (e.g., management and/or storage of various versions of portions of the BI environment and/or SI system) to facilitate one or more operations of the SI system. The SI system may allow version control by identifying changes to BI Artifacts and storing the BI Artifact (and/or changes to the BI Artifact) as a version of the BI Artifact. The SI system may store the versions of the BI Artifact in a database coupled to the SI system, such as a SI database, and/or in an external version control. In some implementations, the SI database may store and/or store associated with the BI artifact other information related to the BI Artifact including metadata, such as an identify of the user who made a change, a change time, a comment about a nature of a change etc. In some implementations, the SI database may transmit other information related to the BI Artifact including metadata (e.g., an identify of the user who made a change, a change time, a comment about a nature of a change etc.) to be stored and/or stored associated with the BI artifact in the external version control. The SI database may be different from the database (e.g., content store database, external database, etc.) of the BI system. The SI system may identify new BI Artifact(s), deleted BI Artifacts, and/or changes to BI Artifact such as modifications, additions, revisions, and/or deletions. The SI system may identify changes using version control module(s) ("version control") of the SI system. For example, the SI system may monitor a BI environment at a predetermined interval and/or when manually prompted and/or modifications may be detected as they occur in the BI environment). When new BI Artifacts are identified and stored in the database (e.g., SI database and/or database associated with an external version control), a user may access the versions through the SI system. Thus, a user may be able to access previous versions of BI Artifacts, identify changes between versions of BI Artifacts since access to versions of the BI Artifacts are identified, identify when changes are made, identify changes in packages, undo changes and/or deployments, etc. through the SI system (e.g., as opposed to in the BI environment where versions may not be stored or tracked).

In some implementations, the SI system may identify and/or store (e.g., in a memory of the SI system and/or transmit to be stored in the external version control) versions of other components of the SI system and/or BI environment, such as files, labels, property sets (e.g., a collection of one or more properties that apply to one or more types of BI artifacts), etc. In various implementations, the SI system may allow version control of files, such as metadata model files. For example, a user may utilize a tool of a BI environment, such as a Framework Manager in IBM Cognos, to create a metadata model file. The metadata model file may be stored on a user device (e.g., a user computer), in some implementations. The metadata model file may then be utilized to create a metadata model in a BI environment. The metadata model may be utilized with one or more BI artifacts in the BI environment. Thus, in some implementations, the metadata model file may be stored on a local computer system and the model generated by the metadata model file may be published to the BI environment. The SI system may identify and store (e.g., in the SI system and/or in an external version control, for example by transmitting the data to the external version control for storage) versions of the metadata model files and store associations with models generated. Thus, for example, when a model is deployed from a first BI environment to a second BI environment, the metadata model file and/or versions of the metadata model file associated with the model may be identifiable to other users based on the stored associations through the SI system. Thus, a user may be able to download, change, and/or view the metadata model file used to create a model that was deployed in a second BI environment even though it was created in a first BI environment. In some implementations, the stored associations may include associations between a metadata model file or versions thereof and packages and/or updates to deployments.

In some implementations, the SI system may allow version control (e.g., management and/or storage) of labels. For example, the SI system may allow users to associate a label with a package and/or one or more BI Artifacts. The package may include a set of BI Artifact(s) and/or property set(s). As changes are made to the package, a version of the label may be created and associated with the changes. For example, as illustrated in FIG. 2. The SI system may receive a Label A to be associated with a package that includes BI Artifacts, such as reports R1, R2, and R5 and a property set. The contents of the package(s), in some implementations, may be stored in and/or associated with a different folder than the package. For example, a BI Artifact, such as a report, may be stored in a portion of the BI environment (e.g., Content Store in IBM Cognos). In some implementations, content(s) of the package(s) may be stored in a folder in the BI environment, the SI system, and/or the external version control. In some implementations, each version of a Label A may be associated with specific versions of one or more of the contents of the package, such as BI Artifacts, files, and/or property sets. As illustrated, Label A, v1 is includes R1,v2; R2, v1; R5, v5; and property set, v2. The user may changes to the contents of the package (e.g., BI Artifacts may be updated or otherwise altered). For example, the user may change a version to a previous version or a later version of a BI Artifact; the user may alter a BI Artifact in the package, etc. The SI system may determine whether a package has been changed, in some implementations, and associate a new version of the label with the changed package. As illustrated, Label A, v2 includes R1, v2; R2, v3; R5, v4; and property set v1. Thus, by assigning a new version of a label to a changed package, the SI system may allow identification and access to previous versions of a package (e.g., to facilitate a deployment undo, to allow changes to be tracked and/or monitored, etc.). Allowing a package to keep the same label and allowing changes in the version of the label, may facilitate making changes to packages (e.g., groups of BI Artifacts for a business may be packaged together for multiple deployments under the same label, may provide a fail safe since BI Artifact and/or property sets in a previous deployment can be easily identified for later deployments, revisions may be easily managed, etc.).

In some implementations, the SI system may allow a user to automatically or manually update BI Artifact(s), one or more portions of BI Artifact(s), one or more packages, and/or portion(s) of a package. For example, the SI system may generate a user interface (e.g., a button on a BI environment widow) that allows a user to update a package or portion thereof that is associated with a label. In some implementations, the label may include one or more packages, one or more BI Artifacts and/or one or more property sets. A user may request update of the contents associated with a label and/or with one or more portions of a label (e.g., a package, a BI Artifact, and/or a property set).

In some implementations, when a user requests that a package identified in a BI environment be updated, the SI system may determine the label associated with the package. For example, the SI system may receive a selection of a package (e.g., via identification of a label, via selection of a button in a Report Studio, etc.) and a request an update of the contents of the package. The SI system may identify the contents of (e.g., BI Artifacts associated with) the package. The SI system may retrieve and/or identify the latest version (e.g., the last version) of the content(s) of the package (e.g., BI Artifacts), from a listing of versions of the contents of the BI Artifacts stored in a memory of the SI system. The SI system may alter the package to include the latest versions of each of the contents in the package, in some implementations. In some implementations, the SI system may assign a new version of the label associated with the changed package in the SI system. The SI system may then deploy the new version of the package to the BI environment based on a user request.

In some implementations, the SI system may be utilized to automatically or manually update the contents of a label. For example, a label may include contents frequently updated approximately concurrently (e.g., yearly update, updated at project milestones, manually updated together, and/or related BI Artifacts). A user may request update of the contents of a label by identifying (e.g., via a selection of the label and/or by entering the label) a label for updating. The SI system may identify the latest version (e.g., the last version) of the label and/or contents thereof (e.g., BI Artifacts and/or property sets). The SI system may alter the contents of the label to include the latest versions of each of the items (e.g., BI Artifacts and/or property sets) in the label, in some implementations. The SI system may associate a new version of the label with the changed label contents. The SI system may then deploy the new version of the contents of the label to the BI environment based on a user request. In some implementations, the SI system may store the new version in the external version control and/or utilize the stored new version to facilitate deployment in the BI environment based on a user request. For example, when a user requests deployment of a new version, the new version may be identified by the SI system (e.g., based on information in the SI system, such as check out records, and/or based on information in the external version control) and retrieved from the external version control for deployment in the BI environment.

In some implementations, the SI system may present the automatically updated label and/or package to the user. The user may confirm the request to update the label, package, and/or the contents of the package. The user may or may not provide one or more changes to the updated label (e.g., the user may restrict updating the property set to allow the previous property set to remain in effect) and/or updated package (e.g., the user may alter the version of BI Artifacts used in the package). The SI system may save the changes as a version of the labels, BI Artifacts, property sets, etc., as appropriate. The SI system may deploy the label contents and/or the package based on a user request (e.g. the user request may include information, such as information regarding: whether to automatically or manually deploy label contents and/or a package; whether to generate and wait for user initiated deployment of the package, in which BI environment to deploy the package, etc.).

In some implementations, the SI system may allow version control of property sets. For example, a property set may include a collection of properties, such as information about one or more BI Artifacts. Properties of a BI Artifact may include a number of different properties, including but not limited to, owner, contact, security permissions, etc. A SI system may identify changes to property sets and store (e.g., in a memory of the SI system and/or an external version control system) versions of property sets based on the changes. By allowing version control of property sets, properties of BI Artifacts may be managed, versioned and/or tracked. For example, if a property of a BI Artifact such as a security permission of a BI Artifact is altered, the change may be identified. In some implementations, version control of property sets may facilitate deployment between BI environments. For example, when a set of BI Artifacts in a package are to be deployed in a second BI environment, a property set may be removed from the package to retain the previously deployed property set (e.g., default values and/or property sets associated with previous versions of the BI Artifacts) associated with the second BI environment. In some implementations, a property set may be updated along with deployment of an update of BI Artifacts. For example, a user may request update of a package by identifying a label of a package. The SI system may automatically determine the latest version of components of the package such as BI Artifacts and property sets. Thus, the property set may be updated with an update of BI Artifacts by the SI system.

In some implementations, deployment of properties associated with BI Artifact(s) may be based at least partially on the property set. For example, the property set may include information regarding which properties associated with a BI Artifact are altered and/or updated and in which properties alteration is restricted. Thus, selected properties of a BI Artifact (e.g., which may be updated and/or altered) may be updated and/or altered based on the information in the property set and/or the versions of property sets stored in the SI system.

In various implementations, the SI system may allow version control of other components of the SI system and/or BI system, such as assertion types, test scripts, tests, external data sources, references to external data sources, instance settings, BI environment settings, SI system BI Artifacts, SI system settings, projects, etc. In some implementations, the SI system may automatically update the version of various component used in the SI system and/or BI system based on actions of the SI system. For example, when a deployment of a BI Artifact is updated and/or undone, a test case associate with the BI Artifact may be updated and/or undone as appropriate.

In some implementations, the SI system may be communicably coupled to an external version control system (e.g., corporate version control system). Some enterprises retain version control systems, such as commercially available document version control systems (e.g., IBM Rational ClearCase Change Management Solution), and have corporate governance standards that include updating the corporate version control system based on changes to other systems, such as BI environments. The SI system may communicate with the corporate version control system to allow automatic compliance with the corporate version control standards. For example, corporate governance standards may request updates based on criteria (e.g., time, changes made, etc.). The SI system may identify changes to the BI environment, SI system, or portions thereof as part of the SI version control operations. The SI system may compare the changes identified to the corporate version control standards criteria to determine if the change should be transmitted to the corporate version control system. The SI system may then transmit a change message (e.g., set of alterations, merged copies, copies to which changes have been applied, etc.) to the corporate version control system. The change message may include the change, information about the change, and/or other information (e.g., metadata, version number, etc.). The SI system may automatically transmit the change message into a format that is acceptable by the corporate version control system. A change message may include a set of alterations, merged copies, copies of BI Artifacts, and/or copies of BI Artifacts that have been altered, in some implementations.

In some implementations, the corporate version control system may request an update from the SI system for changes during a specific time period. The SI system may receive the request and identify changes during the specified time. The SI system may then automatically generate a change message that includes information about the identified changes (e.g., BI Artifacts, property sets, reports, etc.) in a first format. The first format may be a different format than the format utilized by the BI system and/or the SI system (e.g., the SI system may translate and/or transform BI Artifacts from the BI environment into an XML file). In some implementations, the first format may include notes and/or other information in addition to the content of the change (e.g., information about a BI Artifact change such as time and user in addition to the BI Artifact). The SI system may then transmit the generated change message to the corporate version control system. In some implementations, a user may trigger a request from a corporate version control system to request an update of changes and/or the corporate version control system may automatically request the update based on time, date, changes in the corporate version control system, etc.

In some implementations, the corporate version control system may request that a specific version be implemented in the BI environment (e.g., a rollback, revert to previous version, automatically update BI Artifacts, etc.). The corporate version control system may transmit a message to the SI system identifying which version the corporate version control system would like to deploy in the BI environment, such as a production BI environment. The SI system may receive the message and identify in the SI database and/or external version control which components, such as package(s), BI Artifact(s), property set(s), test(s), etc. to deploy based on the message. The SI system may then deploy the identified components in the BI environment based on the request from the corporate version control system. For example, the corporate version control system may request that recent expanded security permissions be reverted to old security permissions. The corporate version control system may transmit a request to the SI system to allow the reversion to old security permissions. The SI system may identify the property set associated with the old security permissions (e.g., a previously deployed property set), retrieve the old security permissions (e.g., from a SI memory and/or external version control memory), and deploy the identified property set in the appropriate BI environment based on the request from the corporate version control system.

In some implementations, the SI system may automatically ignore some changes, for example, when determining whether a change has occurred and/or whether to create a new version (e.g., of a BI Artifact, a label, a property, etc.). For example, the SI system may determine whether a change has occurred in a component such as a BI Artifact, package, or property set. The SI system may retrieve two versions of the component (e.g., current version and a previous version, such as the last version). The SI system may then compare the two versions of the component and determine whether differences exist between the two versions. The SI system may then retrieve a set of portions to ignore (e.g., when a column of a report is defined to change between runs, page functions, day report is run, etc.). The SI system may then determine if the determined differences include items in the set of portions to ignore to determine whether a change has occurred between the two versions.

In some implementations, the SI system may automatically include markers (e.g., HTML markers) such that when a BI Artifact is run or executed the markers are inserted into the output, as appropriate. The markers may be associated with aspects of an output. For example, the SI system may include markers in the specification of the BI Artifact. The markers may be used to facilitate identification of differences. In some implementations, it may be difficult to identify similar portions based on the output and thus the markers may be used to identify portions such that differences between the same portion may be determined. Thus, by utilizing the markers the identification of which portions to include in the set of portions to ignore may be determined after reports, for example, are run and/or may be altered since the markers facilitate identification of portions in components. In some cases, these markers may be non-visual (e.g., the marker may not be displayed in the output of the BI Artifact). For example, a marker may include an XML tag and/or HTML comment and presentation of the marker in the output of the BI Artifact may be restricted.

In various implementations, the SI system may be utilized to test one or more packages or portions thereof. In some implementations, test(s) may be utilized as conflict assistance test(s). The SI system may utilize, but is not limited to utilizing, the conflict assistance test(s) to identify conflicts, facilitate user resolution of conflicts, and/or to identify differences between copies and/or in merged copies, for example. Some BI environments may not include tests that can be executed on various BI Artifacts in the environment. Testing through the SI system may allow problems in packages or portions thereof to be discovered prior to deployment in a production BI environment and/or may allow early identification of a problem in a BI environment.

A test may include one or more assertions by which a component, such as a BI Artifact or property set may be evaluated. An assertion may include one or more checks, criteria, or steps that may be performed on a component (e.g., a selected component and/or related component, such as a component related based on analysis by the SI system and/or input provided by a user.), such as a report, folder, or package. An assertion may be associated with a test case and may be run when the test case is run. For example, an assertion may include: criteria such as whether the component includes a predefined value, criteria such as whether a BI Artifact is a predefined type, criteria such as whether the component has changed (e.g., change compared to a different version and/or set of portions to ignore), criteria such as whether the component failed, etc. The SI system may include a predefined set of tests and/or allow custom tests to be generated by a user.

A test may be generated using a studio of the SI system, such as an assertion studio. The SI system may receive a request for creation of a test from a user. The SI system may receive an identification of a component, such as a BI Artifact, to be associated with the test. The SI system may generate a listing of assertions from which a user may select one or more assertion. The user may provide a custom assertion, in some implementations. The SI system may receive one or more assertions to be associated with the test. The SI system may generate the test based on the received assertions.

In some implementations, the listing of assertions generated for presentation to a user may be based at least partially on the identification of the BI Artifact received. For example, a portion of the assertions may be capable of being performed on a predetermined set of BI Artifact types. Thus, the identification of a BI Artifact may allow the SI system to determine which assertions should be included in the listing based on the identification of the BI Artifact.

In some implementations, an assertion may include a type, such as a pre-execution assertion (e.g., may be determined without execution of a BI Artifact) or a post-execution assertion. For example, an assertion may include evaluations of report specification (e.g., colors, spacing, etc.), which may be determined pre-execution. In some implementations, an assertion may include evaluations of a post execution output, such as whether a file is generated in an appropriate format. The test may be restricted from including more than one type of assertion, in some implementations.

In some implementations, when the generated test is run, the assertion may include one or more parts that prompt a user for information. For example, if the assertion is to determine whether a run time is less than a value, when the test is run, the assertion may prompt the user to provide the value (e.g., 2 hours). In some implementations, a user may provide the value(s) used in the assertions when generating the test.

The assertions may allow changes (e.g., when compared to previous versions, gold copy versions, and/or sets of portions to ignore) between outputs to be identified. For example, changes in stability may be identified, changes in memberships, changes in security, etc. may be identified using tests based on assertions. For example, a change in stability may be identified when error messages appear in columns of data. A change in stability may be identified by the SI system when an invalid file path is utilized to generate a report output.

In some implementations, a test may be generated that includes assertions that compare an output such as a report output generated by a report BI Artifact to a predefined output. For example, the SI system may receive a request for evaluation of a report. The SI system may retrieve the test and request identification of a master report output upon which the comparison should be made. In some implementations, the test may include an identification of a master report output and/or a default value. The SI system may receive the identification of a master report output from the user and may retrieve the master report. For example, the user may designate a previously generated Report Output as the master report output to which a report output generated by the report being tested may be compared in a test. The SI system may then allow the report BI Artifact to be run and compare the report output from the report BI Artifact to the master report output. The differences (e.g., based on the comparison to the master report and/or a set of portions to ignore) in the report BI Artifact may be identified. In some implementations, the SI system may retrieve at least a portion of the data (e.g., columns, rows, individual data points) on which the report output is based from the external database. Thus, the SI system may identify differences based at least partially on data from databases based on which BI Artifact outputs are generated (e.g., by requesting from and retrieving the data from the databases). In some implementations, the SI system may determine a value by performing one or more calculations (e.g., based on criteria in an assertion of a test, such as column x, row y+column n, row z). The value determined by the SI system may be compared to the value included in the report to determine if a difference exists between the two values. In some implementations, the BI Artifact outputs and/or properties thereof, such as report outputs and/or execution times, may be compared between two or more BI environments running the same BI Artifact. Differences (e.g., based on a comparison of at least two of the outputs and/or a set of portions to ignore) between the outputs may be identified. The differences may be presented to a user and/or one or more messages may be transmitted based on the differences (e.g., alerts to users who altered a BI Artifact, alerts to administrators, etc.).

In various implementations, the SI system may allow version control (e.g., managing and/or storing) of assertions and/or tests.

Figure 2E:
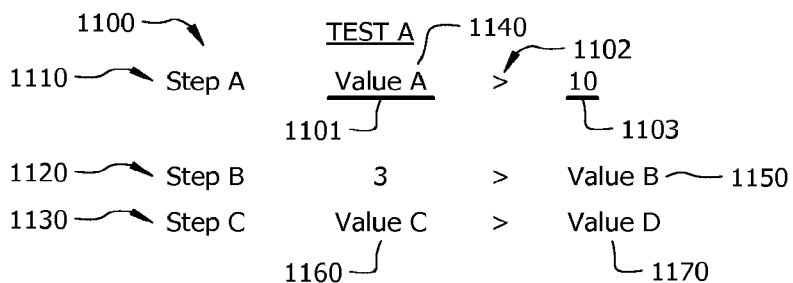
FIG. 2E illustrates an implementation of an example test.

In some implementations, a test may be generated through the SI system in which an assertion is selected more than one time. The implementation of the assertion in the test may vary based on inputs provided by the user that created the test and/or by users running the test. FIG. 2E illustrates an implementation of an example test 1100. For example, an assertion may be whether a first value is greater than a second value. A user may provide the values to be compared. As illustrated, the assertion may be used to generate 3 distinct steps in Test A 1100. In step A 1110, the user may provide the first value 1101 as a value in a report to be tested, which is designated as, value A 1140, and the second value 1103 is provided as a predetermined value of 10. In step 2 1120, the user may provide the first value as a predetermined value of 3 and may indicate that the second value 1150 is a value B, which is provided by the user requesting that the test be run. In step 3 1130, the user may provide the first value 1160 as value C, a value from a previous execution which is retrieved by the SI system, and value D 1170 which is associated with a portion of the report. Thus, the test may be generated to include more than one step which each provide different criteria 1102 upon which to evaluate a component (e.g., BI Artifact, output, etc.) based upon a selected assertion.

In some implementations, order in which the steps of a test may be run may be based on criteria provided by the user. For example, one or more steps of a test may be run in a sequential order provided by the user and/or one or more steps may be run concurrently. In some implementations, a step may or may not be run based on the result of another step (e.g., run step 2 if value 1 is greater than 10 in step 1). In some implementations, the SI system may automatically provide at least a portion of the ordering in which steps of a test and/or tests are performed. The SI system may determine a dependency graph, in some implementations, such that an ordering of the tests and/or steps may be dynamically created by the SI system. Thus, when users change, add, and/or delete tests and/or steps, the SI system may automatically adjust the dependency graph as appropriate. For example, if a test contains a reference to a result of another step of the test and/or step of a different step, then the SI system may identify the reference and provide an order of the steps and/or tests such that the reference may be satisfied (e.g., a value has been calculated prior to referencing the value).

In some implementations, the test may produce results such as values from tests, whether a component passed or failed the test or portions thereof, warnings, and/or other information. The test results may be presented to the user (e.g., via one or more graphical user interfaces, messages, notifications, etc.).

In various implementations, assertions may include a number of criteria and/or functions. For example, an assertion may include storage of values. Assertions may include performing statistical functions such as rolling averages, standard deviations, etc. Assertions may include comparing lists of different sizes and identifying differences. Assertions may include testing intermediate SQL and/or MDX (Multidimensional expressions). For example, the SI system may be perform tests on intermediate SQLs. For example, the SI system may request intermediate SQL queries (e.g., queries performed as intermediate steps in a BI Artifact processing) and provide the result into assertions of a test. The evaluation based on the assertion may facilitate identification of intermediate SQL that operates at a level different from other SQL, different from a predetermined value, and/or default value, for example. Thus, when report is associated with a long execution time (e.g., when compared to a predetermined value, a user provided value, a default value, and/or a previous execution time, one or more underlying reasons, such as an SQL query, may be identified as the reason for the execution time. The SI system may generate a message based on the identification of the underlying reason. In some implementations, the SI system may identify other components (e.g., BI Artifacts, packages) that utilize the same identified query language. The SI system may transmit message(s) based on the identification of the other components (e.g., to users editing the components, to administrators, etc.).

In some implementations, BI Artifacts may be generated in the BI environment(s) that reference the SI database (e.g., that includes data from the testing). Thus, Report(s), Report Specification(s), and/or Report Output(s), for example, may be generated using the BI environment that includes failures, identification of differences in data in output, etc.

In some implementations, the SI system may allow generation of test scripts. A test script may be associated with a project and one or more test associated with the project. For example, a test script may include a subset of the tests associated with a project. Thus, test scripts may allow different subsets (e.g., all or a portion of the tests associated with a project) of tests to be run at different times. For example, if a first test subscript includes tests with long execution times, then it may be run nightly. If a second test subscript includes tests with short execution times, it may be run twice daily.

In some implementations, a test script may be generated based at least partially on information provided by a user. The user may select one or more tests to be associated with a test script. A user may provide a frequency of execution for a test script.

In some implementations, the SI system may automatically determine a test script and/or portions thereof. For example, the SI system may analyze the tests associated with a project and generate one or more test scripts based on the analysis. For example, the SI system may determine which tests have execution time greater than a predetermined period and group the longer tests in a first test script. In some implementations, the SI system may identify the type of test (e.g., post-execution and/or pre-execution) and generate test script(s) based at least partially on the type of test (e.g., group pre-execution tests together). In some implementations, the SI system may determine whether relationships exist between the tests (e.g., a first test uses a value from a second test) and generate test scripts based on the determined relationships.

In some implementations the SI system may allow one or more assertions to be applied to the tests of a project to automatically categorize tests in one or more test scripts. For example, an output size of a test may be evaluated based on an assertion and then the SI system may categorize the tests into one or more test scripts based on output size.

In some implementations, the SI system may analyze the tests of the test script and determine a property of the test script, such as an execution time. If the execution time for the test script is greater than a predetermined period of time, the SI system may automatically run the test script at night rather than during the day. In some implementations, the SI system may monitor system usage and allow one or more test scripts or portions thereof when a system usage is less than a predetermined value. The SI system may restrict operation and/or termination an operation of a test script or portion thereof when a system usage is greater than a predetermined maximum value, in some implementations.

In some implementations, the SI system may include a governor (e.g., a module of the SI system may include a governor). For example, the governor of the SI system may monitor and/or regulate the number of requests that the SI system issues to the BI environment. The ability of the BI environment to respond to requests from users and/or requests from the SI system may be based on the current loads on the system. If the BI environment is experiencing a high load (e.g., a number of loads greater than a predetermined value), the BI environment may respond to requests slowly (e.g., when compared to response time under lower loads). Thus, the SI system may monitor the BI environment via the governor. The SI system may issue requests based on the monitoring of the BI environment. For example, the number and/or type of requests issued by the SI system may be based on the monitoring by the governor. In some implementations, the SI system may determine when, how many, and/or which tests to allow to run based on the monitoring of the BI environment by the governor of the SI system.

In some implementations, the test scripts may include one or more properties and the SI system may allow a test script to operate and/or restrict operation of the test script based on the properties. For example, the test script may include a property such as to use a previous run value unless the BI Artifact associated with a test changes. The SI system may determine a version of the BI Artifact and the version on which the test last ran to determine if the BI Artifact has changed since the last run of the test. The SI system may restrict operation of the test script if the BI Artifact did not change since the last test run. The SI system may allow the test script to run based at least partially on other properties (e.g., execution properties) if the BI Artifact did change since the last run. In some implementations, a test script may include timing properties. For example, a timing property may include that if the test script ran within a predetermined period of time (e.g., last 3 hours), the results from the previous run should be utilized (e.g., in BI Artifact outputs, such as reports, in other tests, etc.).

In some implementations, the SI system may allow testing to be performed in studios of a BI environment, such as Report Studio, Query Studio, etc. By allowing testing in a studio, feedback for one or more changes (e.g., additions, deletions, and/or alterations) may be provided by the SI system based on the testing. In some implementations, the SI system may intercept communications prior to allowing the communication to be transmitted to other components of the BI environment (e.g., to process the change) and tests (e.g., testing in studio, conflict assistance, conflict notification by attempting to commit changes to external version control) may be performed prior to and/or in conjunction with transmitting the intercepted communication to other components of the BI environment. In some implementations, the intercepted communication may be transmitted and/or transmission may be restricted to other components of the BI environment based on result(s) of the tests.

In some implementations, the SI system may allow users to check in and check out a BI Artifact the user is authoring (e.g., via one or more buttons, for example, in the studio). The SI system may receive an indication that the BI Artifact is being checked in and may perform one or more tests (e.g., a test script to be run in studio generated based on input from a user and/or automatically generated by the SI system based on defaults or evaluations by the SI system). The SI system may determine test results and present the test results to the user (e.g., through an icon, through color, through notifications, and/or messages in the studio). Thus, after changes are made to a BI Artifact and the BI Artifact is checked into the system, one or more tests may be performed and an evaluation of the changes made to the BI Artifact may be determined (e.g., increased execution time, produced a report that does not meet company standards, etc.).

In some implementations, the SI system may deploy the changed BI Artifact to a folder, such as a temporary folder, of the BI environment (e.g., a copy of the BI Artifact may be created in the folder). The SI system may test the deployed changed BI Artifact (e.g., the copy of the changed BI Artifact in the folder of the BI environment) to determine one or more test results. The SI system may present at least a portion of the test results (e.g., failure, increased run time, etc.) to a user in a corresponding studio (e.g., the studio in which the BI Artifact was changed). The SI system may test and/or present test results automatically, in some implementations. In some implementations, the SI system may allow version control of the temporary folder and a user may be able to revert to previous changes, undo changes, and/or compare versions, for example. Version control of the temporary folder may be restricted, in some implementations.

In some implementations, the SI system may perform tests (e.g., a test script generated to be performed on changed BI Artifacts) when one or more predetermined changes are made in a studio, such as deleting a property of a BI Artifact and/or changing reference to a datasource. The tests may be performed on the BI Artifact and/or other BI artifacts in the BI environment. The other BI artifacts may be determined using predetermined criteria, such as whether the other BI artifacts have a dependency on the BI artifact. One example of such a dependency is a query object having a dependency on a package object.

In some implementations, the testing the SI system may be able to perform may include impact analysis. Impact analysis and/or portions thereof may be utilized in conflict assistance testing. For example, a user may utilize impact analysis to determine properties associated with deploying a package in a BI environment (e.g., such that system crashes, circular reference problems, etc. may be determined). The SI system may receive identification (e.g., a label and/or version) of package(s) to be deployed and identification of a BI environment in which the identified package(s) may be deployed. The BI environment may include a deployment of a different version of the package, in some implementations. The SI system may retrieve the identified package(s) and generate the identified package(s) in a folder, such as a temporary folder, in the identified BI environment(s). The identified package(s) may be restricted from deleting, overwriting, or otherwise altering one or more other BI Artifacts in the identified BI environment (e.g., the identified package may be restricted from overwriting the version of the package currently deployed in the identified BI environment). The SI system may then run one or more tests (e.g., test scripts, tests, etc.) to be performed on the package(s) in the folder. Since the package(s) are operating in the BI environment in which the user would like to deploy the package, more accurate information about the deployment of the package may be determined (e.g., when compared to running the tests on the package in a different BI environment, such as a development BI environment).

The SI system may generate an interface, such as a dashboard, based on the results of the tests. For example, the interface may include at least a portion of the test results for the new package in the folder and another package in the BI environment (e.g., a similar package, an old version of the package, etc.). The test results for the other package may be obtained from previously run test on the package, in some implementations. The SI may determine one or more metrics (e.g., percentage change, amount above or below a predetermined target value, etc.) and present the metrics on the dashboard.

In some implementations, the package may include a reference to one or more other components (e.g., BI Artifacts and/or property sets). When the tests are performed on the package in folder of the identified BI environment, the tests may be performed on one or more of the components which are referenced in the package.

In some implementations, the package may not include at least a portion of the information for deployment of the package in the identified BI environment. For example, the package may not include a property set (e.g., to inhibit overwriting property sets applicable to a specific BI environment). The SI system may identify the portion of information for deployment not included in the package and retrieve the portion of the information for deployment from the identified BI environment (e.g., from a different version of the package deployed in the BI environment, from a similar package deployed in the BI environment, and/or from a default value for the BI environment). The SI system may copy the portion of information from the identified BI environment and include it in the identified package (e.g., copy the portion into the folder in which the identified package is to be deployed). The SI system may then test the identified package in the identified BI environment.

In some implementations, the SI system may compare the behavior of two or more BI environments in processing BI artifacts. For example, the SI system may cause a first BI environment to execute a first Report. The SI system may also, at the same time or a later time, request execution, in a second BI environment, of a copy of the Report, second Report (e.g., a copy of the Report from the first BI environment and deployed in the second BI environment). The copy of the Report, second Report may include one or more similarities (e.g., similar portions) to the first Report and/or one or more differences (e.g., different portions) to the first Report. For example, the second Report may include different content, properties, dependencies and/or location in the second BI environment. In some implementations, the SI system may ignore one or more portions of the first Report and/or second Report when determining whether similarities and/or differences exist between the first Report and the second Report.

In some implementations, the SI system may measure a first execution time used by the first BI environment to execute the first Report and a second execution time used by the second BI environment to execute the second Report. The SI system may then compare the first execution time and the second execution time.

In some implementations, once the first BI environment has finished executing the first Report, the SI system may identify the size of the output and/or content of the output generated by executing the first Report. The SI system, when the second BI environment has finished executing the second Report, may identify the size and/or content of the output generated by execution of the second Report. The SI system may compare the identified size(s) and/or identified output(s). In some implementations, the SI system may identify the SQL and/or MDX query and/or queries used to generate the output for the Report and the copy of the Report.

The SI system may then compare the output size(s), execution time(s), and/or content of the first Report and the second Report. The SI system may then store the comparison and/or analytics (e.g., percentage difference, etc.) based on the comparison in a memory coupled to the SI system. The SI system may transmit one or more notifications (e.g., to a user) that includes information related to one or more differences and/or similarities in the execution time, output size, and/or content of the two report outputs (e.g. first Report Output and/or second Report Output).

In some implementations, the SI system may store the one or more of the differences and/or one or more of the similarities. The SI system may transmit a notification (e.g., to the user) when the execution time, output size, and/or content of the report outputs (e.g., first Report output and/or second Report output) is greater than a predetermined value (e.g., variance based on previous execution times and/or default execution times, user provided execution time variance, etc.). The predetermined value may be specified by a user, for example, in seconds or a percentage. Although a process in which the SI system compares data between two environments has been described in this example, the SI system may also compare data (e.g., size, output content, execution time, and/or other appropriate data) from more than two BI environments.

The SI system may compare and/or identify one or more differences between the properties of BI Artifacts in a first BI environment and copies of the BI Artifacts in two or more other BI environments, in some implementations. A first BI Artifact may be associated with a first environment and a copy of the first BI Artifact may be associated in one or more second BI environments (e.g., when the first BI Artifact is deployed in a second BI environment, a copy of the first BI environment may be created in the second BI environment, in some implementations. For example, the SI system may identify one or more differences and/or similarities between security setting(s) on a first folder object in a first BI environment and a copy of the folder object, a second folder object, in a second BI environment. The SI system may store one or more of the identified differences and/or similarities. The SI system may transmit a notification (e.g., to the user) that includes information related to one or more of the identified differences and/or similarities. In some implementations, the user may identify one or more properties and the SI system may identify differences in one or more of the user identified properties (e.g., between a first BI Artifact in a first environment and a copy of the first BI Artifact in one or more second BI environments).

In some implementations, the first BI environment and the second BI environment may include different BI software or different versions of the same BI software. For example, the first BI environment is based at least partially on IBM Cognos version 10.1 and the second BI environment is based at least partially on IBM Cognos version 10.2.

In some implementations, the SI system may allow messaging between users of BI environment(s). For example, the BI environment may be accessed through a user web interface (e.g., Cognos Connection in IBM Cognos environments). The SI system may allow presentation of a message on the user web interface. For example, a pop up message and/or banner message may be displayed to the user via the user web interface.

In some implementations, the users to whom a message is presented may be restricted to a group of users. For example, a user may create a message in the user web interface through the SI system. The user may request that the message be transmitted to a set of users. The user may specify the set of user. The user may provide criteria upon which the set of users may be selected and determined by the SI system. For example, the user may input criteria based on role, functions allowed, security permissions, previous access, recent access, authorship of changes to a specific component, etc. In some implementations, the SI system may automatically determine the set of users to which the message will be transmitted based on the message (e.g., BI Artifact it is related to, message content, predefined words which trigger a set, such as administrator or failure). For example, an administrator requests transmission of a message of corruption of a BI Artifact to a set of users. The SI system may receive criteria from the administrator upon which the set of users may be determined. For example, the administrator may request transmission to users working on a package that includes the BI Artifact, users working on BI Artifacts that reference the BI Artifact, the last predetermined number of authors of a BI Artifact, etc. In some implementations, a user may request transmission of a notice to a set of users, such as a project team, when the message requests that changes be saved by 4 pm to be deployed. In some implementations, the SI system may determine whether a user is included in a set of users based on the user role (e.g., administrator; consumer who does not have the ability to change BI Artifacts may not receive a message), user functions (e.g., currently authoring a BI Artifact), previous user functions (e.g., previous authorship), timing (e.g., North America is unaffected by an outage so restrict transmission to North America users), where a user is navigating, versions of components (e.g., notification a package updated when open an updated report), datasource properties (e.g., failures, updates, etc.), user properties (e.g., you frequently make changes to the BI Artifact and/or similar BI Artifacts), etc. The message may be transmitted with an expiration date (e.g., transmit to users performing specified functions, such as being logged into a user web interface, during a specified time period).

In various implementations, a set has been described. A set may include one or more elements. For example, a set of BI Artifacts may include one or more BI Artifacts. A set of tickets may include one or more tickets. The items in the set may not be associated with, related to, and/or share properties each other, in some implementations. The set may include items, such as BI Artifacts, that a user selects.

In various implementations, data such as labels, packages, versions, identification codes, and/or any other appropriate data have been described as stored in a memory of the SI system. In some implementations, the SI system may transmit data to the external version control system for storage. In addition, the external version control may in conjunction with the SI system track, monitor, and/or identify versions of various components of the SI system and/or BI environment, such as BI Artifacts, properties, labels, etc. For example, rather than storing a version of a BI Artifact and/or package in the SI system, the SI system may transmit the version of the BI Artifact and/or package to the external version control. The external version control may store the transmitted version and allow the SI system to retrieve the version, commit changes to the version, and/or any other appropriate operation. The SI system may transform data, such as BI Artifact(s), package(s), label(s), and/or other data as appropriate, prior to transmitting the data to the external version control and/or prior to transmitting data retrieved from the external version control to the BI environment and/or SI system. For example, data may be in a first format to reside and/or be executed in the BI environment and a second format to be stored in the external version control. Thus, the SI system may transform the data transmitted and/or retrieved based on to where the data will be transmitted, stored, and/or executed.

Although specific implementations have been described in various operations may be added, deleted, and/or modified. In some implementations, operation(s) of the described processes may be performed in combination with other processes. For example, process 300 may be performed in combination with other processes such as process 300, process 325, process 400, process 500, process 600 and/or process 700.

The processes described and/or operations thereof may be implemented by various systems, such as the system described in FIGS. 1A and 1F. For example, instructions stored in a memory of the system may be executed by a processor (e.g., processor of the SI system) to perform one or more of the described processes, described operations, and/or portions thereof. In addition, various operations may be added, deleted, and/or modified. In some implementations, operation(s) of the described processes may be performed in combination with other processes.

Although users have been described as a human, a user may be a person, a group of people, a person or persons interacting with one or more computers, and/or a computer system. Although in various implementations, users are described (e.g., as providing user information, validating, etc.), any security principal may be utilized. For example, a set of users to which a message is transmitted may a set of roles and/or groups to which a message may be transmitted.

In various implementations, specific BI ecosystem(s), BI environment(s), BI artifact(s), BI artifact properties(s), BI outputs, etc. have been described. However, the described system(s) and process(es) may be utilized with a variety of BI ecosystem(s), BI environment(s), BI artifact(s), BI artifact properties, BI artifact aspect(s), and/or BI outputs. For example, an IBM Cognos BI environment and/or various components of the IBM Cognos BI have been described in various implementations as examples; however, other types of BI environments and/or components of other types of BI environments may be utilized in the described systems and processes.

Systems that include computers, such as the BI environment, user devices, SI system, and/or external security sources, have been described in various implementations. The computer may include a processor that executes instructions and manipulates data to perform operations of the computer. The processor may include a programmable logic device, a microprocessor, or any other appropriate device for manipulating information in a logical manner and memory may include any appropriate form(s) of volatile and/or nonvolatile memory, such as RAM and/or Flash memory.

The memory may include data, such as lists of components of a BI ecosystem, communication protocols, sets of security principals, user identification information, format information, access lists, audit trails, historical data, business data, tests, assertions, set of users, versions (e.g., files, BI Artifacts, tests, assertions, etc.), shell BI Artifacts property sets, and/or any other appropriate information. In addition, various software may be stored on the memory. For example, instructions, such as operating systems and/or other types of software (e.g., instruction(s) and/or modules) may be stored on the memory. The instructions of the SI system and/or BI system may perform (e.g., when executed by a processor) various operations, such as the operations in the described systems and processes. For example, the instructions may identify and/or transmit for storage one or more versions, allow version control, communicate with external corporate version control systems, retrieve data, allow test creations, generate assertion sets for presentation to a user, generate testing suites, generate testing suite properties, allow deployment, allow messaging, and/or functions of the described systems and/or processes, and/or other appropriate operations. In some implementations, instructions may be combined as a single module or may be distinct modules. Modules may include various modules and/or sub-modules.

A communication interface may allow the computer to communicate with other components of the BI ecosystem, other repositories, and/or other computer systems. The communication interface may transmit data from the computer and/or receive data from other components, other repositories, and/or other computer systems via network protocols (e.g., TCP/IP, Bluetooth, and/or Wi-Fi) and/or a bus (e.g., serial, parallel, USB, and/or FireWire). Operations of the described system stored in the memory may be updated and/or altered through the communication via network protocols (e.g., remotely through a firmware update and/or by a device directly coupled to the computer).

The computer may include a presentation interface to present data to a user, such as though a monitor and speakers. The presentation interface may facilitate receipt of selections from users.

Although example computers that may be used with the disclosure have been described, the described systems and processes may be implemented through various computers such as servers, as well as a server pool. For example, the BI environment may include a general-purpose computer (PC) a Macintosh, a workstation, a UNIX-based computer, a server computer, or any other suitable device. The computer may be adapted to execute any operating system including UNIX, Linux, Windows, or any other suitable operating system. The computer may include software and/or hardware in any combination suitable to provide access to data and/or translate data to an appropriate compatible format.

Although a single processor has been described, multiple processors may be used according to particular needs, and reference to processor is meant to include multiple processors where appropriate.

A memory of the computer may include any appropriate memory including a variety of repositories, such as, SQL databases, relational databases, object oriented databases, distributed databases, XML databases, and/or web server repositories. Furthermore, memory may include one or more forms of memory such as volatile memory (e.g., RAM) or nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvSRAM), and/or phase-change memory (PRAM).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable signal(s) may be non-transitory waves and/or non-transitory signals.

To provide for interaction with a User, the systems and techniques described here can be implemented on a computer having a display device (e.g., LCD (liquid crystal display) monitor) for displaying information to the User and a keyboard and a pointing device (e.g., a mouse or a trackpad) by which the User can provide input to the computer. Other kinds of devices can be used to provide for interaction with a User as well; for example, feedback provided to the User by an output device can be any form of sensory feedback (e.g., visual feedback, auditory feedback, or tactile feedback); and input from the User can be received in any form, including acoustic, speech, or tactile input.

A graphical user interface (GUI) of the interface(s) generated by the system may be displayed on a presentation interface of the user device, such as a monitor or screen. GUI may be operable to allow the user of a user device to interact with repositories and/or various interface(s). Generally, GUI provides a user with an efficient and user-friendly presentation of data provided by the system. GUI includes a plurality of displays having interactive fields, such as image icons, pull-down lists, fillable fields, and editable text operated by the user. And in one example, GUI presents an explore-type interface and receives commands from the user. It should be understood that the term graphical user interface may be used in the singular or in the plural to describe one or more graphical user interfaces in each of the displays of a particular graphical user interface. Further, GUI contemplates any graphical user interface, such as a generic web browser, that processes information in the system and/or user device and efficiently presents the information to the User. In some implementations, GUI may present a web page embedding content. The server can accept data from a user device(s) via the web browser (e.g., Microsoft Internet Explorer or Safari) and return the appropriate Hyper Text Markup Language (HTML) or eXtensible Markup Language (XML) responses.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a test" includes a combination of two or more tests and reference to "an assertion" includes different types and/or combinations of assertions. As another example, "coupling" includes direct and/or indirect coupling of members (e.g., of the BI environment, SI system, and/or external security systems).

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular implementations of the process, machine, manufacture, composition of matter, means, methods and operations described in the specification. As one of ordinary skill in the art will readily appreciate from the disclosure, processes, machines, manufacture, compositions of matter, means, methods, or operations, presently existing or later to be developed that perform substantially the same function or achieve substantially the same result as the corresponding implementations described herein may be utilized according to the present disclosure. Accordingly, the appended claims are intended to include within their scope such processes, machines, manufacture, compositions of matter, means, methods, or operations.

Glossary of Selected Terms

While dictionary meanings are also implied by certain terms used herein, the following glossary of certain terms may be useful.

"Business Intelligence", which is also known by the acronym "BI", generally refers to computer-based techniques used in identifying, extracting, and analyzing business data. BI is a set of methodologies, processes, architectures, and technologies that transform raw data into meaningful and useful information used to enable more effective strategic, tactical, and operational insights and decision-making. BI technologies provide historical, current, and predictive views of business operations. Common functions of BI technologies include reporting, online analytical processing, analytics, data mining, process mining, complex event processing, business performance management, benchmarking, text mining, and predictive analytics. While BI and competitive intelligence both support decision making, BI typically uses technologies, processes, and applications to analyze mostly internal, structured data and business processes while competitive intelligence gathers, analyzes and disseminates information with a topical focus on company competitors. Accordingly, BI can be broadly understood to include competitive intelligence as a subset thereof.

"Business Intelligence software" means software that provides BI functionality. Commercially available BI software includes: the Eclipse BIRT (Business Intelligence and Reporting Tools) Project from Actuate and the Eclipse Foundation; IBM Cognos®; SAP Business Objects®; MicroStrategy®; and others.

"Business Intelligence environment" means a single instance of the BI software, installed on one or more computers. The instance may be made up of many processes that may coordinate together in some fashion to provide BI functionality to a set of users. The instance may host content such as BI artifacts, and may provide insight into one or more datasources (generally abstracted by one or more BI metadata layers). Many organizations will have multiple BI environments that are targeted toward different purposes, for example:

Development—A BI environment where BI developers create or update BI content (e.g. BI artifacts). The content in this type of environment is not yet published to users.

QA—A BI environment where quality assurance ("QA") professionals (also known as testers) verify the proper functioning of BI artifacts. Developers usually build out new versions of BI content in the development environment and then, at periodic checkpoints, promote that BI content from the development BI environment into the QA BI environment so that it can be tested.

Production—A "live" BI environment where users are reviewing, analyzing, and using the BI content. BI content is not generally created or updated in this type of environment. Tested BI content is typically promoted from the QA BI environment into the production environment once it has passed through the organization's quality assurance processes.

"Business Intelligence ecosystem" means the entirety of the BI system, including the BI environment, the BI artifacts, metadata models, and configuration details contained within that environment or authored for the purpose of being deployed in that environment, the BI-accessible datasources utilized by the BI environment, the ETL (extract, transform, load) processes that push data into BI-accessible datasources, the upstream datasources from which the ETL processes pull data, and the computer(s) that host all of these components.

"Business Intelligence artifact" is a generic categorization for an authored BI object that resides in a BI environment and may be accessed by users (typically by utilizing the BI artifact to expose BI data from one or more datasources). Examples of BI artifacts in the context of IBM Cognos® include report, metadata model, query, analysis, dashboard, and business insight advanced object, among others. Certain properties are generally common to many types of BI artifacts, including: name; description; policy set (security policies); and screentip.

"Metadata model" means a BI abstraction layer that sits on top of one or more physical or virtualized datasources (a virtualized datasource is achieved using software that makes multiple physical datasources appear as a single datasource). The metadata model typically provides a relatively user- and business-friendly view of the underlying datasources, and may also record various properties and categorizations for individual or derived data elements. A small sampling of what can be defined in a metadata model includes: (a) certain data elements may be categorized into dimensional hierarchies (for example, a geographic hierarchy, a product hierarchy, a time based hierarchy (year>month>day>hour> second), among others); (b) aggregation rules or "roll up" behavior may be defined for facts or measures; (c) row level security strategies may be implemented; and (d) internationalization strategies for the data may be implemented. Most BI artifacts in a system are dependent upon a metadata model—in other words, such BI artifacts are typically written in terms of an associated metadata model, and when executed in a BI environment, the combination of supplied execution inputs, the security identity, the BI artifact and the associated metadata model are utilized by the BI software to query, summarize, post-process and render visualizations of data in the underlying datasources.

"Report" is a type of BI artifact. The successful execution of a report in the BI environment will produce one or more report outputs. A report typically has many properties, including: name; description; policy set (security policies); screentip; specification (also known as report specification); associated metadata model; and others. A report is linked with a specific metadata model and this linkage may be specified as a property on the report (or, optionally, in the report specification).

"Report specification" is one property of a report. It describes to the BI software how one or more datasources should be queried (most often through references to abstractions defined in the metadata model); how intermediate result sets should be summarized, post-processed, and potentially merged with other datasets; and how the resultant datasets should be rendered visually. Report specifications are typically authored within an editing tool provided by the vendor of the BI software (e.g., in IBM Cognos®, report specifications are edited in Report Studio). A report specification often encodes most, if not all, of the information necessary for a BI system to service an execution request (although other properties such as the associated metadata model or security policies may be recorded as other properties on the report itself).

"Report output" means an output produced by execution of a report or a report specification. A report output is typically one or more electronic files in a format selected by a user (e.g., PDF, HTML, CSV, and/or Excel, among others). In the case of web oriented report outputs (e.g. HTML, XHTML, or other suitable programming language), the report output file may contain references to other external resources (e.g. css files, JavaScript files, static images, dynamic images for charts or other visualizations, vector graphics, etc.).

The invention claimed is:

1. A method of managing versions of business intelligence artifacts comprising:
   accessing communications in a business intelligence environment between a user and the business intelligence environment related to a set of business intelligence artifacts;
   identifying a first set of alterations, to a first copy of the business intelligence artifacts, wherein the first set of alterations is requested by the user via an interface in the business intelligence environment to the set of business intelligence artifacts prior to allowing the first set of alterations to be transmitted to one or more other components of the business intelligence environment to process the first set of alterations;
   determining whether a first conflict exists between the first set of alterations and a second copy of the set of business intelligence artifacts based on a conflict notification from an external version control,
      wherein the second copy of the set of business intelligence artifacts is stored in a memory of the external version control;
   merging a set of differences into the first copy of the set of business intelligence artifacts to create a merged copy of the set of business intelligence artifacts when a third conflict determined at least partially based on one or more conflict assistance tests does not exist between the set of differences and the first set of alterations,
      wherein the set of differences is between the first copy of business intelligence artifacts and a third copy of the set of business intelligence artifacts,
      wherein the third copy is generated from the second copy, and
      wherein the one or more conflict assistance tests is based on a comparison between the set of differences and the first set of alterations; and
   determining whether a second conflict exists between the first copy of the set of business intelligence artifacts and the third copy of the set of business intelligence artifacts based at least partially on results of the one or more conflict assistance tests;
   transmitting a request to the external version control to commit the first set of alterations to the second copy of the set of business intelligence artifacts residing in the external version control if a determination is made that the first conflict does not exist; and
   transmitting the merged copy of the set of business intelligence artifacts to the external version control to commit the merged copy of the set of business intelligence artifacts, if a determination is made that the second conflict does not exist between the first copy of the set of business intelligence artifacts and the third copy of the set of business intelligence artifacts.

2. The method of claim 1, further comprising:
   receiving a request from the user to commit the first set of alterations to the business intelligence environment;
   transmitting the set of alterations to the external version control;
   receiving the conflict notification from the external version control based at least partially on the transmitted first set of alterations and the second copy of the set of business intelligence artifacts stored in the memory of the external version control, wherein the conflict notification identifies whether the first conflict exists between the transmitted set of first alterations and the second copy of the set of business intelligence artifacts;
   transmitting a request to the business intelligence environment to change the first set of business intelligence artifacts in the business intelligence environment based on the first set of alterations if a determination is made that the first conflict does not exist.

3. The method of claim 2 wherein the first copy includes a first version of a first business intelligence artifact and the second copy includes a second version of the first business intelligence artifact.

4. The method of claim 2 wherein the first copy of the set of business intelligence artifacts resides in the business intelligence environment such that the first copy of the set of business intelligence artifacts does not overwrite the set of business intelligence artifacts in the business intelligence environment.

5. The method of claim 2 further comprising if a determination is made that the first conflict exists, restricting at least one of:
   commitment of the first set of alterations to the external version control;
   or changes to the set of business intelligence artifacts in the business intelligence environment based on the first set of alterations.

6. The method of claim 2 wherein at least one of the conflict assistance tests is based on a comparison between a portion of the first copy of the set of business intelligence artifacts that was not altered by the first set of alterations and a corresponding portion in the second copy of the set of business intelligence artifacts.

7. The method of claim 2 further comprising:
   generating the third copy of the set of business intelligence artifacts by retrieving the second copy of the set of business intelligence artifacts from the external version control;
   identifying the set of differences between the third copy of the set of business intelligence artifacts and the first copy of the set of business intelligence artifacts;
   allowing one or more of the conflict assistance tests to be applied to the merged copy of the set of business intelligence artifacts;
   restricting transmission of the merged copy of the set of business intelligence artifacts to the external version control, if a determination is made that the second conflict does exist between the first copy of the set of business intelligence artifacts and the third copy of the set of business intelligence artifacts.

8. The method of claim 7 further comprising:
   identifying the second conflict if a determination is made that the second conflict does exist between the first copy of the set of business intelligence artifacts and the third copy of the set of business intelligence artifacts; and
   allowing a user to provide a second set of alterations to the first copy of the set of business intelligence artifacts such that the second conflict is resolved.

9. The method of claim 8 further comprising:
   transmitting the provided second set of alterations to the external version control;
   receiving a second conflict notification from the external version control based on the transmitted second set of alterations and the second copy of the set of business intelligence artifacts stored in a memory of the external version control; and
   wherein the second conflict notification identifies whether a conflict exists between the transmitted second set of alterations and the second copy of the set business intelligence artifacts;

determining whether the second conflict exists between the transmitted second set of alterations and the second copy of the set of business intelligence artifacts based at least partially on the second conflict notification;

allowing the second set of alterations to be committed to the external version control if a determination is made that the second conflict does not exist; and allowing the set of business intelligence artifacts in the business intelligence environment to be changed based on the second set of alterations if a determination is made that the second conflict does not exist.

10. The method of claim 2 wherein determining the first set of alterations comprises intercepting one or more communications in the business intelligence environment, wherein intercepting one or more communications comprises intercepting at least one of:

database queries in the business intelligence environment, communications from a message bus, or communications in the business intelligence environment between the user and the business intelligence environment related to changes to the set of business intelligence artifacts.

11. The method of claim 2 further comprising:

identifying a request from a first user for access to a set of business intelligence artifacts that resides in a first business intelligence environment;

determining contents of the requested set of business intelligence artifacts;

determining a version identification for each of the business intelligence artifacts in the requested set of business intelligence artifacts from the external version control;

generating a first copy of the requested set of business intelligence artifacts in the first business intelligence environment such that the generated first copy of the requested set of business intelligence artifacts does not overwrite the set of business intelligence artifacts that resides in the first business intelligence environment;

generating a check out record based on the determined version identification of one or more of the business intelligence artifacts in the requested set of business intelligence artifacts and user information associated with the first user; and storing the generated check out record in a memory coupled to a supplemental system.

12. The method of claim 11 wherein generating a first copy of the requested set of business intelligence artifacts in the first business intelligence environment comprises generating the first copy on a local drive.

13. The method of claim 1 further comprising restricting the requested first set of alterations to the set of business intelligence artifacts in the business intelligence environment if a determination is made to not allow the requested first set of alterations to the set of business intelligence artifacts.

14. The method of claim 1 wherein presenting at least one notification comprises presenting a conflict; and further comprising:

receiving a second set of alterations in the business intelligence environment from the user to resolve the conflict, if a determination is made to not allow the requested first set of alterations;

generating a third set of alterations based on the identified first set of alterations and the received second set of alterations; and transmitting the generated third set of alterations to one or more of the other components of the business intelligence environment to allow the third set of alterations to be made to the set of business intelligence artifacts in the business intelligence environment.

15. The method of claim 1 wherein identifying the first set of alterations requested by the user in the business intelligence environment to the set of business intelligence artifacts comprises:

determining if at least one of the communications in the business intelligence environment between the user and the business intelligence environment related to the set of business intelligence artifacts is included in a predetermined listing of changes;

determining that the first set of alterations has occurred if at least one of the communications in the business intelligence environment between the user and the business intelligence environment related to the set of business intelligence artifacts is included in the predetermined listing of changes; and determining that the first set of alterations has not occurred if at least one of the communications in the business intelligence environment between the user and the business intelligence environment related to the set of business intelligence artifacts is not included in the predetermined listing of changes.

16. The method of claim 1 wherein accessing communications in the business intelligence environment between the user and the business intelligence environment related to the set of business intelligence artifacts comprises intercepting communications from a business intelligence bus of a business intelligence environment; and further comprising:

identifying a second set of alterations requested by the user based on the intercepted communications from the business intelligence bus;

allowing one or more conflict assistance tests based at least partially on the requested second set of alterations to at least one of the business intelligence artifacts of the set of business intelligence artifacts, wherein allowing one or more conflict assistance tests comprises at least one of requesting execution of at least one conflict assistance test in the business intelligence environment or executing at least one conflict assistance test in the business intelligence environment; and presenting at least one notification to the user in the interface of the business intelligence environment based on one or more results of one or more of the conflict assistance tests.

17. The method of claim 1 wherein accessing communications in the business intelligence environment between the user and the business intelligence environment related to the set of business intelligence artifacts comprises intercepting database queries of a business intelligence system; and further comprising:

identifying a second set of alterations requested by the user based on the intercepted database queries;

allowing one or more conflict assistance tests based at least partially on the requested second set of alterations to at least one of the business intelligence artifacts of the set of business intelligence artifacts; and presenting at least one notification to the user in the interface of the business intelligence environment based on one or more results of at least one of the conflict assistance tests.

18. The method of claim 1 wherein accessing communications in the business intelligence environment between the user and the business intelligence environment related to the set of business intelligence artifacts comprises intercepting communications, wherein intercepting communications comprises intercepting at least one of database queries or communications from a message bus of a business intelligence system; and further comprising:
- identifying a second set of alterations requested by the user based on the intercepted communications;
- allowing one or more conflict assistance tests based at least partially on the requested second set of alterations to at least one of the business intelligence artifacts of the set of business intelligence artifacts; and
- presenting at least one notification to the user in an interface of the business intelligence environment based on one or more results of at least one of the conflict assistance tests.

19. A system comprising:
- a processor;
- a memory;
- a set of instructions stored in the memory, executing on the processor, and configured for:
  - accessing communications in a business intelligence environment between a user and the business intelligence environment related to a set of business intelligence artifacts;
  - identifying a first set of alterations, to a first copy of the business intelligence artifacts, wherein the first set of alterations is requested by the user via an interface in the business intelligence environment to the set of business intelligence artifacts prior to allowing the first set of alterations to be transmitted to one or more other components of the business intelligence environment to process the first set of alterations;
  - determining whether a first conflict exists between the first set of alterations and a second copy of the set of business intelligence artifacts based on a conflict notification from an external version control,
    - wherein the second copy of the set of business intelligence artifacts is stored in a memory of the external version control;
  - merging a set of differences into the first copy of the set of business intelligence artifacts to create a merged copy of the set of business intelligence artifacts when a third conflict determined at least partially based on one or more conflict assistance tests does not exist between the set of differences and the first set of alterations,
    - wherein the set of differences is between the first copy of business intelligence artifacts and a third copy of the set of business intelligence artifacts,
    - wherein the third copy is generated from the second copy, and
    - wherein the one or more conflict assistance tests is based on a comparison of the set of differences and the first set of alterations; and
  - determining whether a second conflict exists between the first copy of the set of business intelligence artifacts and the third copy of the set of business intelligence artifacts based at least partially on results of the one or more conflict assistance tests;
  - transmitting a request to the external version control to commit the first set of alterations to the second copy of the set of business intelligence artifacts residing in the external version control if a determination is made that the first conflict does not exist; and
  - transmitting the merged copy of the set of business intelligence artifacts to the external version control to commit the merged copy of the set of business intelligence artifacts, if a determination is made that the second conflict does not exist between the first copy of the set of business intelligence artifacts and the third copy of the set of business intelligence artifacts.

20. A non-transitory machine-readable medium comprising instructions executable by a processor, the instructions for:
- accessing communications in a business intelligence environment between a user and the business intelligence environment related to a set of business intelligence artifacts;
- identifying a first set of alterations, to a first copy of the business intelligence artifacts, wherein the first set of alterations is requested by the user via an interface in the business intelligence environment to the set of business intelligence artifacts prior to allowing the first set of alterations to be transmitted to one or more other components of the business intelligence environment to process the first set of alterations;
- determining whether a first conflict exists between the first set of alterations and a second copy of the set of business intelligence artifacts based on a conflict notification from an external version control,
  - wherein the second copy of the set of business intelligence artifacts is stored in a memory of the external version control;
- merging a set of differences into the first copy of the set of business intelligence artifacts to create a merged copy of the set of business intelligence artifacts when a third conflict determined at least partially based on one or more conflict assistance tests does not exist between the set of differences and the first set of alterations,
  - wherein the set of differences is between the first copy of business intelligence artifacts and a third copy of the set of business intelligence artifacts,
  - wherein the third copy is generated from the second copy, and
  - wherein the one or more conflict assistance tests is based on a comparison of the set of differences and the first set of alterations; and
- determining whether a second conflict exists between the first copy of the set of business intelligence artifacts and the third copy of the set of business intelligence artifacts based at least partially on results of the one or more conflict assistance tests;
- transmitting a request to the external version control to commit the first set of alterations to the second copy of the set of business intelligence artifacts residing in the external version control if a determination is made that the first conflict does not exist; and
- transmitting the merged copy of the set of business intelligence artifacts to the external version control to commit the merged copy of the set of business intelligence artifacts, if a determination is made that the second conflict does not exist between the first copy of the set of business intelligence artifacts and the third copy of the set of business intelligence artifacts.

* * * * *